United States Patent
Kobara et al.

(10) Patent No.: US 6,567,545 B1
(45) Date of Patent: May 20, 2003

(54) FORMAT RECOGNITION METHOD, APPARATUS AND STORAGE MEDIUM

(75) Inventors: Katsutoshi Kobara, Kawasaki (JP); Shinichi Eguchi, Kawasaki (JP); Koichi Chiba, Kawasaki (JP); Kouichi Kanamoto, Kawasaki (JP); Maki Yabuki, Kawasaki (JP); Yutaka Katsumata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/421,481

(22) Filed: Oct. 20, 1999

(30) Foreign Application Priority Data

May 28, 1999 (JP) .............................. 11-149154

(51) Int. Cl.[7] .................................. G06K 9/34
(52) U.S. Cl. ..................... 382/175; 382/176; 382/177; 382/306
(58) Field of Search ................. 382/173, 174, 382/175, 176, 177, 180, 170, 171, 172, 181, 189, 190, 193, 197, 198, 199, 305, 306; 707/509, 510, 513, 505

(56) References Cited

U.S. PATENT DOCUMENTS

| 5,101,448 | A | * | 3/1992 | Kawachiya et al. | 358/464 |
| 5,854,854 | A | * | 12/1998 | Cullen et al. | 382/176 |
| 6,043,823 | A | * | 3/2000 | Kodaira et al. | 345/619 |
| 6,125,204 | A | * | 9/2000 | Nakatsuka et al. | 382/173 |
| 6,289,120 | B1 | * | 9/2001 | Yamaai et al. | 382/170 |
| 6,320,983 | B1 | * | 11/2001 | Matsuno et al. | 382/186 |

FOREIGN PATENT DOCUMENTS

| JP | 7-282193 | 10/1995 |
| JP | 10-011531 | 1/1998 |
| JP | 10-040333 | 2/1998 |
| JP | 10-049602 | 2/1998 |

OTHER PUBLICATIONS

Ser. No.: 08/809,594; Filed: Mar. 31, 1997; By: Shinichi Eguchi et al; For: Data Medium Handling Apparatus and Data Medium Handling Method.

* cited by examiner

*Primary Examiner*—Bhavesh M. Mehta
*Assistant Examiner*—Ali Bayat
(74) *Attorney, Agent, or Firm*—Arent Fox Kintner Plotkin & Kahn, PLLC

(57) ABSTRACT

Disclosed is a format recognition method, apparatus and its storage medium for automatically recognizing the format of a form, whereby the format is automatically determined by examining the arrangement of the smallest rectangles. According to the present invention, the smallest rectangles are extracted from a form, and the positional relationship of these rectangles is obtained. The attribute of the smallest rectangle is determined from the positional relationship. In accordance with the attribute, the smallest rectangles are sorted into a headline portion and a data portion, and a character string in the data portion is recognized.

8 Claims, 80 Drawing Sheets

FIG. 6A
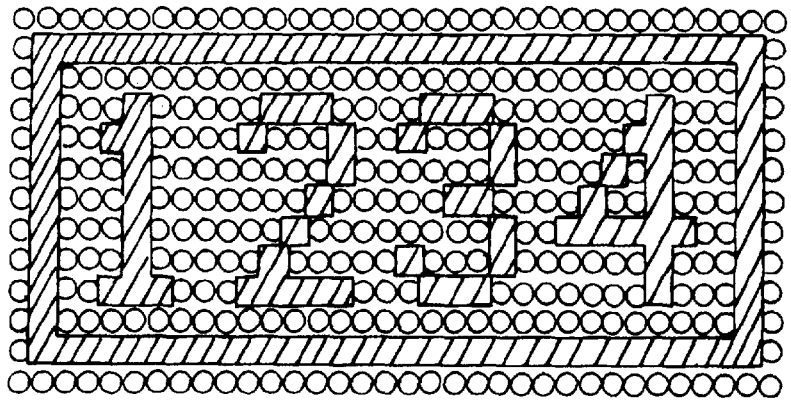
FIG. 6B
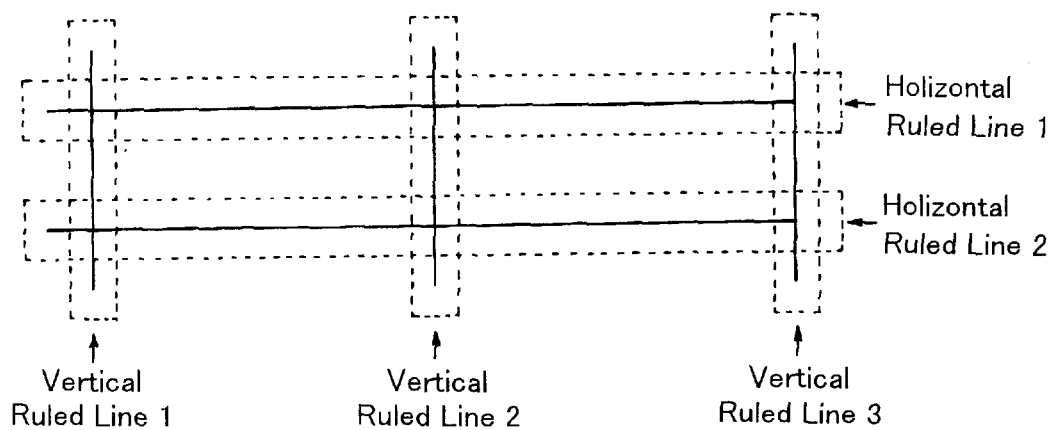
FIG. 6C
| Ruled Line Entry 1 | Ruled Line Entry 2 |
|---|---|
| Ruled Line Entry 3 | Ruled Line Entry 4 |

FIG. 7
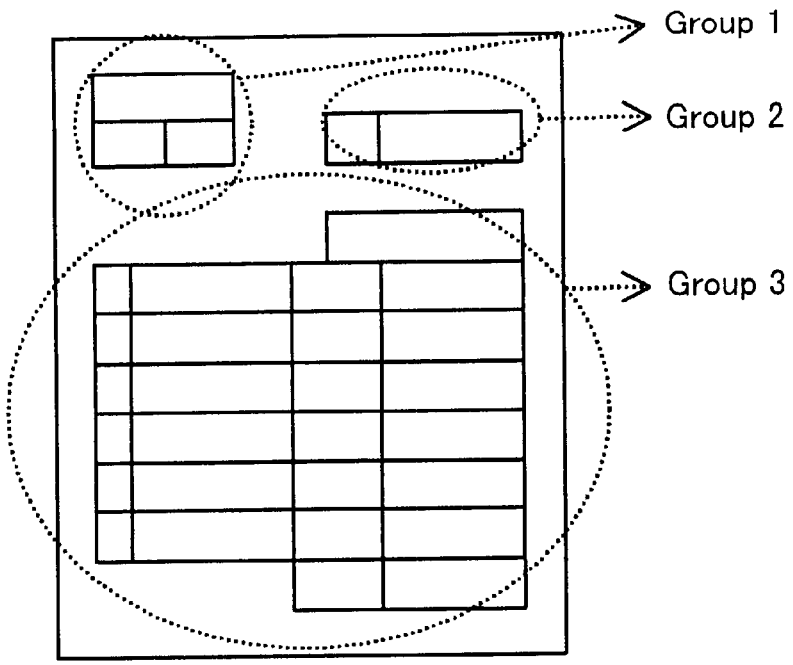
FIG. 8
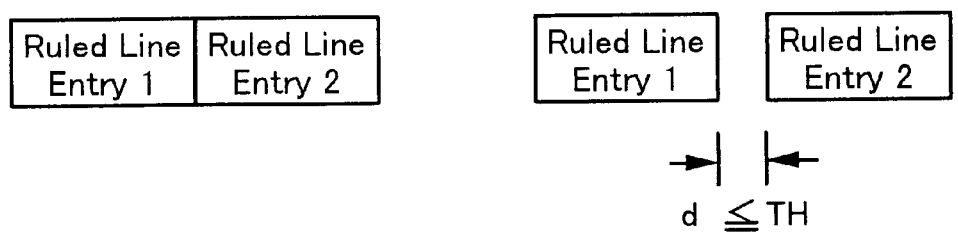
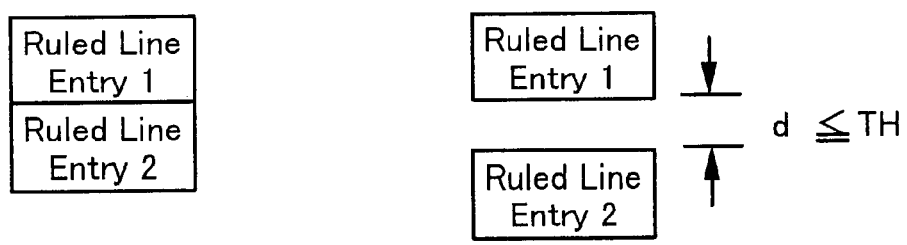

FIG. 9

```
                              Vertical
                              Ruled Line d
               Vertical            ↓
               Ruled Line c   ┌───┬───┐
                    ↓         │ 1 │ 2 │  } Upper Projecting
 Horizontal →  ┌───┬───┬───┬───┤
 Ruled Line a  │ 3 │ 4 │ 5 │ 6 │
               ├───┼───┼───┼───┤
               │ 7 │ 8 │ 9 │10 │
               ├───┼───┼───┼───┤
               │11 │12 │13 │14 │  } Main Chart
               ├───┼───┼───┼───┤
               │15 │16 │17 │18 │
               ├───┼───┼───┼───┤
               │19 │20 │21 │22 │
               ├───┼───┼───┼───┤
               │23 │24 │25 │26 │
 Horizontal →  └───┼───┼───┼───┤
 Ruled Line b      │27 │28 │29 │  } Lower Projecting
                   ├───┼───┼───┤
                   │30 │31 │32 │
                   └───┴───┴───┘
```

FIG. 11

| Transfer Destination | | Account Type | Account No. | Receiver Name | Amount |
|---|---|---|---|---|---|
| Bank Name | Branch Name | | | | |
| | | | | | |
| ~ | ~ | ~ | ~ | ~ | ~ |
| | | | | | |

- Logical Row 1
- Logical Row 2  } Group 3
- Logical Row 11

FIG. 12A

| Transfer Destination | | Account Type | Account No. |
|---|---|---|---|
| Bank Name | Branch Name | | |
| ABC Bank | def Branch | Ordinary | 1 2 3 4 5 6 7 8 |
| | | | |

FIG. 12B

| Transfer Destination (Ruled Line Entry 1) | |
|---|---|
| Bank Name (Ruled Line Entry 2) | Branch Name (Ruled Line Entry 3) |
| | |

| Transfer Destination | | Account Type | Block 1 |
|---|---|---|---|
| ABC Bank | def Branch | Ordinary | Block 2 |
| Logical Column 1 | | Logical Column 2 | |

| Bank Name | Branch Name | Account Type | Block 1 |
|---|---|---|---|
| ABC Bank def Branch | | Check | Block 2 |
| Logical Column 1 | | Logical Column 2 | |

FIG. 19A

| Transfer Destination (Ruled Line Entry 1) | | Account Type |
|---|---|---|
| ABC Bank (Ruled Line Entry 2) | def Branch (Ruled Line Entry 3) | Ordinary |

FIG. 19B

| Bank Name (Ruled Line Entry 1) | Branch Name (Ruled Line Entry 2) | Account Type |
|---|---|---|
| ABC Bank def Branch (Ruled Line Entry 3) | | Check |

| Sender Name | Kana | イロハ ニホヘ |
| --- | --- | --- |
| | Kanji | 異炉葉 荷補辺 |

| Sender Name | |
| --- | --- |
| Name(Kana) イロハ(カ) | Address(Kana) ××シ○○○1234-10 |
| Name(Kanji) 異炉葉(株) | Address(Kanji) ××市○○○1234-10 |

FIG. 24

| Headline Title | Recognition Category | Character Font | Link Number | Headline Table Link Address |
|---|---|---|---|---|
| Transfer Destination | Kanji | Type Face | 2 | Address of Bank Name |
| Bank Name | Kanji | Type Face | | |
| Branch Name | Kanji | Type Face | | |
| Account Type | Kanji | Type Face | | |
| Account No. | Numeral | Type Face | | |
| Amount | Numeral | Hand-written | | |

FIG. 25

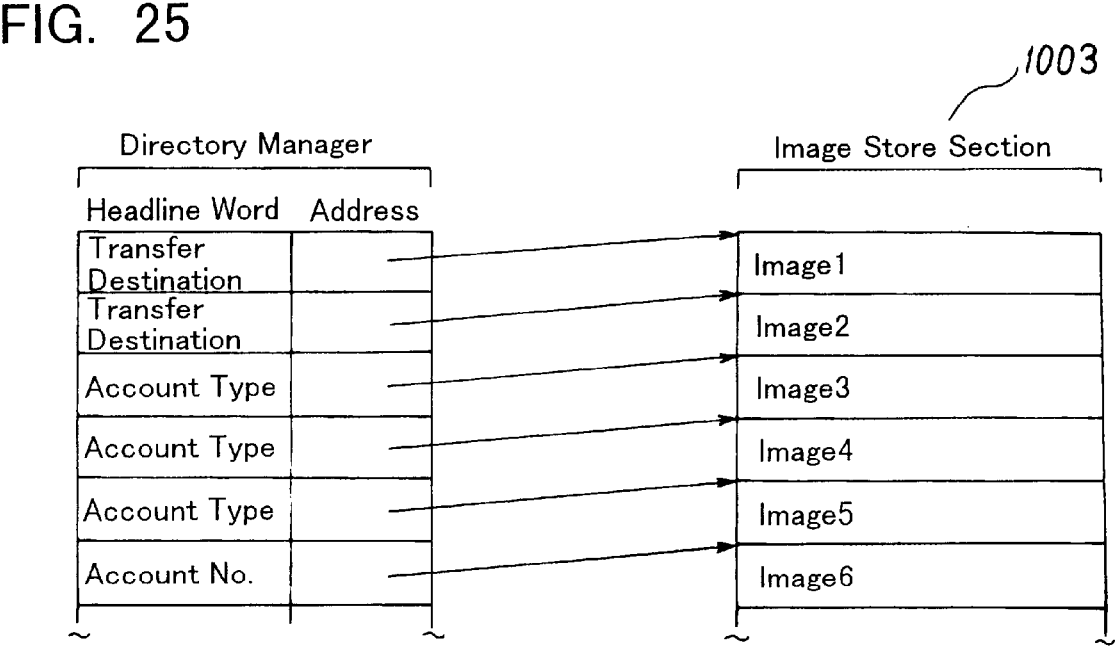

| Directory Manager | | Image Store Section |
|---|---|---|
| Headline Word | Address | |
| Transfer Destination | | Image1 |
| Transfer Destination | | Image2 |
| Account Type | | Image3 |
| Account Type | | Image4 |
| Account Type | | Image5 |
| Account No. | | Image6 |

FIG. 27

Horizontal Ruled Line Table

| Horizontal Ruled Line No. | Start | End |
|---|---|---|
| 1 | Xh1, Yh1 | Xh2, Yh2 |
| 2 | Xh3, Yh3 | Xh4, Yh4 |

FIG. 28

Vertical Ruled Line Table

| Vertical Ruled Line No. | Start | End |
|---|---|---|
| 1 | Xv1, Yv1 | Xv2, Yv2 |
| 2 | Xv3, Yv3 | Xv4, Yv4 |
| 3 | Xv5, Yv5 | Xv6, Yv6 |

FIG.29

RULED LINE ENTRY TABLE

| Entry No. RN | Start SC | End EC | Group No. GN | Block No. BN | Row No. LN | Column No. RO | Upper Horizontal Line No. ULN | Lower Horizontal Line No. LLN | Left Vertical Line No. LVN | Right Vertical Line No. RVN | Upper Entry No. URN | Lower Entry No. LRN | Left Entry No. ERN | Right Entry No. RRN | Nest Inf IN |
|---|---|---|---|---|---|---|---|---|---|---|---|---|---|---|---|
| 1 | X1,Y1 | X2,Y2 | | | | | 1 | 3 | 1 | 2 | | | | | |
| 2 | X3,Y3 | X4,Y4 | | | | | 1 | 2 | 2 | 3 | | | | | |
| | | | | | | | | | | | | | | | |

FIG.33

RULED LINE ENTRY TABLE

| RN | SC | EC | GN | BN | LN | RO | ULN | LLN | LVN | RVN | URN | LRN | ERN | RRN | IN |
|---|---|---|---|---|---|---|---|---|---|---|---|---|---|---|---|
| 1 | X1, Y1 | X2, Y2 | 1 | | | | 1 | 3 | 1 | 2 | | | | | |
| 2 | X3, Y3 | X4, Y4 | 1 | | | | 1 | 2 | 2 | 3 | | | | | |

GROUP TABLE

| Group No. GN | Start SC | End EC | Number of Entry RIN | Number of Block BLN | Number of Logical Row LR | Address of Head Entry HLA | Address of Head Logical Row HRA | Address of Head Block HBA |
|---|---|---|---|---|---|---|---|---|
| 1 | X1, Y1 | X2, Y2 | 5 | | | Entry1 Address | | |
| 2 | X3, Y3 | X4, Y4 | 171 | | | Entry6 Address | | |

FIG. 36

Ruled Line Enty Table

| RN | SC | EC | GN | BN | LN | RO | ULN | LLN | LVN | RVN | URN | LRN | ERN | RRN | IN |
|---|---|---|---|---|---|---|---|---|---|---|---|---|---|---|---|
| 1 | X1,Y1 | X2,Y2 | 1 | | | | 1 | 3 | 1 | 2 | | | | | |
| 2 | X3,Y3 | X4,Y4 | 1 | . | | | 1 | 2 | 2 | 3 | | | | | |
| 6 | Xa,Ya | Xb,Yb | 2 | | | | 4 | 5 | 5 | 6 | | | | | |
| 10 | Xc,Yc | Xd,Yd | 3 | | | | 6 | 7 | 8 | 10 | | | | | |
| 157 | Xe,Ye | Xf,Yf | 4 | | | | 18 | 19 | 12 | 13 | | | | | |

FIG. 37

Group Table

| GN | SC | EC | RIN | BLN | LR | HLA | HRA | HBA |
|---|---|---|---|---|---|---|---|---|
| 1 | X1,Y1 | X2,Y2 | 5 | | | Entry1 | | |
| 2 | X3,Y3 | X4,Y4 | 4 | | | Entry6 | | |
| 3 | X5,Y5 | X6,Y6 | 147 | | | Entry10 | | |
| 4 | X7,Y7 | X8,Y8 | 20 | | | Entry157 | | |

FIG. 40

Ruled Line Entry Table

| RN | SC | EC | GN | BN | LN | RO | ULN | LUN | LVN | RVN | URN | LRN | ERN | RRN | IN |
|---|---|---|---|---|---|---|---|---|---|---|---|---|---|---|---|
| 1 | X1,Y1 | X2,Y2 | 1 | | 1 | | 1 | 3 | 1 | 2 | | | | | |
| 2 | X3,Y3 | X4,Y4 | 1 | | 1 | | 1 | 2 | 2 | 3 | | | | | |
| 6 | Xa,Ya | Xb,Yb | 2 | | 1 | | 4 | 5 | 5 | 6 | | | | | |
| 10 | Xc,Yc | Xd,Yd | 3 | | 1 | | 6 | 7 | 8 | 10 | 10 | 11 | | | |
| 11 | Xe,Ye | Xf,Yf | 3 | | 1 | | 6 | 7 | 8 | 10 | 10 | | | | |
| 12 | Xg,Yg | Xh,Yh | 3 | | 1 | | 6 | 7 | 8 | 10 | 10 | | 11 | 12 | |
| 157 | Xi,Yi | Xj,Yj | 4 | | 1 | | 18 | 19 | 12 | 13 | | | | | |

| RN | INF | KN | CRN | RLN |
|---|---|---|---|---|
| 10 | ON | 0 | 1 | 0 |
| 11 | ON | 1 | 1 | 0 |
| 12 | ON | 1 | 1 | 1 |

FIG. 41

Logical Row Table

| LN | SC | EC | GN | BN | RIN | LL | ULN | LLN | ELN | RRN | HLA |
|---|---|---|---|---|---|---|---|---|---|---|---|
| 1 | X1,Y1 | X2,Y2 | 1 |  | 5 | 2 | 1 | 3 | 1 | 4 | Entry1 |
| 1 | X3,Y3 | X4,Y4 | 2 |  | 2 | 2 | 4 | 5 | 5 | 7 | Entry6 |
| 1 | Xa,Ya | Xb,Yb | 3 |  | 7 | 5 | 6 | 8 | 8 | 7 | Entry10 |
| 2 | Xc,Yc | Xd,Yd | 3 |  | 14 | 14 | 8 | 9 | 8 | 7 | Entry17 |
| 1 | Xe,Ye | Xf,Yf | 4 |  | 10 | 10 | 18 | 19 | 12 | 7 | Entry157 |

Group Table

| GN | SC | EC | RIN | BLN | LR | HLA | HRA | HBA |
|---|---|---|---|---|---|---|---|---|
| 1 | X1,Y1 | X2,Y2 | 5 |  | 1 | Entry1 | Row1 |  |
| 2 | X3,Y3 | X4,Y4 | 4 |  | 2 | Entry6 | Row2 |  |
| 3 | X5,Y5 | X6,Y6 | 147 |  | 11 | Entry10 | Row4 |  |
| 4 | X7,Y7 | X8,Y8 | 20 |  | 2 | Entry157 | Row15 |  |

FIG. 43

Ruled Line Entry Table

| RN | SC | EC | GN | BN | LN | RO | ULN | LLN | LVN | RVN | URN | LRN | ERN | RRN | IN |
|---|---|---|---|---|---|---|---|---|---|---|---|---|---|---|---|
| 1 | X1,Y1 | X2,Y2 | 1 | | 1 | 1 | 1 | 3 | 1 | 2 | | | | | |
| 6 | X3,Y3 | X4,Y4 | 2 | | 1 | | 4 | 5 | 5 | 6 | | | | | ON |
| 7 | Xa,Ya | Xb,Yb | 2 | | 1 | | 5 | 6 | 5 | 6 | | | | | ON |
| 132 | Xc,Yc | Xd,Yd | 3 | | 1 | | 16 | 17 | 8 | 9 | | | | | |
| 150 | Xe,Ye | Xf,Yf | 4 | | 1 | | 19 | 20 | 18 | 19 | | | | | |

FIG. 44

Logical Row Table

| LN | SC | EC | GN | BN | RIN | LL | ULN | LLN | ELN | RRN | HLA |
|---|---|---|---|---|---|---|---|---|---|---|---|
| 1 | X1,Y1 | X2,Y2 | 1 | 5 | 3 | 1 | 3 | 1 | 4 | Entry1 |
| 1 | X3,Y3 | X4,Y4 | 2 | 6 | 5 | 4 | 6 | 5 | 17 | Entry6 |
| 2 | Xa,Ya | Xb,Yb | 2 | 12 | 12 | 6 | 7 | 5 | 17 | Entry12 |
| 1 | Xc,Yc | Xd,Yd | 3 | 9 | 9 | 16 | 17 | 8 | 17 | Entry132 |
| 1 | Xe,Ye | Xf,Yf | 4 | 2 | 2 | 19 | 20 | 18 | 20 | Entry157 |

Group Table

| GN | SC | EC | RIN | BLN | ER | HLA | HRA | HBA |
|---|---|---|---|---|---|---|---|---|
| 1 | X1,Y1 | X2,Y2 | 5 | 1 | Entry1 | Row1 | |
| 2 | X3,Y3 | X4,Y4 | 126 | 11 | Entry6 | Row2 | |
| 3 | X5,Y5 | X6,Y6 | 18 | 2 | Entry132 | Row13 | |
| 4 | X7,Y7 | X8,Y8 | 22 | 11 | Entry157 | Row15 | |

FIG. 45

Ruled Line Entry Table

| RN | SC | EC | GN | BN | LN | RO | ULN | LLN | LVN | RVN | URN | LRN | ERN | RRN | IN |
|---|---|---|---|---|---|---|---|---|---|---|---|---|---|---|---|
| 1 | X1,Y1 | X2,Y2 | 1 |  | 1 | 1 | 3 | 1 | 2 |  |  |  |  |  |  |
| 6 | X3,Y3 | X4,Y4 | 2 |  | 1 |  | 4 | 5 | 5 | 6 |  |  |  |  | ON |
| 7 | Xa,Ya | Xb,Yb | 2 |  | 1 |  | 5 | 6 | 5 | 6 |  |  |  |  | ON |
| 150 | Xe,Ye | Xf,Yf | 2 |  | 1 |  | 19 | 20 | 18 | 19 |  |  |  |  |  |

Logical Row Table

| LN | SC | EC | GN | BN | RIN | LL | ULN | LLN | ELN | RRN | HLA |
|---|---|---|---|---|---|---|---|---|---|---|---|
| 1 | X1,Y1 | X2,Y2 | 1 |  | 5 | 3 | 1 | 3 | 1 | 4 | Entry1 |
| 1 | X3,Y3 | X4,Y4 | 2 |  | 8 | 7 | 4 | 6 | 5 | 20 | Entry6 |
| 2 | Xa,Ya | Xb,Yb | 2 |  | 14 | 14 | 6 | 7 | 5 | 20 | Entry12 |
| ~~1~~ | ~~Xe,Ye~~ | ~~Xf,Yf~~ | ~~4~~ |  | ~~2~~ | ~~2~~ | ~~19~~ | ~~20~~ | ~~18~~ | ~~20~~ | ~~Entry157~~ ← Delete |

FIG. 46

Group Table

| GN | SC | EC | RIN | BLN | LR | HLA | HRN | HBA |
|---|---|---|---|---|---|---|---|---|
| 1 | X1,Y1 | X2,Y2 | 5 | | 1 | Entry1 | Row1 | |
| 2 | X3,Y3 | X4,Y4 | 148 | | 11 | Entry6 | Row2 | |
| 3 | X5,Y5 | X6,Y6 | 18 | | 2 | Entry132 | Row13 | |
| 4 | X7,Y7 | X8,Y8 | 22 | | 11 | Entry150 | Row15 | | ← Delete Horizontal Ruled Line Table

| HN | SC | EC |
|---|---|---|
| 4 | Xh1,Yh1 | Xh2,Yh2 |
| 5 | Xh3,Yh3 | Xh4,Yh4 |
| 6 | Xh3,Yh3 | Xh4,Yh4 |

FIG. 49

Ruled Line Entry Table

| RN | SC | EC | GN | BN | LN | RO | ULN | LLN | LVN | RVN | URN | LRN | ERN | RRN | IN |
|---|---|---|---|---|---|---|---|---|---|---|---|---|---|---|---|
| 158 | X1,Y1 | X2,Y2 | 4 |  |  |  |  | 23 | 24 | 18 | 19 |  |  |  |  |
| 159 | X3,Y3 | X4,Y2 | 4 |  | 5 |  | 23 | 24 | 19 | 20 |  |  |  |  |  |
| 160 | X1,Y1 | X2,Ya | 4 |  | 5 |  |  | 24 | 25 | 18 | 19 |  |  |  |  |
| 161 | X3,Y3 | X4,Ya | 4 |  | 6 |  | 24 | 25 | 19 | 20 |  |  |  |  |  |
| 162 | Xa,Ya | Xb,Yb | 4 |  | 7 |  | 25 | 26 | 18 | 19 |  |  |  |  |  |

FIG. 50

Logical Row Table

| LN | SC | EC | GN | BN | BIN | LL | ULN | LLN | ELN | RRN | HLA |
|---|---|---|---|---|---|---|---|---|---|---|---|
| 5 | X1,Y1 | X2,Y2 | 2 | | | 2 | 23 | 24 | 18 | 20 | Entry158 |
| 6 | X3,Y3 | X4,Y4 | 2 | | | 2 | 23 | 24 | 18 | 20 | Entry160 |

Group Table

| GN | SC | EC | RIN | BLN | LR | HLA | HRA | HBA |
|---|---|---|---|---|---|---|---|---|
| 1 | X1,Y1 | X2,Y2 | 5 | | 1 | Entry1 | Row1 | |
| 2 | X3,Y3 | X4,Y4 | 126 | | 11 | Entry6 | Row2 | |
| 3 | X5,Y5 | X6,Y6 | 18 | | 2 | Entry132 | Row13 | |
| 4 | X7,Y7 | X8,Y8 | 22 | | 11 | Entry150 | Row15 | |

FIG. 52

Ruled Line Entry Table

| RN | SC | EC | GN | BN | LN | RO | ULN | LLV | LVN | RVN | URN | LRN | ERN | RRN | IN |
|---|---|---|---|---|---|---|---|---|---|---|---|---|---|---|---|
| 1 | X1,Y1 | X2,Y2 | 1 | 1 | 1 | 1 | 1 | 3 | 1 | 2 | | | | | |
| 2 | X3,Y3 | X4,Y4 | 1 | 1 | 1 | 1 | 1 | 2 | 2 | 3 | | | | | |
| 6 | Xa,Ya | Xb,Yb | 2 | 1 | 1 | 1 | 4 | 5 | 5 | 6 | | | | | |
| 10 | Xc,Yc | Xd,Yd | 3 | 1 | 1 | 1 | 6 | 7 | 8 | 10 | 11 | | | | |

Logical Row Table

| LN | SC | EC | GN | BN | RIN | LL | ULN | LLN | ELN | RRN | HLA |
|---|---|---|---|---|---|---|---|---|---|---|---|
| 1 | X1,Y1 | X2,Y2 | 1 | 1 | 5 | 2 | 1 | 3 | 1 | 4 | Entry1 |
| 1 | Xa,Ya | Xb,Yb | 3 | 1 | 7 | 5 | 6 | 8 | 8 | 7 | Entry10 |
| 2 | Xc,Yc | Xd,Yd | 3 | 2 | 14 | 14 | 8 | 9 | 8 | 7 | Entry17 |

FIG. 53

Block Table

| BN | SC | EC | GN | RIN | LN | RO | HRA | HAA | ULN | LLN | LVN | RVN |
|----|----|----|----|-----|----|----|-----|-----|-----|-----|-----|-----|
| 1 | X1,Y1 | X2,Y2 | 1 | 5 | 1 | | Entry1 | | 1 | 3 | 1 | 4 |
| 1 | X1,Y1 | X2,Y2 | 2 | 4 | 2 | | Entry2 | | 4 | 6 | 5 | 7 |
| 1 | X3,Y3 | X4,Y4 | 3 | 7 | 1 | | Entry4 | | 6 | 8 | 8 | 7 |
| 2 | X5,Y5 | X6,Y6 | 3 | 140 | 10 | | Entry5 | | 8 | 18 | 8 | 7 |
| 1 | X7,Y7 | X8,Y8 | 4 | 20 | 2 | | Entry15 | | 18 | 20 | 12 | 7 |

Group Table

| GN | SC | EC | RIN | BLN | ER | HLA | HRA | HBA |
|----|----|----|-----|-----|----|-----|-----|-----|
| 1 | X1,Y1 | X2,Y2 | 5 | 1 | 1 | Entry1 | Row1 | Block1 |
| 2 | X3,Y3 | X4,Y4 | 4 | 1 | 2 | Entry6 | Row2 | Block2 |
| 3 | X5,Y5 | X6,Y6 | 147 | 2 | 11 | Entry10 | Row4 | Block3 |
| 4 | X7,Y7 | X8,Y8 | 20 | 1 | 2 | Entry15 | Row15 | Block5 |

FIG. 54

|   | Block A | Block B | | Block C |
|---|---|---|---|---|
| (l0) | 45 | 59 | 60 | 85 |
| (l1) | 46 | 61 | 62 | 86 |
| (l2) | 47 | 63 | | 87 |
| (l4) | 48 | 64 | (l3) | 88 |
| (l5) | 49 | 65 | 66 | 89 |

FIG. 56

Ruled Line Entry Table

| RN | SC | EC | GN | BN | LN | RO | ULN | LLN | LVN | RVN | URN | LRN | ERN | RRN | IN |
|----|----|----|----|----|----|----|-----|-----|-----|-----|-----|-----|-----|-----|----|
| 47 | X1,Y1 | X2,Y2 | 3 | 2 | 3 | | 10 | 11 | 10 | 11 | | | | | |
| 48 | X3,Y3 | X4,Y4 | 3 | 2 | 3 | | 10 | 11 | 11 | 12 | | | | | |
| 59 | X5,Y5 | X6,Y6 | 3 | 3 | 1 | | 11 | 12 | 8 | 9 | | | | | |
| 60 | X7,Y7 | X8,Y8 | 3 | 3 | 1 | | 12 | 14 | 8 | 9 | | | | | |
| 61 | Xa,Ya | Xb,Yb | 3 | 3 | 1 | | 11 | 12 | 9 | 10 | | | | | |
| 62 | Xc,Yc | Xd,Yd | 3 | 3 | 1 | | 12 | 14 | 9 | 10 | | | | | |
| 63 | Xe,Ye | Xf,Yf | 3 | 3 | 1 | | 11 | 14 | 10 | 11 | | | | | |
| 64 | Xg,Yg | Xh,Yh | 3 | 3 | 1 | | 11 | 14 | 11 | 12 | | | | | |

Logical Row Table

| LN | SC | EC | GN | BN | RIN | LL | ULN | LLN | ERN | RRN | HLA |
|----|----|----|----|----|-----|----|-----|-----|-----|-----|-----|
| 3 | Xa,Ya | Xb,Yb | 3 | 2 | 14 | 14 | 10 | 11 | 8 | 7 | Entry 45 |
| 1 | Xc,Yc | Xd,Yd | 3 | 3 | 26 | 14 | 11 | 14 | 8 | 7 | Entry 59 |
| 1 | Xe,Ye | Xf,Yf | 3 | 4 | 14 | 14 | 14 | 15 | 8 | 7 | Entry 87 |

FIG. 57

Block Table

| BN | SC | EC | GN | RIN | LN | RO | HRA | HAA | ULN | LLN | LVN | RVN |
|---|---|---|---|---|---|---|---|---|---|---|---|---|
| 1 | X1,Y1 | X2,Y2 | 3 | 7 | 1 | | Row1 | | 6 | 8 | 8 | 7 |
| 2 | X3,Y3 | X4,Y4 | 3 | 42 | 3 | | Row2 | | 8 | 11 | 8 | 7 |
| 3 | X5,Y5 | X6,Y6 | 3 | 26 | 1 | | Row5 | | 11 | 14 | 8 | 7 |
| 4 | X7,Y7 | X8,Y8 | 3 | 70 | 5 | | Row6 | | 15 | 19 | 8 | 7 |

Group Table

| GN | SC | EC | RIN | BLN | ER | HLA | HRA | HBA |
|---|---|---|---|---|---|---|---|---|
| 3 | X5,Y5 | X6,Y6 | 145 | 4 | 10 | Entry 10 | Row 4 | Block 3 |

FIG. 58

Ruled Line Entry Table

| RN | SC | EC | GN | BN | LN | RO | ULN | LLN | LVN | RVN | URN | LRN | ERN | RRN | IN |
|----|----|----|----|----|----|----|-----|-----|-----|-----|-----|-----|-----|-----|-----|
| 59 | X5,Y5 | X6,Y6 | 3 | 2 | 4 | | 11 | 12 | 8 | 9 | | | | | |
| 61 | Xa,Ya | Xb,Yb | 3 | 2 | 4 | | 11 | 12 | 9 | 10 | | | | | |
| 63 | Xe,Ye | Xf,Yf | 3 | 2 | 4 | | 11 | 12 | 10 | 11 | | | | | |
| 64 | Xg,Yg | Xh,Yh | 3 | 2 | 4 | | 11 | 12 | 11 | 12 | | | | | |
| 65 | Xi,Yi | Xj,Yj | 3 | 2 | 4 | | 11 | 12 | 12 | 13 | | | | | |
| 60 | X7,Y7 | X8,Y8 | 3 | 2 | 5 | | 12 | 14 | 8 | 9 | | | | | |
| 62 | Xc,Yc | Xd,Yd | 3 | 2 | 5 | | 12 | 14 | 9 | 10 | | | | | |
| 177 | Xk,Yk | Xl,Yl | 3 | 2 | 5 | | 12 | 14 | 10 | 11 | | | | | |
| 178 | Xm,Ym | Xn,Yn | 3 | 2 | 5 | | 12 | 14 | 11 | 12 | | | | | |
| 66 | Xo,Yo | Xp,Yp | 3 | 2 | 5 | | 12 | 14 | 12 | 13 | | | | | |
| 87 | Xq,Yq | Xr,Yr | 3 | 2 | 6 | | 14 | 15 | 8 | 9 | | | | | |
| 88 | Xs,Ys | Xt,Yt | 3 | 2 | 6 | | 14 | 15 | 9 | 10 | | | | | |

FIG. 59

Logical Row Table

| LN | SC | EC | GN | BN | RIN | LL | ULN | LLN | ERN | RRN | HLA |
|---|---|---|---|---|---|---|---|---|---|---|---|
| 4 | X1,Y1 | X2,Y2 | 3 | 2 | 14 | 14 | 11 | 12 | 8 | 7 | Entry 59 |
| 5 | X3,Y3 | X4,Y4 | 3 | 2 | 14 | 14 | 12 | 14 | 8 | 7 | Entry 60 |
| 6 | X5,Y5 | X6,Y6 | 3 | 2 | 14 | 14 | 15 | 15 | 8 | 7 | Entry 85 |
| 7 | X7,Y7 | X8,Y8 | 3 | 2 | 14 | 14 | 15 | 16 | 8 | 7 | Entry 99 |

Block Table

| BN | SC | EC | GN | RIN | LN | RO | HRA | HAA | ULN | LLN | LVN | RVN |
|---|---|---|---|---|---|---|---|---|---|---|---|---|
| 2 | X1,Y1 | X2,Y2 | 3 | 140 | 10 | | Row2 | | 8 | 19 | 8 | 7 |
| 3 | X3,Y3 | X4,Y4 | 3 | 26 | 1 | | Row5 | | 11 | 14 | 8 | 7 |
| 4 | X5,Y5 | X6,Y6 | 3 | 70 | 5 | | Row6 | | 15 | 19 | 8 | 7 |

FIG. 60

Group Table

| GN | SC | EC | RIN | BLN | ER | HLA | HRA | HBA |
|---|---|---|---|---|---|---|---|---|
| 3 | X5,Y5 | X6,Y6 | 147 | 2 | 10 | Entry10 | Row4 | Block3 |

Horizontal Ruled Line Table

| HN | SC | EC |
|---|---|---|
| 12 | X1,Y1 | X2,Y2 |
| ~~13~~ | ~~X3,Y3~~ | ~~X4,Y4~~ |

FIG. 63

Ruled Line Entry Table

| RN | SC | EC | GN | BN | LN | RO | ULN | LLV | LVN | RVN | URN | LRN | ERN | RRN | IN |
|---|---|---|---|---|---|---|---|---|---|---|---|---|---|---|---|
| 45 | X1,Y1 | X2,Y2 | 3 | 2 | 3 | | 10 | 11 | 8 | 9 | | | | | |
| 46 | X3,Y3 | X4,Y4 | 3 | 2 | 3 | | 10 | 11 | 9 | 10 | | | | | |
| ⋮ | | | | | | | | | | | | | | | |
| 59 | X5,Y5 | X6,Y6 | 3 | 3 | 1 | | 11 | 12 | 8 | 9 | | | | | |
| 60 | X7,Y7 | X8,Y8 | 3 | 3 | 1 | | 11 | 12 | 9 | 10 | | | | | |
| 61 | Xa,Ya | Xb,Yb | 3 | 3 | 1 | | 11 | 12 | 10 | 11 | | | | | |
| ⋮ | | | | | | | | | | | | | | | |
| 73 | Xc,Yc | Xd,Yd | 3 | 3 | 2 | | 12 | 13 | 8 | 9 | | | | | |
| 74 | Xe,Ye | Xf,Yf | 3 | 3 | 2 | | 12 | 13 | 9 | 10 | | | | | |
| 75 | Xg,Yg | Xh,Yh | 3 | 3 | 2 | | 12 | 13 | 10 | 11 | | | | | |

FIG. 64

Logical Row Table

| LN | SC | EC | GN | BN | RIN | LL | OLN | LLN | ERN | RRN | HLA |
|---|---|---|---|---|---|---|---|---|---|---|---|
| 3 | Xa,Ya | Xb,Yb | 3 | 2 | 14 | 14 | 10 | 11 | 8 | 7 | Entry45 |
| 1 | Xc,Yc | Xd,Yd | 3 | 3 | 14 | 14 | 11 | 12 | 8 | 7 | Entry59 |
| 2 | Xe,Ye | Xf,Yf | 3 | 3 | 14 | 14 | 12 | 13 | 8 | 7 | Entry73 |

Block Table

| BN | SC | EC | GN | RIN | LN | RO | HRA | HAA | ULN | LLN | LVN | RVN |
|---|---|---|---|---|---|---|---|---|---|---|---|---|
| 1 | X1,Y1 | X2,Y2 | 3 | 7 | 1 | | Row1 | | 6 | 8 | 8 | 7 |
| 2 | X3,Y3 | X4,Y4 | 3 | 42 | 3 | | Row2 | | 8 | 11 | 8 | 7 |
| 3 | X5,Y5 | X6,Y6 | 3 | 28 | 2 | | Row5 | | 11 | 13 | 8 | 7 |
| 4 | X7,Y7 | X8,Y8 | 3 | 84 | 6 | | Row6 | | 13 | 19 | 8 | 7 |

Group Table

| GN | SC | EC | RIN | BLN | ER | HLA | HRA | HBA |
|---|---|---|---|---|---|---|---|---|
| 3 | X5,Y5 | X6,Y6 | 161 | 4 | 12 | Entry10 | Row4 | Block3 |

FIG. 65

Ruled Line Entry Table

| RN | SC | EC | GN | BN | LN | RO | ULN | LLV | LVN | RVN | URN | LRN | ERN | RRN | IN |
|---|---|---|---|---|---|---|---|---|---|---|---|---|---|---|---|
| 45 | X1,Y1 | X2,Y2 | 3 | 2 | 3 | | 10 | 11 | 8 | 9 | | | | | |
| 46 | X3,Y3 | X4,Y4 | 3 | 2 | 3 | | 10 | 11 | 9 | 10 | | | | | |
| 59 | X5,Y5 | X6,Y6 | 3 | 2 | 4 | | 11 | 13 | 8 | 9 | | | | | |
| 60 | X7,Y7 | X8,Y8 | 3 | 2 | 4 | | 11 | 13 | 9 | 10 | | | | | |
| 61 | Xa,Ya | Xb,Yb | 3 | 2 | 4 | | 11 | 13 | 10 | 11 | | | | | |
| 73 | X5,Y5 | X6,Y6 | 3 | 3 | 2 | | 12 | 13 | 8 | 9 | | | | | |
| 74 | X7,Y7 | X8,Y8 | 3 | 3 | 2 | | 12 | 13 | 9 | 10 | | | | | |
| 75 | Xa,Ya | Xb,Yb | 3 | 3 | 2 | | 12 | 13 | 10 | 11 | | | | | |

FIG. 66

Logical Row Table

| LN | SC | EC | GN | BN | RIN | LL | UIN | LLN | ERN | RRN | HLA |
|---|---|---|---|---|---|---|---|---|---|---|---|
| 3 | Xa,Ya | Xb,Yb | 3 | 2 | 14 | 14 | 10 | 11 | 8 | 7 | Entry45 |
| 4 | Xc,Yc | Xd,Yd | 3 | 2 | 14 | 14 | 11 | 13 | 8 | 7 | Entry59 |
| 5 | Xe,Ye | Xf,Yf | 3 | 2 | 14 | 14 | 12 | 13 | 8 | 7 | Entry73 |

Block Table

| BN | SC | EC | GN | RIN | LN | RO | HRA | HAA | ULN | LLN | LVN | RVN |
|---|---|---|---|---|---|---|---|---|---|---|---|---|
| 1 | X1,Y1 | X2,Y2 | 3 | 7 | 1 | Row1 | | 6 | 8 | 8 | 7 |
| 2 | X3,Y3 | X4,Y4 | 3 | 140 | 10 | Row2 | | 8 | 19 | 8 | 7 |
| 3 | X5,Y5 | X6,Y6 | 3 | 28 | 2 | Row5 | | 11 | 13 | 8 | 7 |
| 4 | X7,Y7 | X8,Y8 | 3 | 34 | 6 | Row6 | | 13 | 19 | 8 | 7 |

FIG. 67

Group Table

| GN | SC | EC | RIN | BLN | ER | HLA | HRA | HBA |
|---|---|---|---|---|---|---|---|---|
| 3 | X5,Y5 | X6,Y6 | 147 | 2 | 11 | Entry10 | Row4 | Block3 |

Horizontal Ruled Line Table

| HN | SC | EC |
|---|---|---|
| 11 | X1,Y1 | X2,Y2 |
| 12 | ~~X3,Y3~~ | ~~X4,Y4~~ |

FIG. 69

Ruled Line Entry Table

| RN | SC | EC | GN | BN | LN | RO | ORN | LRN | ERN | RRN | IN | HAA |
|----|------|------|----|----|----|----|-----|-----|-----|-----|----|-----|
| 10 | X1,Y1 | X2,Y2 | 3 | 1 | 1 | 1 |  | 11 |  |  |  | Entry11 |
| 11 | X3,Y3 | X4,Y4 | 3 | 1 | 1 | 1 | 10 |  |  | 12 |  | Entry12 |
| 12 | X5,Y5 | X6,Y6 | 3 | 1 | 1 | 1 |  |  | 11 |  |  | Entry17 |
| 17 | X7,Y7 | X8,Y8 | 3 | 2 | 1 | 1 |  |  |  |  | ON | Entry18 |
| 18 | Xa,Ya | Xb,Yb | 3 | 2 | 1 | 1 |  |  |  |  | ON | Entry31 |
| 19 | Xc,Yc | Xd,Yd | 3 | 2 | 1 | 2 |  |  |  |  |    | Entry33 |
| 31 | Xe,Ye | Xf,Yf | 3 | 2 | 2 | 1 |  |  |  |  | ON | Entry32 |
| 32 | Xg,Yg | Xh,Yh | 3 | 2 | 2 | 1 |  |  |  |  | ON | Entry45 |
| 45 | Xi,Yi | Xj,Yj | 3 | 2 | 2 | 1 |  |  |  |  | ON | Entry46 |
| 46 | Xk,Yk | Xl,Yl | 3 | 2 | 2 | 1 |  |  |  |  | ON | Entry59 |

| RN | INF | KN | CRN | RLN |
|----|-----|----|----|-----|
| 17 | ON | 0 |  | 0 |
| 18 | ON | 0 |  | 1 |

FIG. 70

Logical Row Table

| LN | SC | EC | GN | BN | RIN | LL | ULN | LLN | ELN | RRN | HLA |
|----|----|----|----|----|-----|----|-----|-----|-----|-----|-----|
| 1 | X1,Y1 | X2,Y2 | 1 | 1 | 5 | 2 | 1 | 3 | 1 | 4 | Entry1 |
| 1 | Xa,Ya | Xb,Yb | 3 | 1 | 7 | 5 | 6 | 8 | 8 | 7 | Entry10 |
| 2 | Xc,Yc | Xd,Yd | 3 | 2 | 14 | 5 | 8 | 9 | 8 | 7 | Entry17 |

Logical Column Table

| RO | SC | EC | GN | BN | RIN | ULN | LLN | ELN | RRN | HLA |
|----|----|----|----|----|-----|-----|-----|-----|-----|-----|
| 1 | X1,Y1 | X2,Y2 | 1 | 1 | 1 | 1 | 3 | 1 | 2 | Entry1 |
| 1 | X3,Y3 | X4,Y4 | 3 | 1 | 23 | 6 | 18 | 8 | 10 | Entry10 |
| 2 | X5,Y5 | X6,Y6 | 3 | 1 | 11 | 6 | 18 | 10 | 11 | Entry13 |

FIG. 71

Block Table

| BN | SC | EC | GN | RIN | LN | RO | HRA | HAA | ULN | LLN | LVN | RVN |
|---|---|---|---|---|---|---|---|---|---|---|---|---|
| 1 | X1,Y1 | X2,Y2 | 1 | 5 | 1 | 3 | Row1 | Column1 | 1 | 3 | 1 | 4 |
| 1 | X1,Y1 | X2,Y2 | 2 | 4 | 2 | 2 | Row2 | Column4 | 4 | 6 | 5 | 7 |
| 1 | X3,Y3 | X4,Y4 | 3 | 7 | 1 | 5 | Row4 | Column6 | 6 | 8 | 8 | 7 |
| 2 | X5,Y5 | X6,Y6 | 3 | 140 | 10 | 5 | Row5 | | 8 | 18 | 8 | 7 |
| 1 | X7,Y7 | X8,Y8 | 4 | 20 | 2 | 10 | Row15 | Column11 | 18 | 20 | 12 | 7 |

FIG. 73

Ruled Line Entry Table

| RN | SC | EC | GN | BN | LN | RO | INF | KN | CRN | RLN | AN | HAA |
|----|----|----|----|----|----|----|----|----|----|----|----|----|
| 16 | X1,Y1 | X2,Y2 | 3 | 2 | 1 | 5 | | | | | | |
| 22 | X3,Y3 | X4,Y4 | 3 | 2 | 1 | 5 | ON | 0 | 0 | 0 | 23 | Entry22 |
| 23 | X5,Y5 | X6,Y6 | 3 | 2 | 1 | 5 | ON | 0 | 0 | 1 | 24 | Entry23 |
| 24 | X7,Y7 | X8,Y8 | 3 | 2 | 1 | 5 | ON | 0 | 0 | 2 | 25 | Entry24 |
| 25 | Xa,Ya | Xb,Yb | 3 | 2 | 1 | 5 | ON | 0 | 0 | 3 | 26 | Entry25 |
| 26 | Xc,Yc | Xd,Yd | 3 | 2 | 1 | 5 | ON | 0 | 0 | 4 | 27 | Entry26 |
| 27 | Xe,Ye | Xf,Yf | 3 | 2 | 1 | 5 | ON | 0 | 0 | 5 | 28 | Entry27 |
| 28 | Xg,Yg | Xh,Yh | 3 | 2 | 1 | 5 | ON | 0 | 0 | 6 | 29 | Entry28 |
| 29 | Xi,Yi | Xj,Yj | 3 | 2 | 1 | 5 | ON | 0 | 0 | 7 | 30 | Entry29 |
| 30 | Xk,Yk | Xl,Yl | 3 | 2 | 1 | 5 | ON | 0 | 0 | 8 | 0 | Entry30 |
| 36 | Xm,Ym | Xn,Yn | 3 | 2 | 2 | 5 | ON | 0 | 0 | 0 | 37 | Entry36 |
| 37 | Xo,Yo | Xp,Yp | 3 | 2 | 2 | 5 | ON | 0 | 0 | 0 | 38 | Entry37 |
|    |       |       |   |   |   |   |    |   |   |   |    | Entry38 |

FIG. 75

Ruled Line Entry Table

| RN | GN | BN | IN | RO | URN | LRN | ERN | RRN | INF | KN | CRN | RLN | AN | HAA |
|---|---|---|---|---|---|---|---|---|---|---|---|---|---|---|
| 1 | 1 | 1 | 1 | 1 | | | | | | | | | | |
| 2 | 1 | 1 | 1 | 1 | 1 | 2 | | | ON | 0 | 2 | 0 | 0 | Entry2 |
| 3 | 1 | 1 | 1 | 1 | 1 | 4 | | 3 | ON | 1 | 4 | 0 | 0 | Entry3 |
| 4 | 1 | 1 | 1 | 1 | 2 | 5 | 2 | | ON | 1 | 5 | 1 | 0 | Entry4 |
| 5 | 1 | 1 | 1 | 1 | | | | 5 | ON | 2 | 0 | 0 | 0 | Entry5 |
|   | 1 | 1 | 1 | 1 | 3 | | 4 | 0 | ON | 2 | 0 | 1 | 0 | |

IN = {INF, KN, CRN, RLN, AN}

Logical Row Table

| LN | SC | EC | GN | BN | RIN | LL | ULN | LLN | ELN | RRN | HLA |
|---|---|---|---|---|---|---|---|---|---|---|---|
| 1 | X1,Y1 | X2,Y2 | 1 | 1 | 5 | 1 | 1 | 3 | 1 | 4 | Entry1 |

FIG. 76

Logical Column Table

| RO | SC | EC | GN | BN | RIN | ULN LLN | ELN | RRN | HLA |
|----|----|----|----|----|----|----|----|----|----|
| 1 | X1,Y1 | X2,Y2 | 1 | 1 | 5 | 1 | 3 | 1 | 4 | Entry1 |
| 2 | X3,Y3 | X4,Y4 | 1 | 1 | 2 | 6 | 18 | 8 | 10 | Entry10 |
| 3 | X5,Y5 | X6,Y6 | 1 | 1 | 2 | 6 | 18 | 10 | 11 | Entry13 |

Block Table

| BN | SC | EC | GN | RIN | LN | RO | HRA | HAA | ULN LLN LVN RYN |
|----|----|----|----|----|----|----|----|----|----|
| 1 | X1,Y1 | X2,Y2 | 1 | 5 | 1 | 1 | Row1 | Column1 | 1 | 3 | 1 | 4 |

FIG. 78

Block Table

| BN | SC | EC | GN | RIN | LN | RO | HRA | HAA | BZ |
|---|---|---|---|---|---|---|---|---|---|
| 1 | X1,Y1 | X2,Y2 | 1 | 5 | 1 | 3 | Row1 | Column1 | 0 |
| 1 | X1,Y1 | X2,Y2 | 2 | 4 | 2 | 2 | Row2 | Column4 | 0 |
| 1 | X3,Y3 | X4,Y4 | 3 | 7 | 1 | 5 | Row4 | Column6 | 1 |
| 2 | X5,Y5 | X6,Y6 | 3 | 140 | 10 | 5 | Row5 | | 2 |
| 1 | X7,Y7 | X8,Y8 | 4 | 20 | 2 | 10 | Row15 | Column11 | 3 |

FIG. 80

Ruled Line Entry Table

| RN | GN | BN | IN | RO | INF | KN | CRN | RLN | AN | MF | HAA |
|---|---|---|---|---|---|---|---|---|---|---|---|
| 1 | 1 | 1 | 1 | 1 | ON | 0 | 2 | 0 | 0 | 1 | Entry2 |
| 2 | 1 | 1 | 1 | 1 | ON | 1 | 4 | 0 | 0 | 1 | Entry3 |
| 3 | 1 | 1 | 1 | 1 | ON | 1 | 5 | 1 | 0 | 1 | Entry4 |
| 4 | 1 | 1 | 1 | 1 | ON | 2 | 0 | 0 | 0 | 1 | Entry5 |
| 5 | 1 | 1 | 1 | 1 | ON | 2 | 0 | 1 | 0 | 1 | |
| 6 | 2 | 1 | 1 | 1 | | | | | | 1 | Entry8 |
| 7 | 2 | 1 | 1 | 2 | | | | | | 0 | Entry9 |
| 8 | 2 | 1 | 2 | 1 | | | | | | 1 | |
| 9 | 2 | 1 | 2 | 2 | | | | | | 0 | |
| 10 | 3 | 1 | 1 | 1 | ON | 0 | 11 | 0 | 0 | 1 | Entry11 |
| 17 | 3 | 2 | 1 | 1 | ON | 0 | 0 | 0 | 0 | 1 | Entry18 |
| 18 | 3 | 2 | 1 | 1 | ON | 0 | 0 | 1 | 0 | 1 | Entry31 |
| 157 | 4 | 1 | 1 | 1 | | | | | | 1 | Entry167 |
| 158 | 4 | 1 | 1 | 2 | ON | 0 | 0 | 0 | 159 | 1 | Entry159 |

FIG. 82

Ruled Line Entry Table

| RN | GN | BN | IN | RO | INF | CC | CF | HAA |
|----|----|----|----|----|-----|----|----|-----|
| 1 | 1 | 1 | 1 | 1 | 1 | Kanji | Type-face | Entry2 |
| 2 | 1 | 1 | 1 | 1 | 1 | Kana | Type-face | Entry2 |
| 3 | 1 | 1 | 1 | 1 | 1 | | | Entry4 |
| 4 | 1 | 1 | 1 | 1 | 1 | Kanji | Type-face | Entry5 |
| 5 | 1 | 1 | 1 | 1 | 1 | | | |
| 6 | 2 | 1 | 1 | 1 | 1 | Kanji | Type-face | Entry8 |
| 7 | 2 | 1 | 1 | 2 | 0 | | | Entry9 |
| 8 | 2 | 1 | 2 | 1 | 1 | Kanji | Type-face | |
| 9 | 2 | 1 | 2 | 2 | 0 | | | |
| 10 | 3 | 1 | 1 | 1 | 1 | Kanji | Type-face | Entry11 |
| 11 | 3 | 1 | 1 | 1 | 1 | Kanji | Type-face | Entry11 |
| 12 | 3 | 1 | 1 | 1 | 1 | Kanji | Type-face | Entry11 |
| ~ | | | | | | | | ~ |
| 17 | 3 | 2 | 1 | 1 | 1 | Kanji | Type-face | Entry18 |
| 18 | 3 | 2 | 1 | 1 | 1 | | | Entry31 |
| ~ | | | | | | | | ~ |
| 157 | 4 | 1 | 1 | 1 | 1 | Numeral | Hand Written | Entry167 |
| 158 | 4 | 1 | 1 | 2 | 1 | | | Entry159 |

FIG. 84

Ruled Line Entry Table

| RN | GN | BN | IN | RO | INF | CC | CF | HAA |
|---|---|---|---|---|---|---|---|---|
| 1 | 1 | 1 | 1 | 1 | 1 | Kanji | Type-face | Entry2 |
| 2 | 1 | 1 | 1 | 1 | 1 | Kana | Type-face | Entry3 |
| 3 | 1 | 1 | 1 | 1 | 1 | Kana | Type-face | Entry4 |
| 4 | 1 | 1 | 1 | 1 | 1 | Kanji | Type-face | Entry5 |
| 5 | 1 | 1 | 1 | 1 | 1 | Kanji | Type-face | |
| 6 | 2 | 1 | 1 | 1 | 1 | Kanji | Type-face | Entry8 |
| 7 | 2 | 1 | 1 | 2 | 0 | Kanji | Type-face | Entry9 |
| 8 | 2 | 1 | 2 | 1 | 1 | Kanji | Type-face | |
| 9 | 2 | 1 | 2 | 2 | 0 | Kanji | Type-face | |
| 10 | 3 | 1 | 1 | 1 | 1 | Kanji | Type-face | Entry11 |
| 11 | 3 | 1 | 1 | 1 | 1 | Kanji | Type-face | Entry11 |
| 12 | 3 | 1 | 1 | 1 | 1 | Kanji | Type-face | Entry11 |
| 17 | 3 | 2 | 1 | 1 | 1 | Kanji | Type-face | Entry18 |
| 18 | 3 | 2 | 1 | 1 | 1 | Kanji | Type-face | Entry31 |
| 157 | 4 | 1 | 1 | 1 | 1 | Numeral | Hand Written | Entry167 |
| 158 | 4 | 1 | 1 | 2 | 1 | Numeral | Hand Written | Entry159 |

FORMAT RECOGNITION METHOD, APPARATUS AND STORAGE MEDIUM

BACKGROUND OF THE INVENTION

1. Field of the Invention

The present invention relates to a format recognition method, an apparatus and a storage medium thereof for recognizing the format of a form in order to identify characters on the form, and in particular to a format recognition method, an apparatus and a storage medium for automatically analyzing the structure of a chart on a form and for determining the attributes of individual entries constituting the chart.

2. Related Arts

A character recognition method for identifying characters on a form is employed for the automatic input of data. According to this method, an image at a designated position on the form is obtained for character recognition.

To identify characters on the form, the attribute of the character, such as the data name (field identifier) of a character and a character type, must be defined.

FIG. 87 is a diagram for explaining the prior art.

In FIG. 87, shown as an example form is a money transfer application. The money transfer application includes entries for a "Transfer destination," a "Bank name" and a "Branch office name." In order for these entries to be automatically recognized, the attributes of each entry, such as a field ID (data name), the start position, the end position, the number of digits and a recognition category (character type), must be defined. Conventionally, for registration, an operator enters this definition information for each form.

However, in the prior art, the definition information must be registered in advance to reading, so that character recognition is available only for a form for which the definition information has previously been registered. And for the automatic input of money transfer information at a financial facility, for example, various formats are employed for a money transfer application used by a company. Therefore, a great deal of labor is required to prepare definition information for each form in advance.

Further, even when the definition information for a form has been registered, it must be changed if the format of the form is altered.

SUMMARY OF THE INVENTION

It is, therefore, one objective of the present invention to provide a format recognition method, an apparatus and a storage medium for automatically identifying definition information provided as individual entries on a form.

It is another objective of the present invention to provide a format recognition method, an apparatus and a storage medium for determining the attributes of the smallest rectangles on a form, and for identifying data recorded on the form.

To achieve the above objectives, according to one aspect of the present invention, a format recognition method for identifying the structure of a chart on a form comprises the steps of:

extracting vertical ruled lines and horizontal ruled lines on the form, and the smallest rectangles formed by the ruled lines employing an image of the form;

analyzing the chart structure of the form employing the physical arrangement of the smallest rectangles; and determining attributes for the smallest rectangles employing the resultant chart structure.

According to this invention, the smallest rectangles for the chart structure are extracted and the physical arrangement of the smallest rectangles is detected. The chart structure is then analyzed by using the physical arrangement of the smallest rectangles, and the attributes of the smallest rectangles are determined. Since the attributes for the smallest rectangles are determined by detecting their physical arrangements, the analyzation of the structure of the chart on the form can be performed automatically.

Therefore, the registration in advance of individual entries on a form is not required. Further, even when the format of the form is changed, the definition information need not be manually altered.

According to one more aspect of the present invention, the step of analyzing the chart structure includes the steps of:

extracting a relationship existing among the smallest rectangles in a row employing the positional relationship of the smallest rectangles; and extracting a relationship existing among the smallest rectangles in a column employing the positional relationship of the smallest rectangles.

According to another aspect of the present invention, the step of extracting the relationships existing among the smallest rectangles in a row includes the steps of:

employing connection relationships to sort the smallest rectangles into individual rows, each of which is constituted by the smallest rectangles which share a connection relationship; and collecting into blocks sequential rows having the same row structure. The step of extracting the relationship in a row includes a step of extracting a relationship existing among vertically connected blocks having the same row structure.

According to an additional aspect of the present invention, the step of determining the attribute includes a step of determining, as a data portion, a block having the maximum number of rows, and of determining, as a headline portion, blocks positioned above and under the block.

According to a further aspect of the present invention, the step of determining the attributes includes the steps of:

determining the attributes of the headline portion by identifying characters in the headline portions; and determining the attributes for the data portion by using the attributes for the headline portion.

According to one further aspect of the present invention, the step of analyzing the chart structure includes the steps of:

employing the connection relationships existing among the smallest rectangles to sort into groups the smallest rectangles which are connected;

sorting the groups for the individual elements of a chart; and analyzing the relationships existing among rows and columns of the smallest rectangles for the individual elements in the chart.

According to yet one more aspect of the present invention, the step of analyzing the relationships existing along rows and columns of the smallest rectangles includes the steps of:

analyzing the smallest rectangles for relationships existing along the rows; and analyzing the smallest rectangles for relationships existing along the columns.

According to yet another aspect of the present invention, the step of analyzing the smallest rectangles for the relationships existing along the rows includes a step of:

analyzing the nested structure of a row constituted by the smallest rectangles, and storing nesting information for the smallest rectangles.

According to yet an additional aspect of the present invention, the step of analyzing the chart structure includes the steps of:

extracting chart structures for the individual elements; and combining elements having the same chart structure.

According to yet a further aspect of the present invention, the step of analyzing the chart structure includes steps of:

extracting the chart structures for the elements; and employing the chart structures for the elements to recover ruled lines in the elements.

According to yet one further aspect of the present invention, the step of analyzing the relationships existing along the rows includes the steps of:

employing the structures of individual rows to detect all strikeout lines entered in rows; and deleting the strikeout lines to determine the relationships existing along the rows.

According to still one more aspect of the present invention, the step of analyzing the chart structure includes steps of:

detecting whether the smallest rectangles are contiguous; and combining the contiguous, smallest rectangles to form a single rectangle.

BRIEF DESCRIPTION OF THE DRAWINGS

FIGS. 6A to 6C are diagrams for explaining a ruled line extraction process in FIG. 4;

FIG. 7 is a diagram for explaining a group extraction process in FIG. 4;

FIG. 8 is a diagram for explaining the connection relationship for the group extraction process in FIG. 7;

FIG. 9 is a diagram for explaining the process for sorting chart elements in FIG. 4;

FIG. 11 is a diagram for explaining the logical row sorting process in FIG. 10;

FIGS. 12A and 12B are diagrams for explaining a nested extraction process in FIG. 10;

FIGS. 19A and 19B are diagrams for explaining a columnar nested extraction process in FIG. 18;

FIG. 24 is a diagram for explaining a headline recognition process in FIG. 5;

FIG. 25 is a diagram for explaining a headline word dictionary in FIG. 5;

FIG. 27 is a diagram for explaining a horizontal ruled line table in FIG. 26;

FIG. 28 is a diagram for explaining a vertical ruled line table in FIG. 26;

FIG. 29 is a diagram for explaining a ruled line entry table in FIG. 26;

FIG. 33 is a diagram for explaining the updating of a table in FIG. 32;

FIG. 36 is a diagram (I) for explaining a table after elements have been sorted in FIGS. 34 and 35;

FIG. 37 is a diagram (II) for explaining a table after elements have been sorted in FIGS. 34 and 35;

FIG. 40 is a diagram (I) for explaining a table after a logical row has been extracted;

FIG. 41 is a diagram (II) for explaining a table after a logical row has been extracted;

FIG. 43 is a diagram (I) for explaining a table for the second example form;

FIG. 44 is a diagram (II) for explaining a table for the second example form;

FIG. 45 is a diagram (I) for explaining a table after groups for the second example form have been combined;

FIG. 46 is a diagram (II) for explaining a table after groups for the second example form have been combined;

FIG. 49 is a diagram (I) for explaining a table after ruled lines have been created;

FIG. 50 is a diagram (II) for explaining a table after ruled lines have been created;

FIG. 52 is a diagram (I) for explaining a table after blocks have been sorted;

FIG. 53 is a diagram (II) for explaining a table after blocks have been sorted;

FIG. 54 is a diagram for explaining the ruled line recovery processing;

FIG. 56 is a diagram (I) for explaining a table before ruled lines have been recovered;

FIG. 57 is a diagram (II) for explaining a table before ruled lines have been recovered;

FIG. 58 is a diagram (I) for explaining a table after ruled lines have been recovered;

FIG. 59 is a diagram (II) for explaining a table after ruled lines have been recovered;

FIG. 60 is a diagram (III) for explaining a table after ruled lines have been recovered;

FIG. 63 is a diagram (I) for explaining a table before logical rows have been combined;

FIG. 64 is a diagram (II) for explaining a table before logical rows have been combined;

FIG. 65 is a diagram (I) for explaining a table after logical rows have been combined;

FIG. 66 is a diagram (II) for explaining a table after logical rows have been combined;

FIG. 67 is a diagram (III) for explaining a table after logical rows have been combined;

FIG. 69 is a diagram (I) for explaining a table after a logical column has been determined;

FIG. 70 is a diagram (II) for explaining a table after a logical column has been determined;

FIG. 71 is a diagram (III) for explaining a table after a logical column has been determined;

FIG. 73 is a diagram for explaining a table after the nesting analysis processing has been completed;

FIG. 75 is a diagram (I) for explaining a table after the nesting analysis processing has been completed;

FIG. 76 is a diagram (II) for explaining a table after the nesting analysis processing has been completed;

FIG. 78 is a diagram for explaining a table after attributes have been provided;

FIG. 80 is a diagram for explaining a table after a flag has been set;

FIG. 82 is a diagram for explaining a table after a headline has been recognized;

FIG. 84 is a diagram for explaining a table after attributes have been set up;

DETAILED DESCRIPTION OF THE PREFERRED EMBODIMENT

Figure 1:
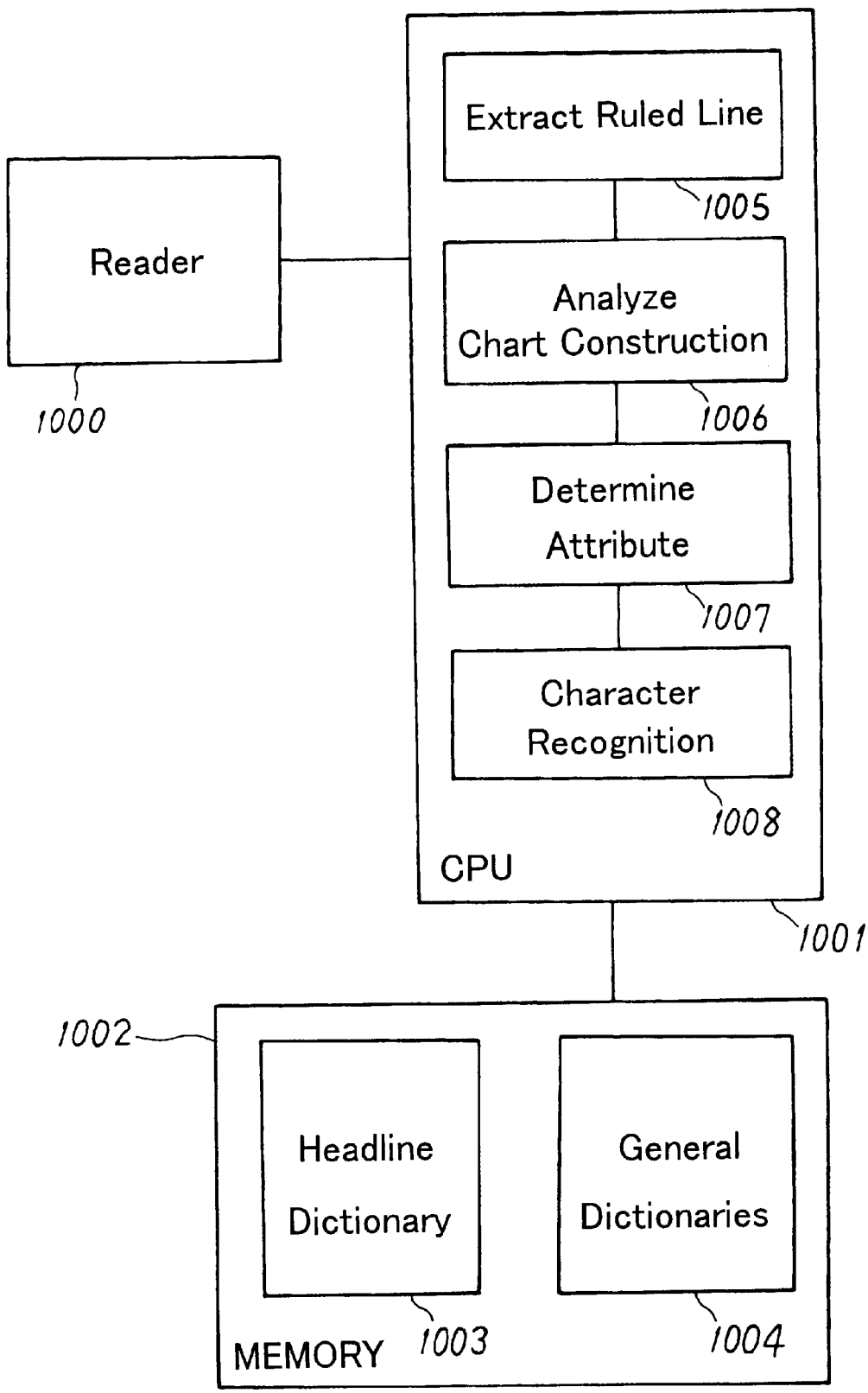
FIG. 1 is a block diagram for one embodiment of the present invention.
Figure 2:
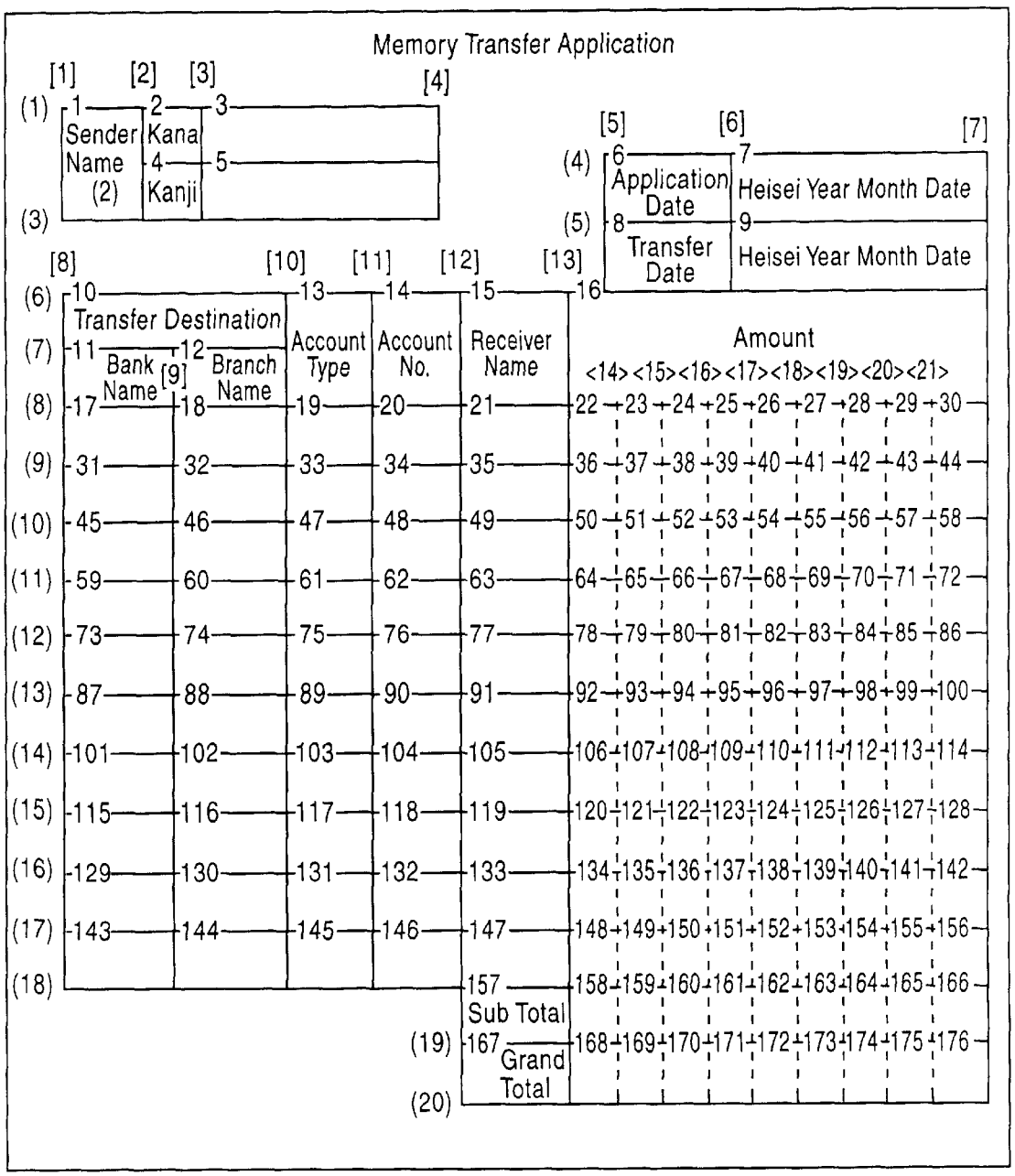
FIG. 2 is a diagram for explaining a first example form according to the embodiment of the present invention.
Figure 3:
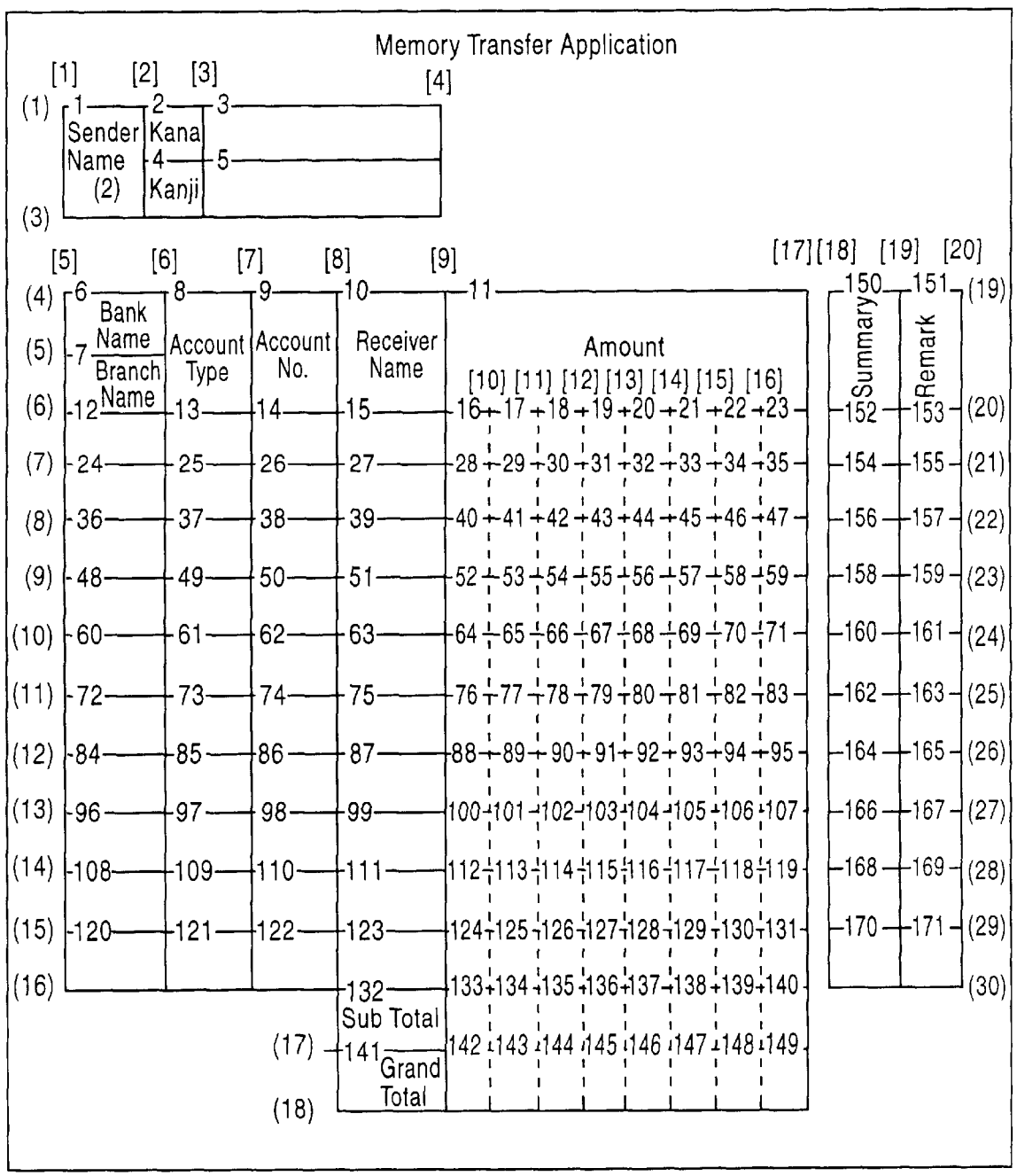
FIG. 3 is a diagram for explaining a second example form according to the embodiment of the present invention.

FIG. 1 is a block diagram illustrating a format recognition apparatus according to one embodiment of the present invention; FIG. 2 is a diagram for explaining a first example form used for the embodiment of the present invention; and FIG. 3 is a diagram for explaining a second example form used for the embodiment of the present invention.

As is shown in FIG. 1, a reader 1000 optically reads a form and a processor (CPU) 1001 analyzes a format of the form and identifies characters entered therein. Also provided is a memory 1002 which is used to store a headline word dictionary 1003 and a common dictionary 1004. The headline word dictionary 1003 contains headline words, which are defined in advance, and their image data; the common dictionary 1004 contains separate character recognition category and character font dictionaries, which are used to identify characters entered in data portions.

The CPU 1001 comprises: a ruled line extractor 1005, for extracting ruled lines on a form and the smallest rectangles formed by the ruled lines; an analyzer 1006, for analyzing the arrangement of the smallest rectangles that are extracted in order to obtain a chart structure; an attribute determiner 1007, for employing the obtained chart structure to determine the attributes of the individual smallest rectangles; and a character recognizer 1008, for identifying characters in accordance with their attributes. As will be described later, these sections are blocks representing the processes performed by the CPU 1001.

In FIG. 2 is shown the first example form to be analyzed. This form is a money transfer application form. Entered in the form in FIG. 2 are the name of a sender, an application date, a transfer date, a transfer destination (a bank name and a branch name), an account type, an account number, the name of a receiver, a money value, a subtotal, and a grand total. For this form, numerals in parentheses, ( ), are used to designate horizontal ruled lines, and numerals in brackets, [ ], are used to designate vertical ruled lines. Numerals are also used to designate the smallest rectangles (hereinafter referred to as ruled line entries) enclosed by the vertical and horizontal ruled lines. Therefore, the form in FIG. 2 is constituted by 20 horizontal ruled lines, (1) to (20); 13 vertical ruled lines, [1] to [13]; and 176 ruled line entries, 1 to 176.

In FIG. 3 is shown the second example form to be analyzed. This form is also a money transfer application form. Entered in the second form in FIG. 3 are the name of a sender, a bank name, a branch name, an account type, an account number, the name of a receiver, a money value, a subtotal, a grand total, a summary, and a remark. Similarly, for this form, numerals in parentheses, ( ), are used to designate horizontal ruled lines, and numerals in brackets, [ ], are used to designate vertical ruled lines. Again, numerals are also used to designate the smallest rectangles (hereinafter referred to as ruled line entries) enclosed by the vertical and horizontal ruled lines. Therefore, the form in FIG. 3 is constituted by 30 horizontal ruled lines, (1) to (30); 20 vertical ruled lines, [1] to [20]; and 171 ruled line entries, 1 to 171. The chart in this form is divided into two segments.

The present invention provides automatic analysis for the types of individual ruled line entries in forms having the above described chart structures.

Figure 4:
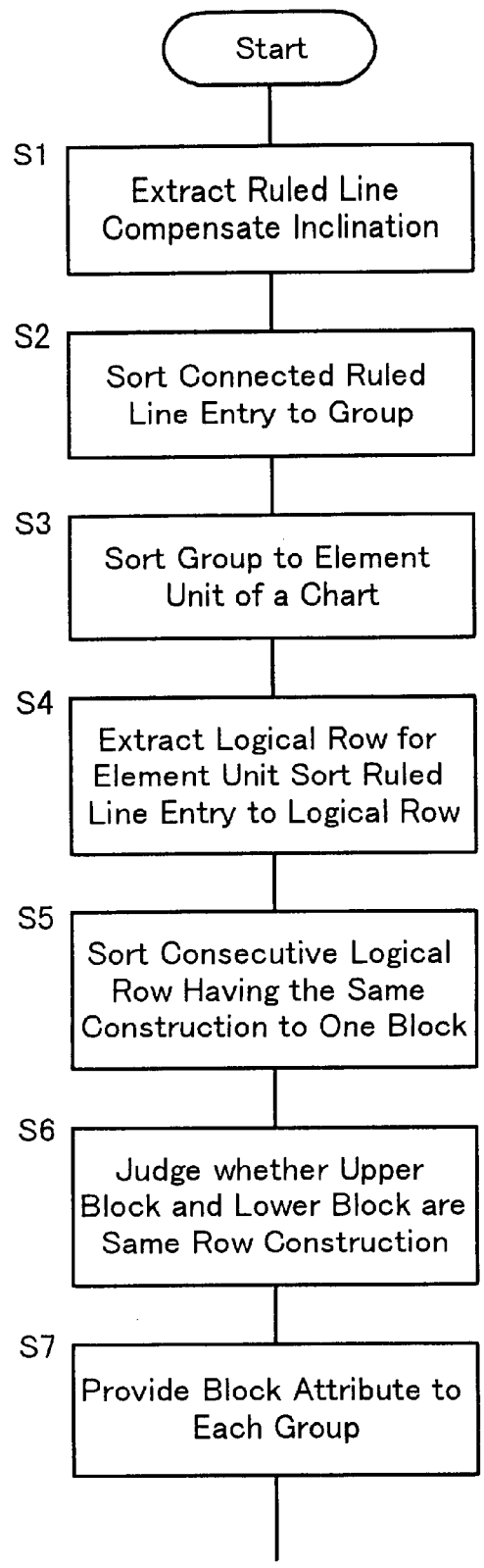
FIG. 4 is a flowchart (I) for the overall processing according to the embodiment of the present invention.
Figure 5:
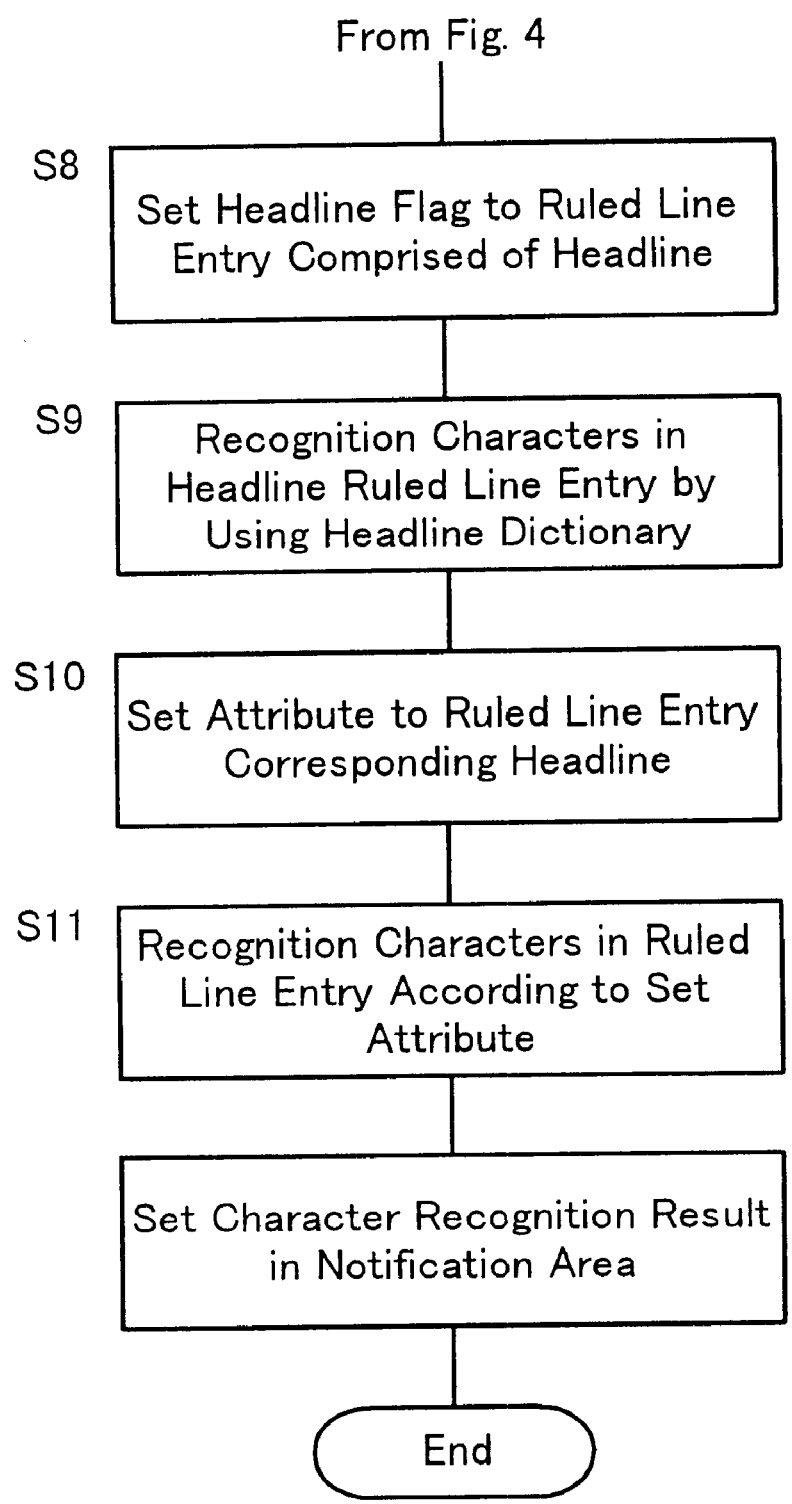
FIG. 5 is a flowchart (II) for the overall processing according to the embodiment of the present invention.

FIGS. 4 and 5 are flowcharts showing the overall processing according to the embodiment of the present invention, and FIGS. 6 to 25 are diagrams for explaining the processing.

(S1) The CPU 1001 extracts, from image data on a form, the horizontal ruled lines and vertical ruled lines on the form and the smallest rectangles (ruled line entries) enclosed by the horizontal and vertical ruled lines. As is shown in FIG. 6A, sequentially arranged black dots, of which image data are comprised, are counted, and when a constant number, or greater, of dots are sequentially present, it is determined to be a horizontal or vertical ruled line. In FIG. 6B, example horizontal and vertical ruled lines are shown. The ruled lines are extracted as physical coordinates, and the vertical and horizontal ruled lines are represented by the start and the end coordinates. As is shown in FIG. 6C, the ruled line entries are the smallest rectangles enclosed by two vertical and two horizontal ruled lines. The ruled line entries are also represented by start coordinates and end coordinates.

Then, the CPU 1001 calculates an inclination angle for the image data on the form, and in accordance with the inclination angle, corrects the start and the end coordinates of the ruled line entries, the horizontal ruled lines and the vertical ruled lines.

(S2) As is shown in FIG. 7, the CPU 1001 sorts the ruled line entries so that those to be connected together fall in the same group. That is, the CPU 1001 refers to the coordinates of the individual ruled line entries, and groups together those entries which are so positioned that they will be connected vertically or horizontally. In FIG. 7 the sorting of the image data on the first form in FIG. 2 into three groups is depicted, and in FIG. 8 the connection relationships are shown. In FIG. 8, not only those individual entries which are fully joined together horizontally or vertically, but also those for whom the distance between them, in the horizontal or the vertical direction, falls within a predetermined threshold range are determined to be connected.

(S3) The CPU 1001 sorts the groups into element units on the chart. Each group of ruled line entries is sorted into element units for the chart structure. As is shown in FIG. 9, each element unit consists of the main chart portion of a group, an upper projected portion and a lower projected portion. The coordinates of each ruled line are employed to determine in which group the ruled line is positioned (which group the ruled line forms). Two vertical ruled lines and two horizontal ruled lines, which together can form a rectangle (or a square), are searched for each group. The large rectangle formed by these lines is defined as the largest rectangle in the pertinent group. A search is then made for ruled line entries so located that they do not constitute parts of the largest rectangle. After sorting, such ruled line entries positioned above the largest rectangle are used to constitute the upper projecting portion, and such ruled line entries positioned below the largest rectangle are used to constitute the lower projecting portion. The ruled line entries included in the largest rectangle are also sorted and are used to constitute the main chart portion. Hereinafter, the thus sorted units are called groups.

The largest rectangle obtained for the form in FIG. 9 is enclosed by horizontal ruled lines a and b and vertical ruled lines c and d. Therefore, the main chart portion includes the ruled line entries ranging from 3 to 26, the upper projecting portion includes the ruled line entries 1 and 2, and the lower projecting portion includes the ruled line entries ranging from 27 to 32.

(S4) The CPU 1001 sorts the groups for the unit elements of the chart into logical rows. That is, for each group, the CPU 1001 sorts the ruled line entries into logical rows in the direction in which (horizontally, on the form) the ruled line entries are logically connected. Logical connections are effected based on the premise that the ruled line entries have the same width.

The ruled line entries which are connected together based on their having the same width are determined to be the constituents of the same logical row. The same-width connection will be explained while referring to FIGS. 10A to 10D.

Figure 10A:
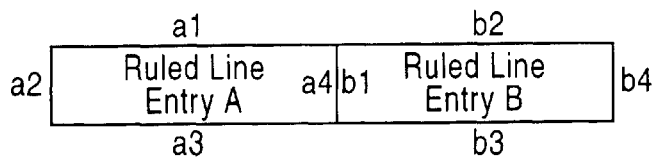
FIGS. 10A to 10D are diagrams for explaining the logical row sorting process in FIG. 4.

As is shown in FIG. 10A, when ruled line entries having the same width are adjacent to each other and share a line segment, it is ascertained that the ruled line entries referred to are constituents of the same logical row. In FIG. 10A, since for ruled line entries A and B the positions of the line segments a4 and b1 correspond, as do their lengths, it is ascertained that the two ruled line entries A and B are connected.

Figure 10B:
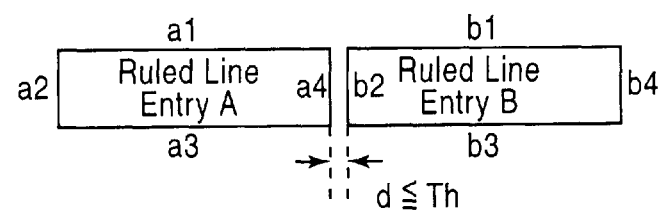

As is shown in FIG. 10B, when the ruled line entries having the same width are located near each other, it is ascertained that the entries referred to are constituents of the same logical row. As is shown in FIG. 10B, since a distance d between the ruled line entries A and B is equal to or less than a predetermined threshold value and the lengths of line segments a4 and b2 correspond, it is ascertained that the ruled line entries A and B are connected.

Figure 10C:
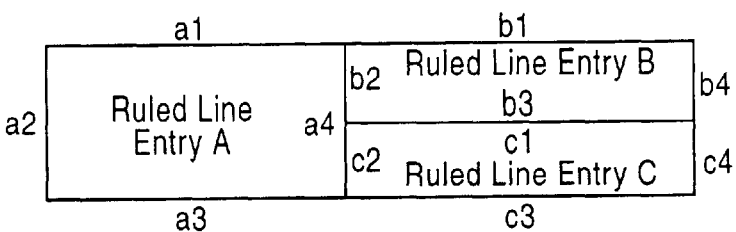

As is shown in FIG. 10C, when a plurality of ruled line entries having the same width are adjacent to one ruled line entry and these three entries share a line segment, it is ascertained that the ruled line entries referred are constituents of the same logical row. In FIG. 10C, since the sum of the lengths of a line segment b2 of a ruled line entry B and a line segment c2 of a ruled line entry C equals the length of a line segment a4 of a ruled line entry A, it is ascertained that the three ruled line entries are connected.

Figure 10D:
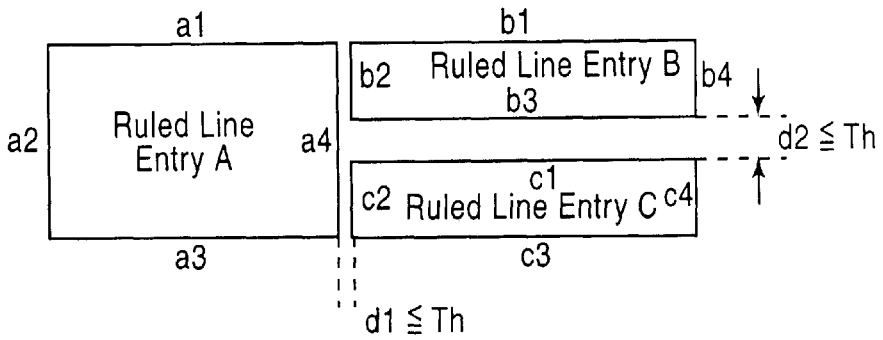

As is shown in FIG. 10D, when individual ruled line entries are located near each other and the width of one ruled line entry equals the sum of the widths of the rows for the other entries, it is ascertained that the entries refereed to ar constituents of the same logical row. In FIG. 10D, since a distance d2 between ruled line entries B and C is equal to or less than a threshold value and a distance d1 between the ruled line entry A and the ruled line entries B and C is equal to or less than a threshold value, and since the sum of the lengths of a line segment b2 of the ruled line entry B and a line segment c2 of the ruled line entry C substantially equals the length of a line segment a4 of the ruled line entry A, it is ascertained that these three entries are connected.

The groups are sorted into logical rows in this manner. And thus, as is shown in FIG. 11, group 3 of the form in FIG. 2 is sorted into 11 logical rows.

The nested structure in the direction of rows will now be analyzed. When a rectangle formed by a plurality of ruled line entries has a logical meaning, it is called a nested structure. As is shown in FIG. 12A, since the entries for a "bank name" and a "branch name" are correlated with the entry for a "transfer destination," this portion is defined as a nested structure. As is shown in FIG. 12B, a ruled line entry 1 (a transfer destination) is the parent of a ruled line entry 2 (a bank name) in the example in FIG. 12A. Therefore, the parenthood relationship is designated for the ruled line entries 1 and 2. The ruled line entry 2 (the bank name) and the ruled line entry 3 (the branch name) are brothers (at the same level). Therefore, a brotherhood relationship is established for the ruled line entries 2 and 3.

Figure 13:
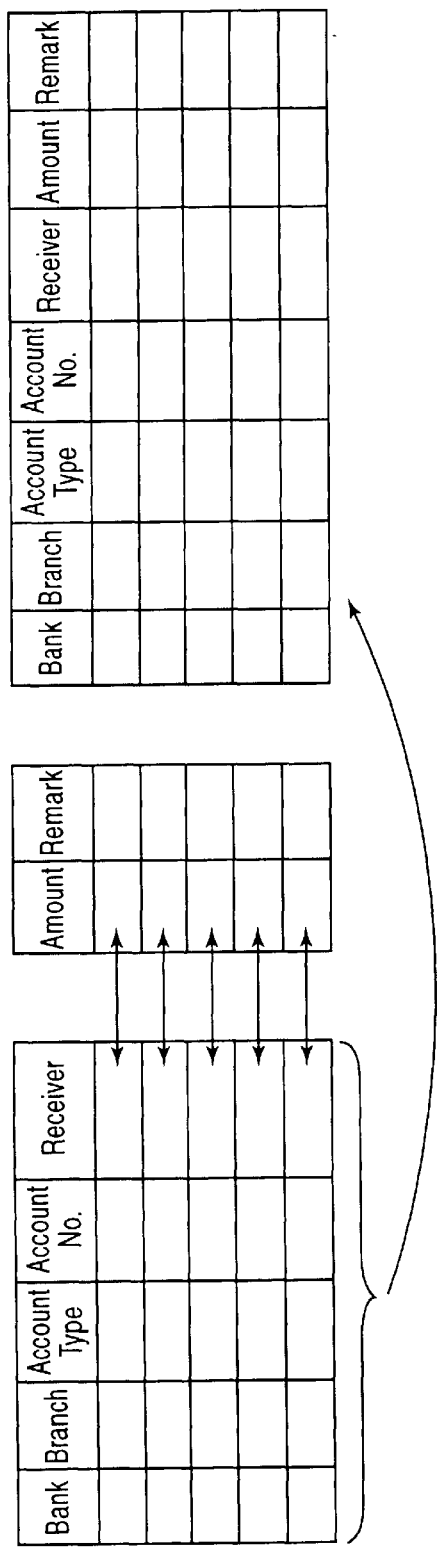
FIG. 13 is a diagram for explaining the assembly process for the chart structure in FIG. 10.

Furthermore, as in the second example form in FIG. 3, a chart can be divided into left and right areas. To provide a logical definition for the chart structure, these areas must be conjoined to obtain a single chart structure. Therefore, if, as is shown in FIG. 13, a plurality of groups are arranged in parallel in left and right positions, the logical row structures for constituting the individual groups are determined, and when the structures of the groups along the logical rows are the same, the chart structures are joined together.

Figure 14:
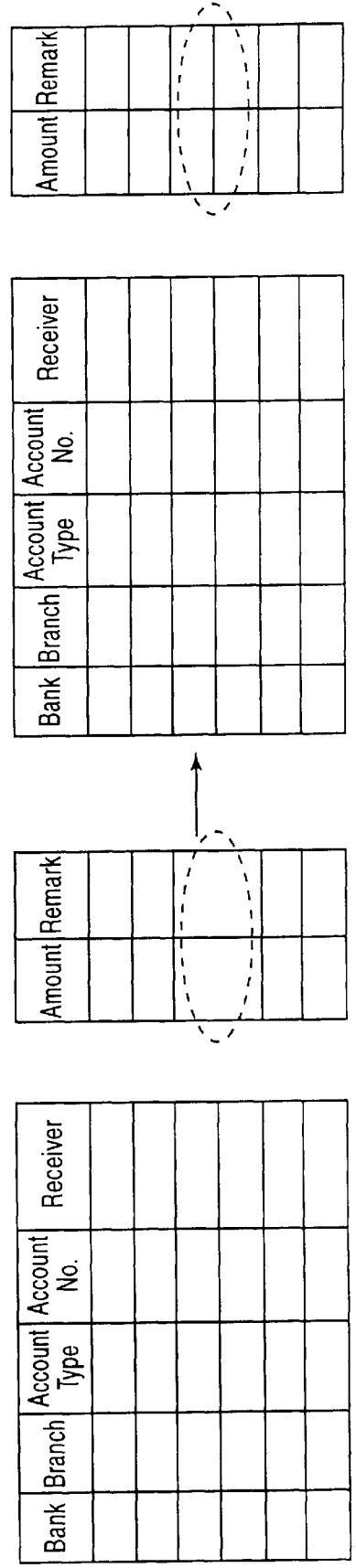
FIG. 14 is a diagram for explaining a ruled line creation process in FIG. 10.

In addition, when one part of a table divided into left and right areas has faded out, a ruled line is created for that part. As is shown in FIG. 14, a ruled line in one of the divided tables which are to be combined may be missing due to fading. Since other than the portion wherein the ruled line is missing the logical row structures of the two groups match, a new ruled line is created so that the two logical structures are fully matched. Thus, ruled line entries are produced which include the generated ruled line. Following this, the combination of the chart structures is performed as was previously described.

(S5) Sequential logical rows having the same structure are collected together as a block. The structures of the logical rows which are vertically adjacent in a group are compared, and the logical rows having the same structures are grouped together in one block. The elements required for a comparison of the logical rows are the counts of the ruled line entries constituting the logical rows, the arrangements of the entries in the logical rows, and the heights and the widths of the logical rows. The logical rows are compared by examining these elements to determine whether the rows have the same structure.

Figure 15:
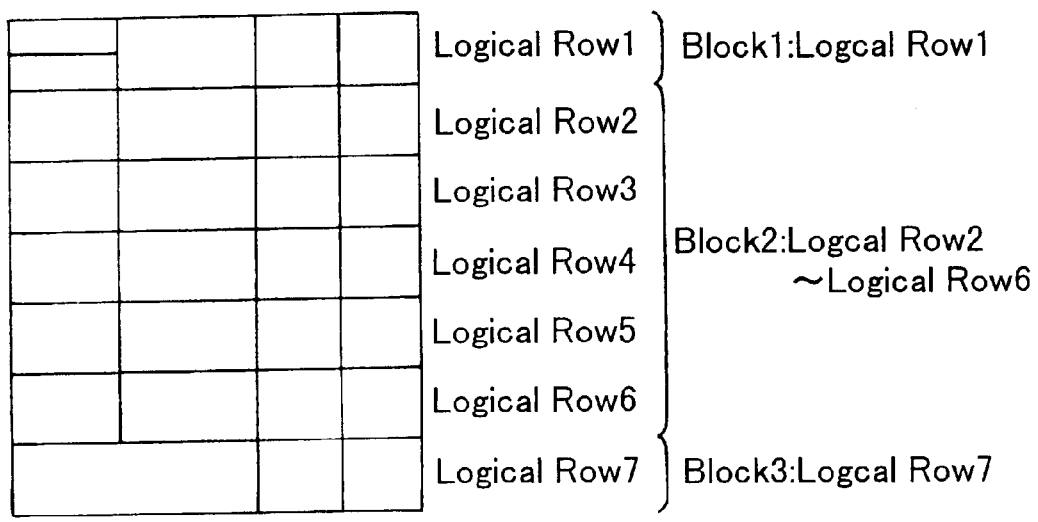
FIG. 15 is a diagram for explaining a block sorting process in FIG. 4.

In the example form in FIG. 15, seven logical rows of one group are sorted into three blocks, 1 to 3. Block 1 includes logical row 1; block 2 includes logical rows 2 to 6; and block 3 includes logical row 7.

Blocks having different structures are converted into those having the same structure. That is, if ruled lines in a chart are partially missing due to fade-out, the missing ruled lines are produced by referring to the other logical structures, and accordingly, ruled line entries are created.

Figure 16:
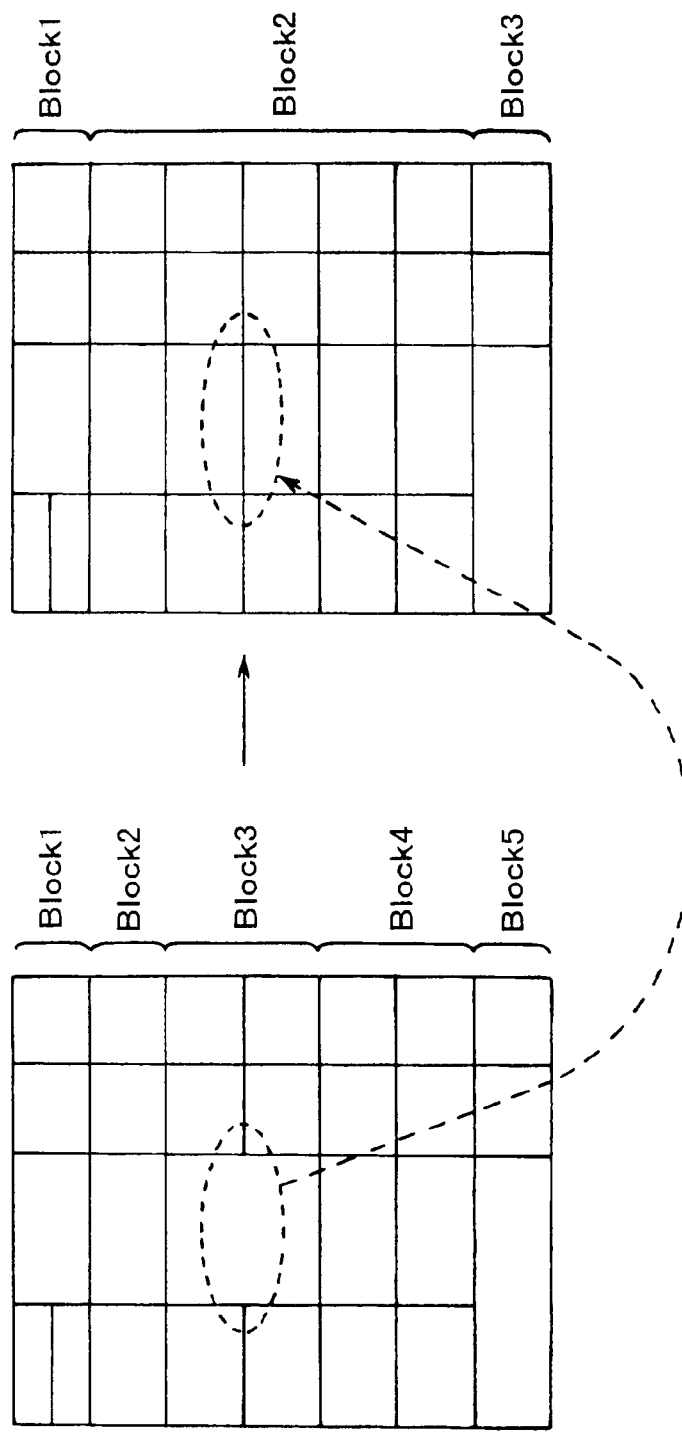
FIG. 16 is a diagram for explaining a ruled line recovery process in FIG. 15.

In an example chart in FIG. 16, ruled lines are missing and the logical rows have been sorted into blocks 1 to 5. Since blocks 2 and 4 are assumed to have the same structure, a ruled line is created for block 3, and as a result, blocks 2 to 4 have the same structure. Finally, the five blocks are combined into three blocks.

Divided logical rows are combined by using a strikeout line. In a salary transfer form processed by a financial facility, a transaction portion may be deleted using a strikeout line in order to indicate that the portion is not to be handled. Since this strikeout line is extracted as a ruled line, the results obtained by analyzing it will be incorrect. Therefore, the structure of the chart, excepting the strikeout line, must be analyzed. When the logical rows are sorted into blocks, a block in which there is a strikeout line has the following features.

First, the block is separated horizontally into upper and lower blocks, and second, the upper block and the lower block have the same structure. If a block having such features is present, a block excluding a ruled line represented by a strikeout line is created in the pertinent block segment. If the resultant block has the same structure as the upper block segment, it is ascertained that a block structure has been changed because the strikeout line was entered. The strikeout line is deleted, and accordingly, the ruled line entries, the logical rows and blocks are re-generated.

Figure 17:
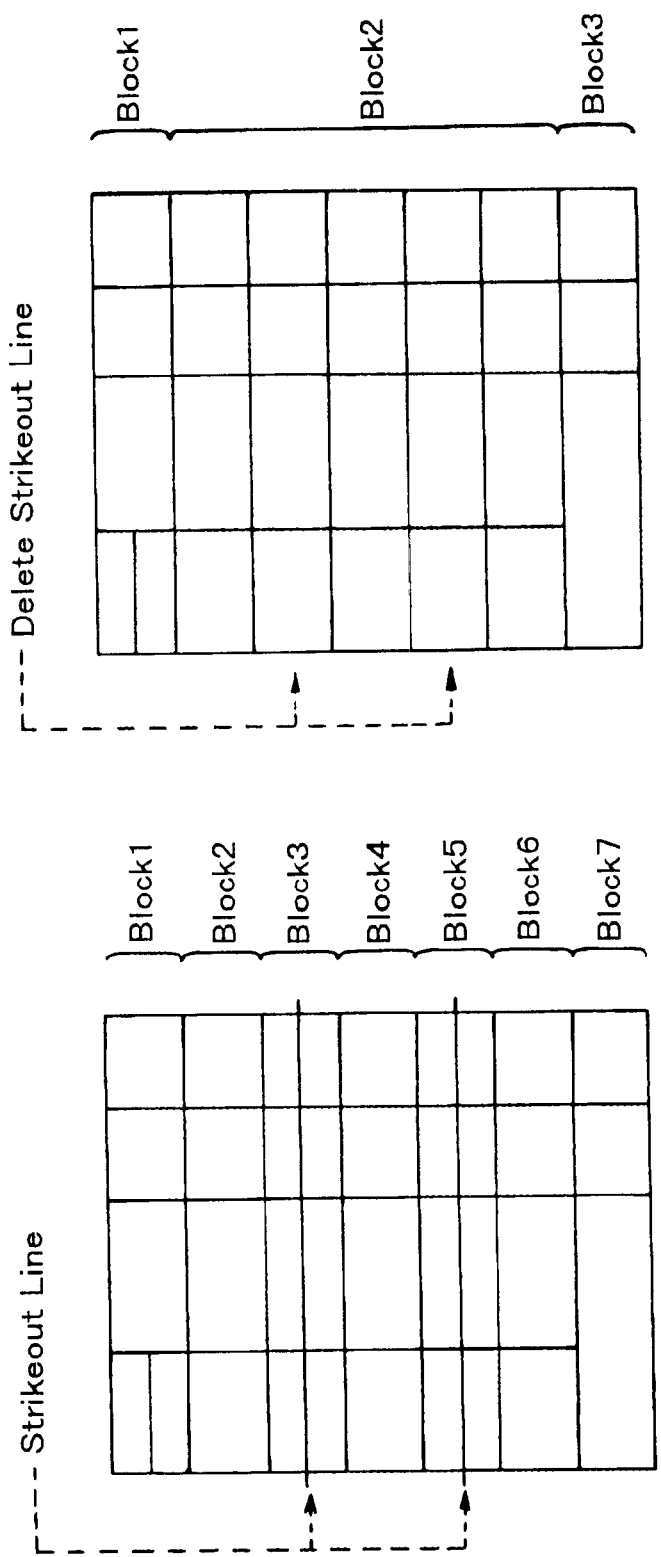
FIG. 17 is a diagram for explaining a logical row assembly process in FIG. 15.

As is shown in FIG. 17, if there are strikeout lines in blocks 3 and 5, seven blocks are obtained. Blocks 2 and 4 have the same structure, and when the strikeout line is deleted from block 3, block 3 has the same structure as the block 2. The same thing is true of blocks 4 to 6. Therefore, the strikeout lines are deleted, and the ruled line entries and the logical rows are re-prepared. Accordingly, the blocks are also re-prepared, an as a result, the seven blocks are sorted into three blocks.

(S6) Then, the logical column structure is determined. The chart structure includes a fixed word portion and a variable word portion. The fixed word portion is a fixed portion of a form, such as the headline of a chart, and the variable word portion is a variable contents portion of a form, such as a data portion of a chart. The fixed word portion and the variable contents portion are examined to determine the logical column structure. That is, to determine whether the same column structure is employed for the vertically connected blocks. If the two blocks have the same column structure, they are combined for each logical column. In the example in FIG. 18A, the columns are sorted into six logical columns.

Figures 18A, 18B, 18C:
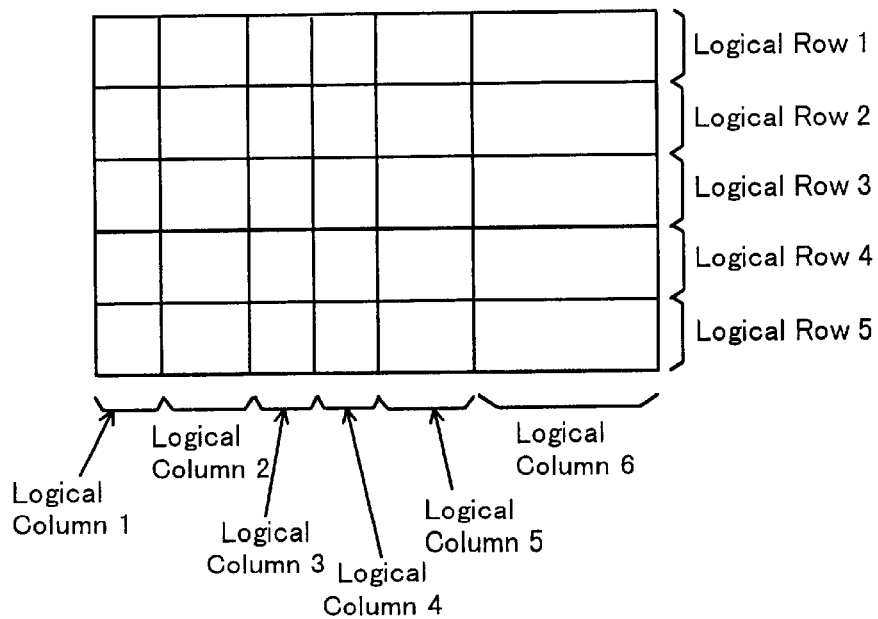
FIGS. 18A to 18C are diagrams for explaining a logical column determination process in FIG. 4.

As is shown in FIG. 18B, block 2, which is the variable word portion, has two columns, "ABC bank" and "DEF branch," while block, 1 which is the fixed word portion has one column. In this case, since one column (transfer destination) in block 1 serves as the headline for two columns in block 2, for the chart structure the two columns in block 2 are regarded as one column.

Similarly, as is shown in FIG. 18C, when block 1, which is the fixed word portion, has two columns, "bank name" and "branch name," while block 2, which is the variable word portion, has one column, since the two columns (the bank name and the branch name) in block 1 serve as the headline for one column in block 2, for the chart structure they are regarded as one column.

Next, the logical nested structure in the columnar direction is extracted. If, as a result of the determination of the logical column structure for the blocks, one block includes a plurality of columns and the other block has only one column, as is shown in FIGS. 18B and 18C, these blocks represent nested structures. The ruled line entries constituting a nested structure are collected to provide a single logical definition.

FIG. 19A is a diagram showing the nested structure for the chart in FIG. 18A. As is shown in FIG. 19A, ruled line entries 2 and 3 are brothers (on the same level). The ruled line entries 2 and 3 are combined to form a ruled line entry which constitutes the column relative to a ruled line entry 1. In FIG. 19B, the nested structure for the chart in FIG. 18C is shown. As is shown in FIG. 19B, ruled line entries 1 and 2 are brothers (on the same level). These entries are combined to form a ruled line entry which constitutes a column relative to a ruled line entry 3.

Figure 20A:
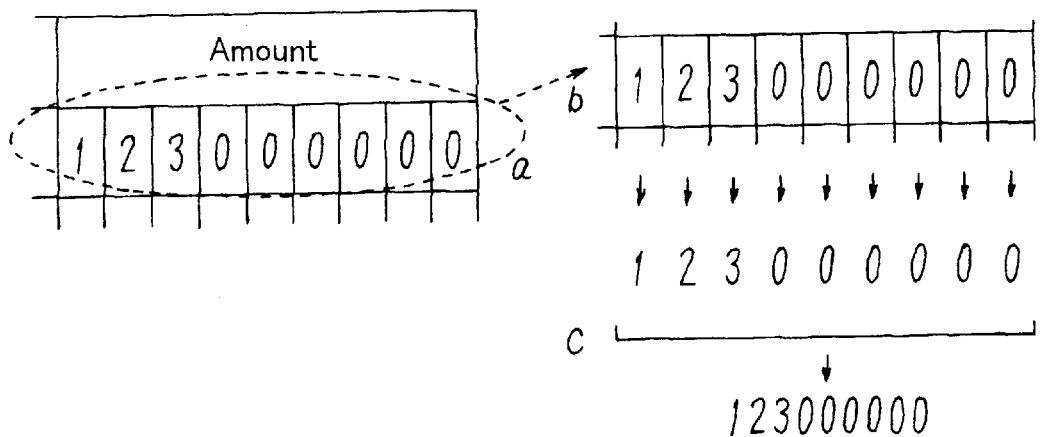
FIGS. 20A and 20B are diagrams for explaining the nested structure for one-digit and three-digit ruled lines.
Figure 20B:
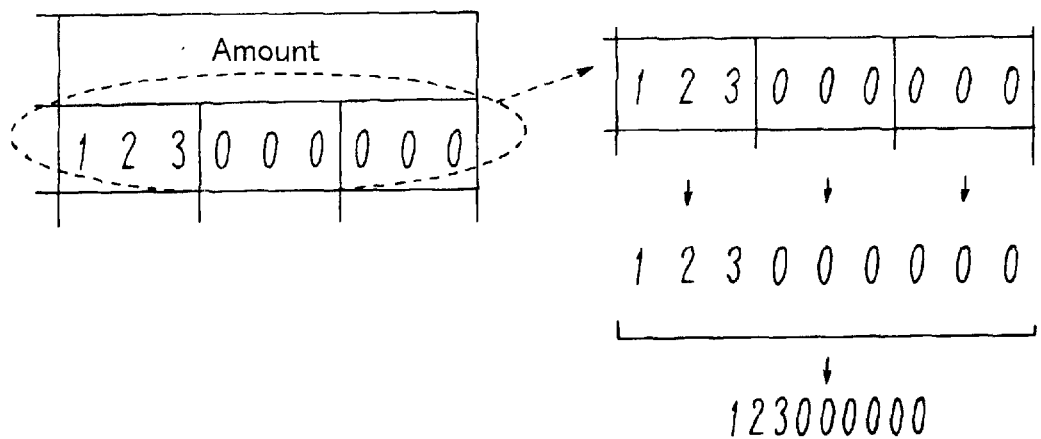

The nested structures for a one-digit ruled line entry and a three-digit ruled line entry will now be analyzed. As is shown in FIGS. 20A and 20B, in the chart structure for a form which includes columns for a money value and for a commission, ruled line entries for one digit or for three digits are continued. A one-digit entry is one where a number represented by one digit is entered or printed in a single ruled line entry, and a three-digit entry is one where a number represented by three digits is entered or printed in a single ruled line entry.

Since these continuous entries are effective when they are together, they are logically assembled as a single ruled line entry. Therefore, the vertical and horizontal lengths of a one-digit or a three-digit ruled line entry are defined in advance. When a predetermined number of ruled line entries of this size are aligned, they are regarded as a nested structure and are logically collected as one ruled line entry.

In the character recognition process, while using the above results the sequential ruled line entries can be handled as a character string. For example, assume that a portion b in FIG. 20A is obtained as the result of a character recognition process performed for a portion a.

Since together the ruled line entries constitute a nested structure, the recognition results are combined as is indicated by c so they can be handled as one character string. The same process can be performed for the three-digit ruled line entries in FIG. 20B.

Figure 21A:
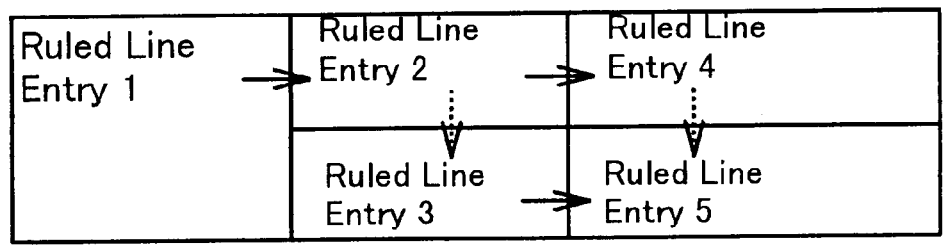
FIGS. 21A and 21B are diagrams for explaining the nesting analysis for a portion other than the main chart in FIG. 18.

The nested structure of a rectangle having a unique structure will now be analyzed. Many portions other than the main chart on a form have special structures, and for these portions, the nested structure analyzation is performed for each structure. In FIG. 21A, a ruled line entry 1 is a parent for a ruled line entry 2; the ruled line entry 2 is a parent for a ruled line entry 4; a ruled line entry 3 is a parent for a ruled line entry 5; the ruled line entries 2 and 3 are brothers; and the ruled lined entries 4 and 5 are brothers. Similarly, in FIG. 21B, a ruled line entry 1 is a parent for a ruled line entry 2; the ruled line entry 2 is a parent for a ruled line entry 4; a ruled line entry 3 is a parent for a ruled line entry 5; the ruled line entries 2 and 3 are brothers; and the ruled line entries 4 and 5 are brothers. The nested structures are analyzed in the same manner as were the nested structures that were analyzed in the directions of the rows and the columns using the previously described analysis process.

Figure 22:
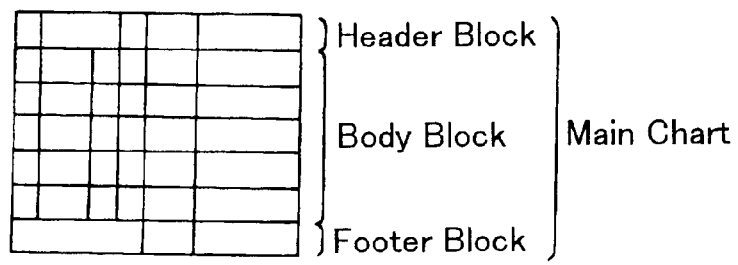
FIG. 22 is an explanatory diagram for obtaining the attribute of a block in FIG. 4.

(S7) Following this, attributes are provided for blocks in the chart structure, and a headline portion and a data portion corresponding to the headline portion are included on a form. In addition, a portion is included wherein data are summarized (e.g., a column wherein are entered the totals obtained by summing the money values shown in the data portion). In this embodiment, attributes are provided for the individual blocks in the chart structure to define the blocks. That is, as is shown in FIG. 22, a portion wherein data for the chart are entered or printed is defined as a body portion, and a body attribute is provided for a block in the chart in which the maximum logical rows are included. A portion wherein the headline for the chart is entered or printed is defined as a header portion, and a header attribute is provided for a block located above the body portion. A portion (e.g., a column for totals) wherein are entered or printed data summarizing the data portion of the chart is defined as a footer portion, and a footer attribute is provided for a block located below the body portion.

Figure 23:
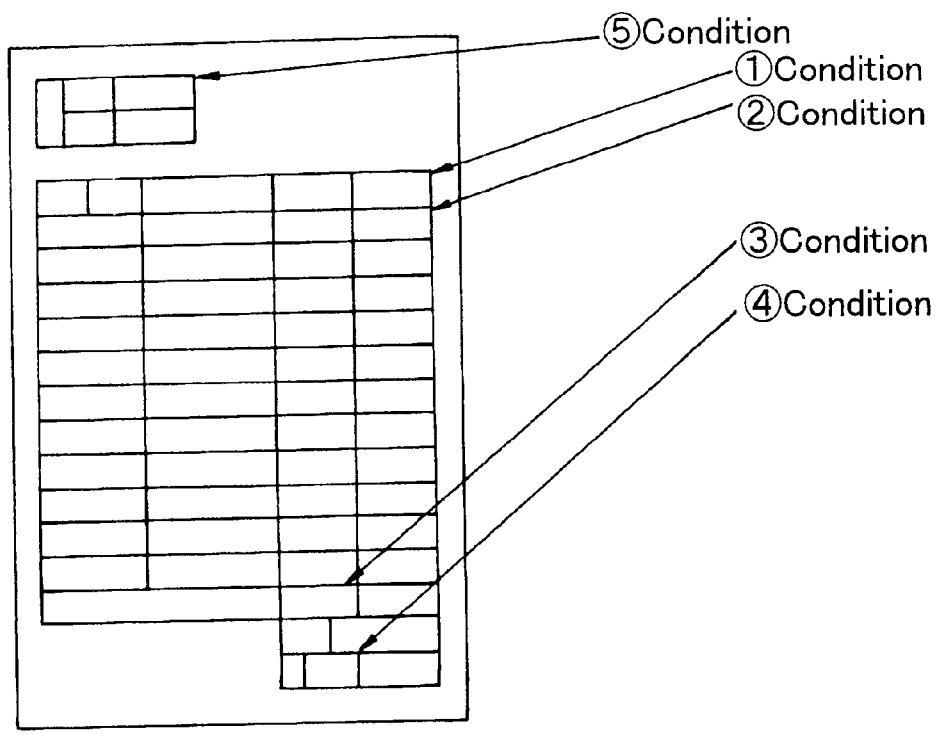
FIG. 23 is a diagram for explaining a flag setup process in FIG. 5.

(S8) A headline flag is set for a ruled line entry constituting a headline. While referring to the style of the chart structure, the headline flag is set for the headline entry in accordance with the following rules. As is shown in FIG. 23, the ruled line entries for which the headline flag is set are as follows:

① ruled line entries constituting a header block;

② ruled line entries constituting the topmost logical row of a body block;

③ ruled line entries constituting a header block, except for the rightmost entry;

④ ruled line entries constituting the logical rows of a lower projecting portion, except for the rightmost entry;

⑤ ruled line entries, except for the lowest right entry, which constitute logical rows of a rectangle other than a chart portion and which have a nested structure.

When the headline portion is extracted, the characters to be used can be limited and a character recognition process specified for those characters (words) can be performed. Therefore, the words in the headline portion can be accurately identified.

(S9) Next, the type of headline is determined. A character recognition process is performed for a character string, in a ruled line entry, for which the headline flag is set. For this headline character recognition, as is shown in FIG. 25, the headline word dictionary 1003 (see FIG. 1) is used, because words (e.g., a transfer destination) which are employed in a headline, and their images, are registered in the headline word dictionary 1003, and it is therefore possible for character recognition to be performed more accurately, compared with when the common character recognition dictionary is used.

While the headline title obtained by using the recognition process is employed as a key, a headline table in FIG. 24 is referred to. As is shown in FIG. 24, attribute information (a character recognition category, a character font, etc.) corresponding to the headline title is registered in the headline table, and a record (attribute information) corresponding to the headline title is extracted from this information.

(S10) Then, recognition attributes for a ruled line area corresponding to the headline are determined. For this determination, the ruled line entry of a data portion corresponding to the headline is found by referring to information for a logical column which includes the ruled line entry wherein the headline is found. That is, for the ruled line entries, other than the headline ruled line entry, constituting the logical column, recognition characteristics, such as a character recognition category and a character font, for the headline ruled line entry are copied.

(S11) Sequentially thereafter, except for the headline, character recognition is performed for the ruled line entries in the area. Character strings present in the ruled line entries, other than the headline entry, are identified by using the common character recognition dictionary 1004 (see FIG. 1). At this time, a character recognition dictionary 1004 is prepared for each recognition category, such as Chinese characters or numerals. Therefore, for character recognition, a recognition dictionary is selected from among the common dictionaries in accordance with the recognition attributes of the data portion. As a result, characters in the data portion can also be accurately identified.

Further, the recognition results are recorded in a results notification area, so that the data name of the data portion, the number of data sets and the character recognition results can be obtained.

In this manner, the row and the column relationships of each ruled line entry are determined, and the entries are sorted into a headline portion and a corresponding data portion. The characters in the headline portion are recognized by using the headline recognition dictionary, and the headline title is obtained. Then, the structure relationships of the logical columns is employed to acquire the data title for the data portion which corresponds to the headline portion. Therefore, the format for every entry on a form need not be defined in advance.

In addition, recognition attributes are obtained from the headline table in accordance with the headline title, and based on the obtained attributes, characters in the data portion are identified. Thus, the chart structure of the form can be analyzed, and character recognition for the data portion can be performed more accurately.

Figure 26:
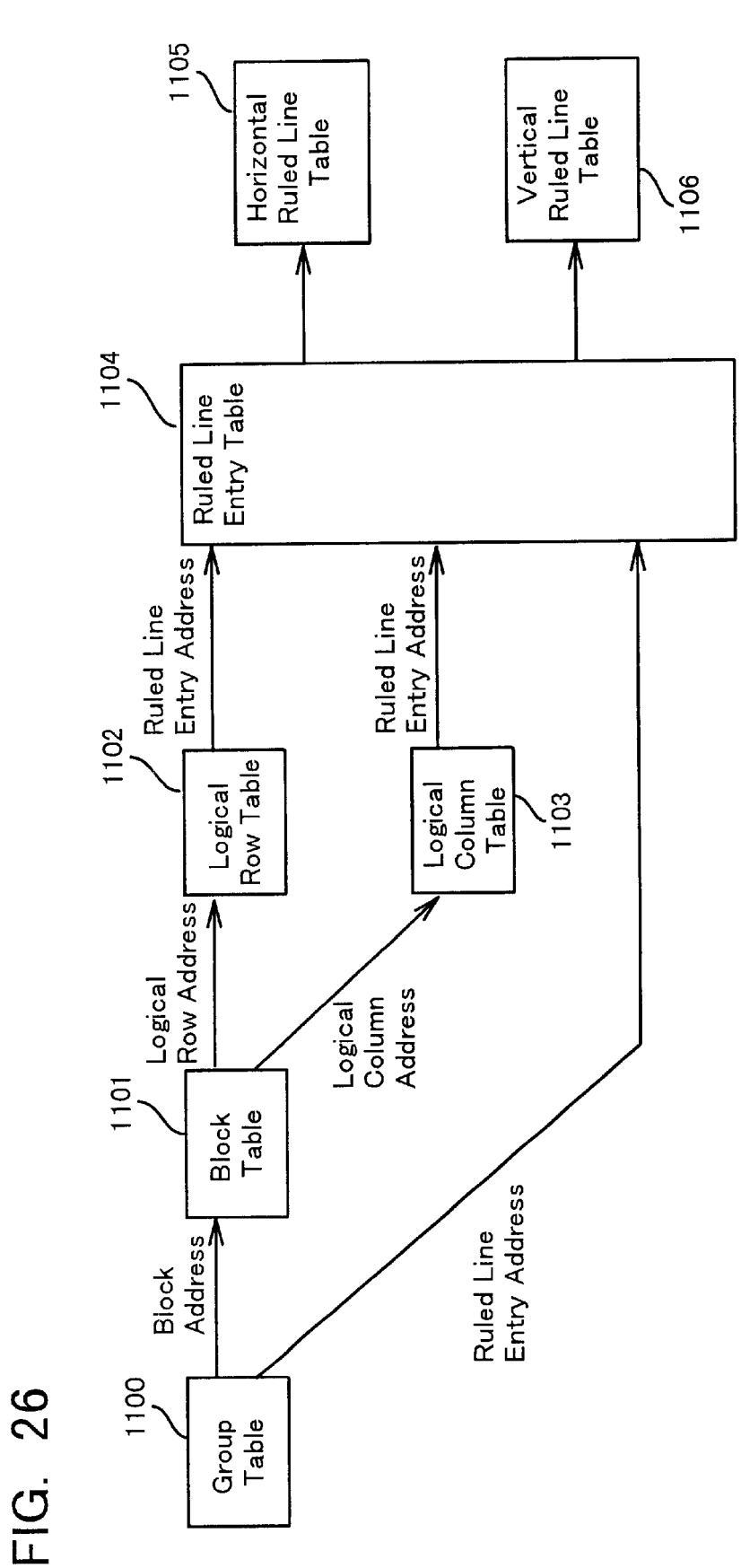
FIG. 26 is a diagram showing tables for the processes in FIGS. 4 and 5.

A detailed explanation will now be given for the individual processes performed at steps S1 to S11. FIG. 26 is a diagram showing the relationships of the tables used for the individual processes. As is shown in FIG. 26, the start coordinates and the end coordinates of an extracted horizontal ruled line are stored in a horizontal ruled line table 1105, and the start coordinates and the end coordinates of an extracted vertical ruled line are stored in a horizontal ruled line table 1106. The start coordinates and the end coordinates of an extracted ruled line entry (smallest rectangle), and the number of a group and the number of a block wherein the ruled line entry belongs are stored in a ruled line entry information table 1104. A head ruled line entry address for each sorted group and the number of the first block are stored in a group information table 1100.

A head ruled line entry address for each extracted block and a first logical row address are stored in a block information table 1101. A head ruled line entry address for each extracted logical row and a block number are stored in a logical row information table 1102. And a head ruled line entry address for each extracted logical column is stored in a logical column information table 1103.

(a) Explanation for a Ruled Line Extraction Process

FIG. 27 is a diagram for explaining the horizontal ruled line information table, FIG. 28 is a diagram for explaining the vertical ruled line information table, and FIG. 29 is a diagram for explaining the ruled line entry table.

For the extraction of horizontal ruled lines, as is well known, a group of horizontally sequential black pixels is extracted which in number is equal to or greater than a specified number. Then, as is shown in FIG. 27, the extracted horizontal ruled lines are individually numbered, and the start coordinates and the end coordinates of the lines are stored in the horizontal ruled line information table 1005.

For the extraction of vertical ruled lines, as is also well known, a group of vertically sequential black pixels is extracted which in number is equal to or greater than a specified number. Then, as is shown in FIG. 28, the extracted vertical ruled lines are individually numbered, and the start coordinates and the end coordinates of the lines are stored in the vertical ruled line information table 1006.

For the extraction of a smallest rectangle (a ruled line entry), as is also well known, a smallest rectangle enclosed by two horizontal ruled lines and two vertical ruled lines is extracted. The extracted ruled line entries are numbered, and as is shown in FIG. 29, the start coordinates SC, the end coordinates EC, the upper horizontal ruled line number ULN, the lower horizontal ruled line number LLN, the left vertical ruled line number LVN and the right vertical ruled line number RVN are stored for each ruled line in the ruled line entry information table 1104. It should be noted that the ruled line entry information table 1104 includes columns for a group number GN, a block number BN, a row number LN, a column number RO, an upper ruled line entry URN, a lower ruled line entry LRN, a left ruled line entry ERN, a right ruled line entry RRN and nested information IN. These columns are used for the following processing.

Figure 30:
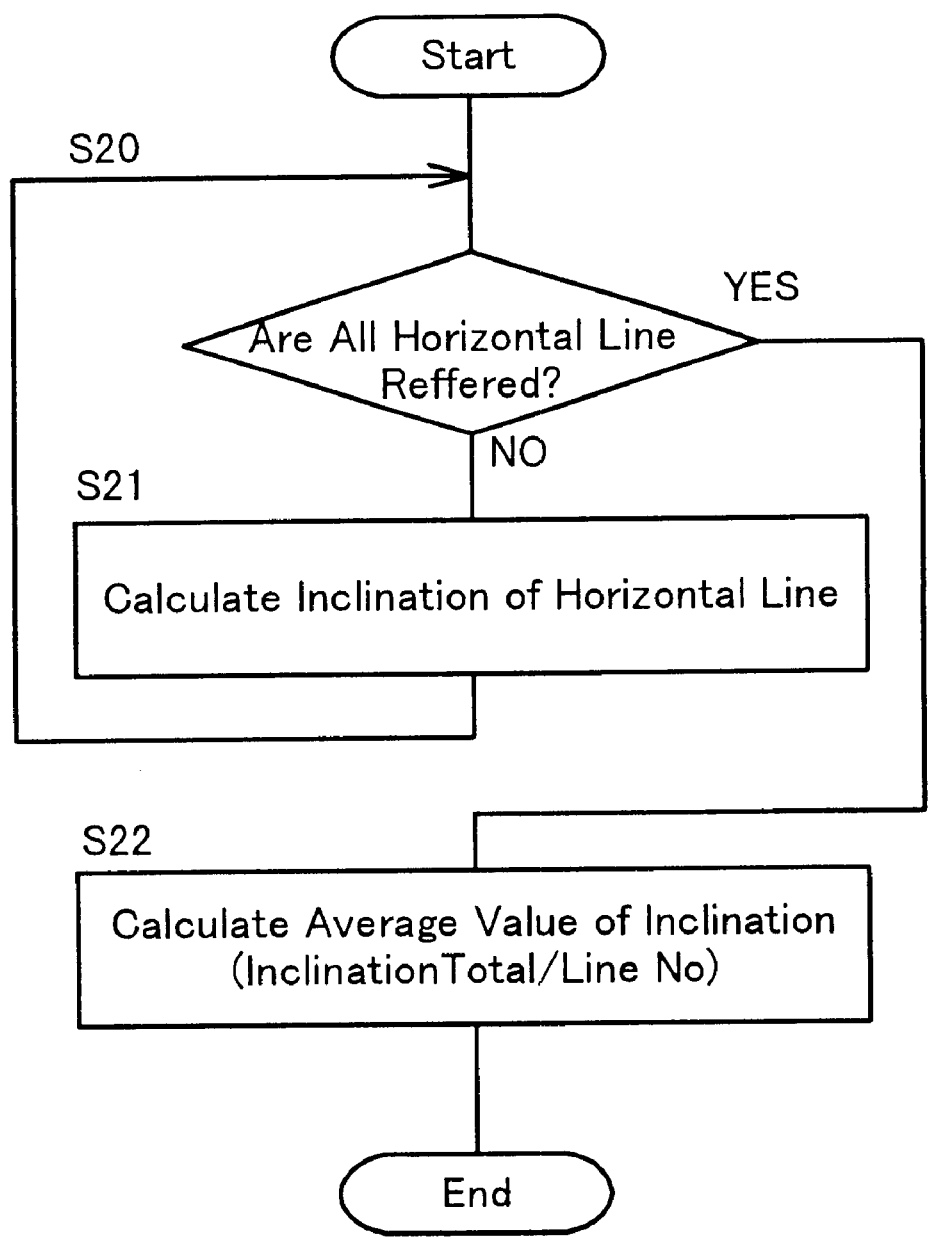
FIG. 30 is a flowchart showing the slope angle calculation processing.

The inclination correction process will now be described. FIG. 30 is a flowchart showing the inclination angle calculation processing.

(S20) The horizontal ruled lines in the horizontal ruled line information table 1105 are examined, and a check is performed to determine whether all the horizontal ruled lines have been examined to.

(S21) The inclination angle of a horizontal ruled line which is referred to is calculated. When the end Y coordinate is Ye, the start Y coordinate is Ys, the end X coordinate is Xe and the start X coordinate is Xs, the inclination, is calculated by using the following equation (1).

$$\tan. = (Ye-Ys)/(Xe-Xs) \tag{1}$$

Program control then returns to step S20.

(S22) When at step S20 all the horizontal ruled lines are referred to, the average of the inclination angles is calculated by using (the total of inclination angles)/(the number of horizontal ruled lines). The processing is thereafter terminated.

Figure 31:
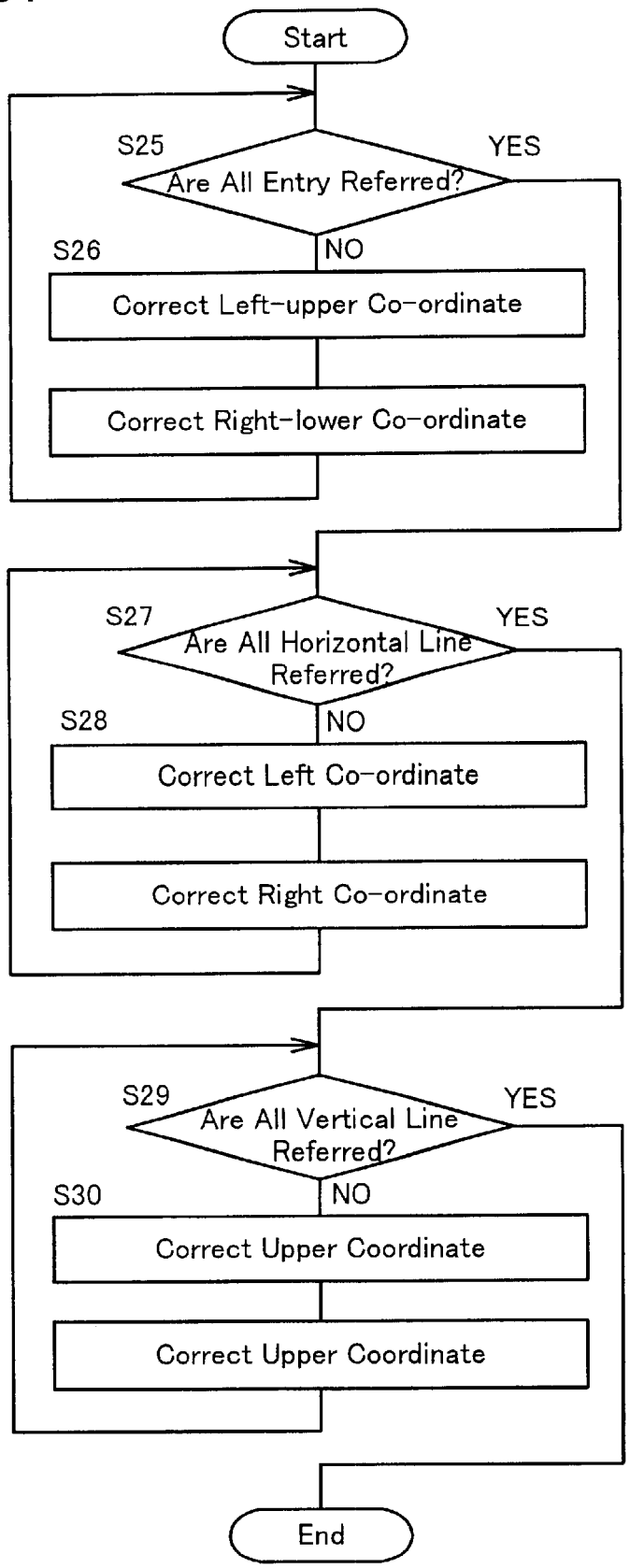
FIG. 31 is a flowchart showing the coordinate correction processing.

The coordinate correction process will now be explained. FIG. 31 is a flowchart showing the coordinate correction processing.

(S25) The ruled line entries in the ruled line entry table 1104 are referred to. A check is performed to determine whether all the ruled line entries in the ruled line entry table 1104 have been examined. When all the ruled line entries have been examined, program control advances to step S27.

(S26) The left upper coordinates (start coordinates) of the ruled line entry, Xs and Ys, are corrected in accordance with the inclination angle tan. The coordinates X and Y obtained after the correction are represented by equations (2) and (3).

$$X = Xs + Ys \times \tan. \tag{2}$$

$$Y = Ys - Xs \times \tan. \tag{3}$$

The right upper coordinates (end coordinates) of the ruled line entry, Xe and Ye, are corrected in accordance with the inclination angle tan. The coordinates X and Y obtained after the correction are represented by equations (4) and (5).

$$X = Xe + Ye \times \tan. \tag{4}$$

$$Y = Ye - Xe \times \tan. \tag{5}$$

Program control then returns to step S25.

(S27) Next, the horizontal ruled line table 1105 is referred to in order to correct the coordinates of a horizontal ruled line. A check is performed to determine whether all the horizontal ruled lines in the horizontal ruled line table 1105 have been examined. If all the horizontal ruled lines have been examined, program control advances to step S29.

(S28) The left coordinates (start coordinates) of the horizontal ruled line, Xs and Ys, are corrected in accordance with the inclination angle tan. The coordinates X and Y obtained after the correction are represented by the previously described equations (2) and (3).

The right coordinates (end coordinates) of the horizontal ruled line, Xe and Ye, are corrected in accordance with the inclination angle tan. The coordinates X and Y obtained after the correction are represented by the previously described equations (4) and (5).

Program control then returns to step S27.

(S29) The vertical ruled line table 1106 is referred to in order to correct the coordinates of a vertical ruled line. A check is performed to determine whether all the ruled lines in the vertical ruled line table 1105 have been examined, and when all the vertical ruled lines have been examined, the processing is thereafter terminated.

(S30) The upper coordinates (start coordinates) of the vertical ruled line, Xs and Ys, are corrected in accordance with the inclination angle tan. The coordinates X and Y obtained after the correction are represented by the previously described equations (2) and (3).

The lower coordinates (end coordinates) of the horizontal ruled line, Xe and Ye, are corrected in accordance with the inclination angle tan. The coordinates X and Y obtained after the correction are represented by the previously described equations (4) and (5).

Program control then returns to step S29.

The horizontal ruled lines, the vertical ruled lines and the ruled line entries (smallest rectangles) are extracted in this manner. The inclination angle is calculated by using the coordinates of the horizontal ruled lines in order to correct a coordinate error due to the tilting of a form. Since the inclination angle is an averaged value, the correct inclination angle can be obtained. Further, the coordinates of the ruled line entries, the horizontal ruled lines and the vertical ruled lines are corrected in accordance with the inclination angle.

(b) Explanation of a Group Sorting Process

Figure 32:
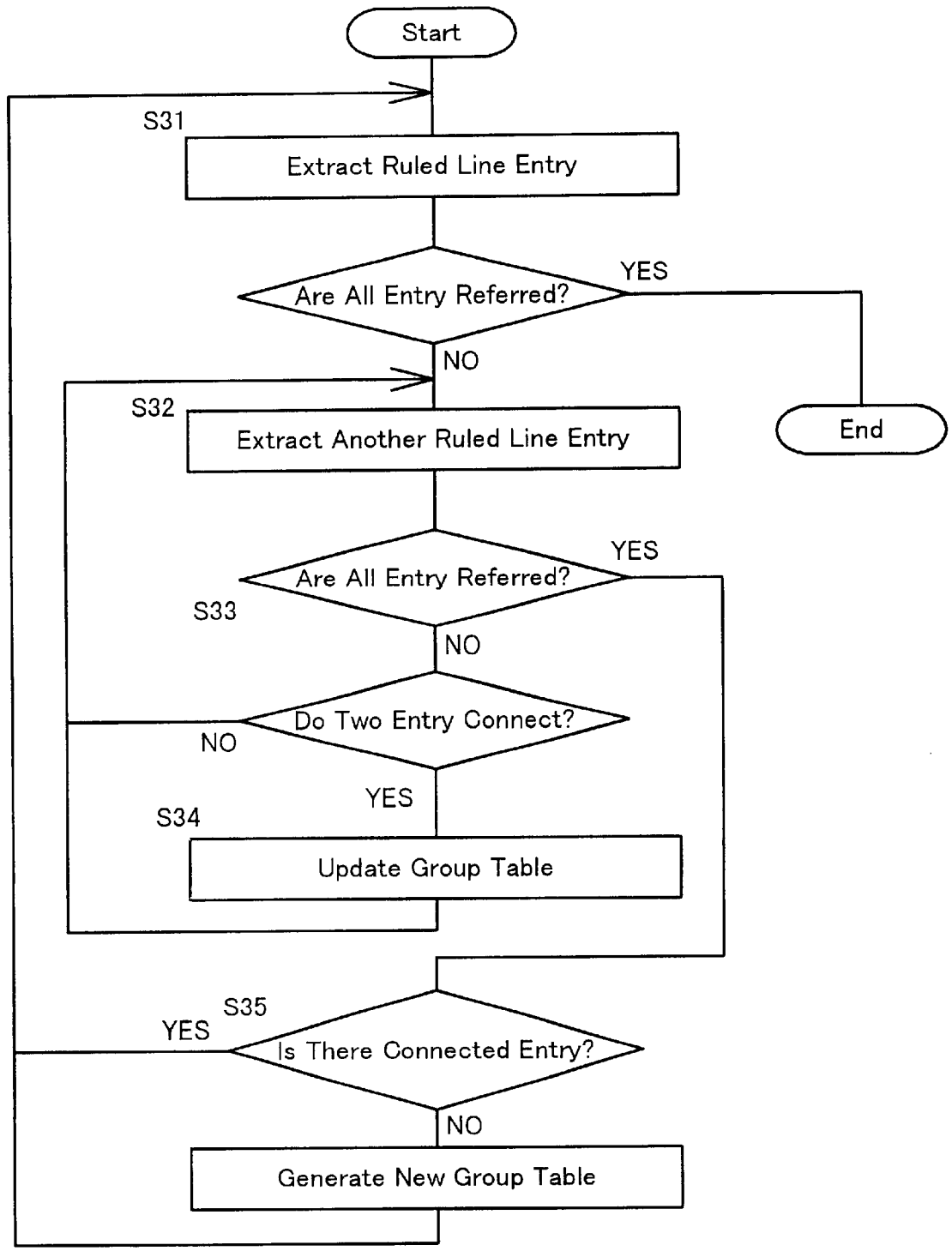
FIG. 32 is a flowchart showing the group processing.

FIG. 32 is a flowchart showing the group processing and FIG. 33 is a diagram for explaining the updating of a table after the group processing has been performed.

(S31) A ruled line entry in the ruled line entry table 1104 is examined, and a check is performed to determine whether all the ruled line entries have been examined. If they have, the processing is terminated.

(S32) Another ruled line entry is extracted from the ruled line entry table 1104, and a check is performed to determine whether all the other ruled line entries have been examined. If they have, program control advances to step S35.

(S33) If all the ruled line entries have not been examined, a check is performed to determine whether the two extracted ruled line entries are connected together. That is, a check is performed to determine whether the positional relationship between the two ruled line entries is a connection relationship, as was explained while referring to FIG. 8. If the two ruled line entries are not connected, program control returns to step S32.

(S34) If the two ruled line entries are connected, data for one of these ruled line entries is reflected in the group information table 1100, wherein the other ruled line entry belongs. As is shown in FIG. 33, the group information table 1100 consists of a group number GN, the start coordinates SC, the end coordinates EC, the number of ruled line entries RIN, the number of blocks BLN, the number of logical rows LR, the first ruled line entry address HLA, the first logical row information address HRA, and the first block address HBA. The coordinates SC and EC of a group rectangle and the number of ruled line entries RIN in the group information table 1100 are updated. Also, the group number is entered in the ruled line entry table 1104. Program control then returns to step S32.

(S35) When it is ascertained that all the ruled line entries have been examined a check is performed to determine whether there is a ruled line entry which is connected to a specific ruled line entry. If a connected ruled line entry is present, program control returns to step S31. If there is no connected ruled line entry, new group information is created for the group information table 1100. Program control then returns to step S31.

The example form in FIG. 2 is sorted into two groups, as is shown in the group information table 1100 in FIG. 33.

The individual ruled line entries are grouped in this manner so as to sort the entries into a chart portion and another portion.

(c) Explanation of an Element Sorting Process

Figure 34:
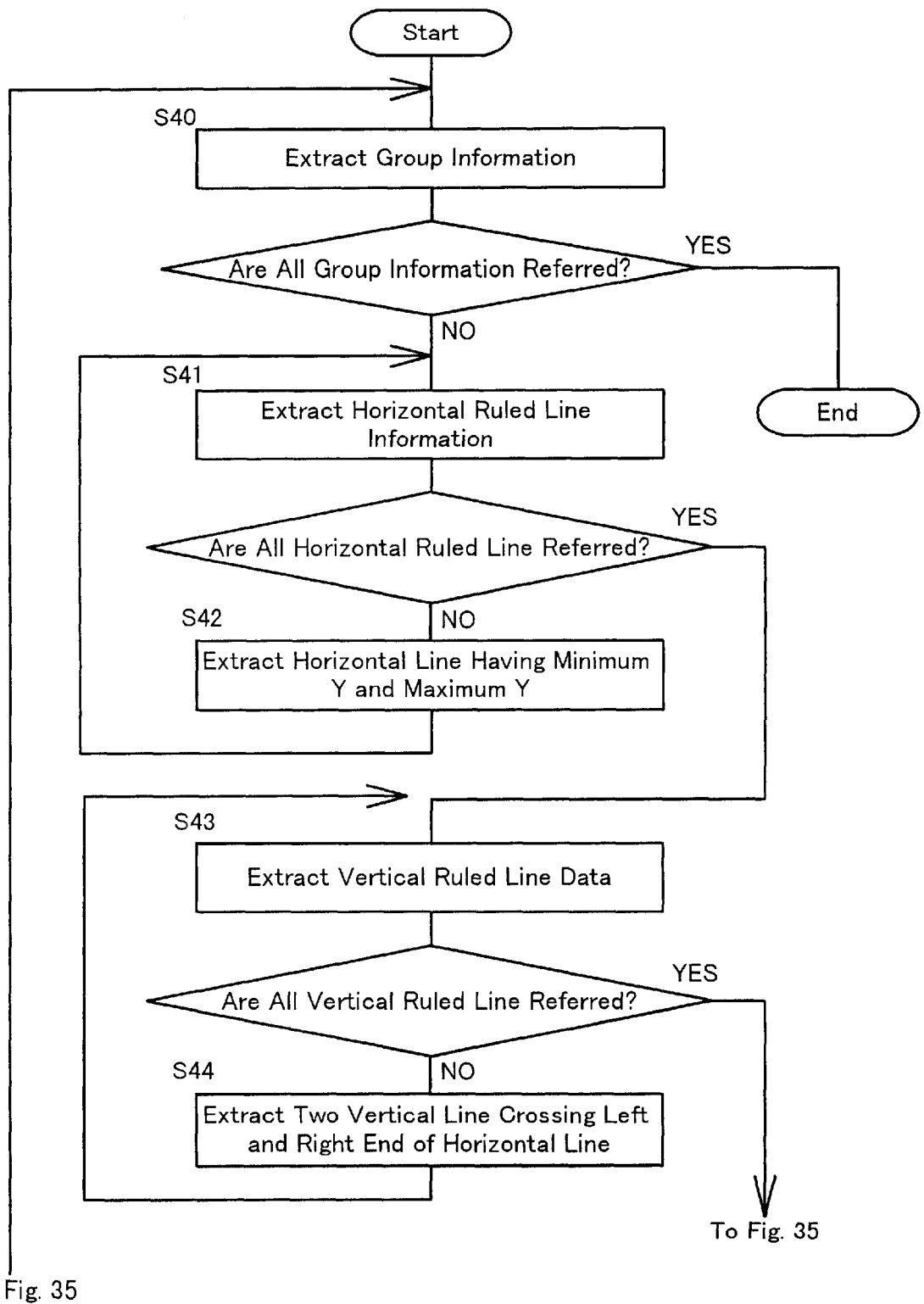
FIG. 34 is a flowchart (I) showing the element sorting processing.
Figure 35:
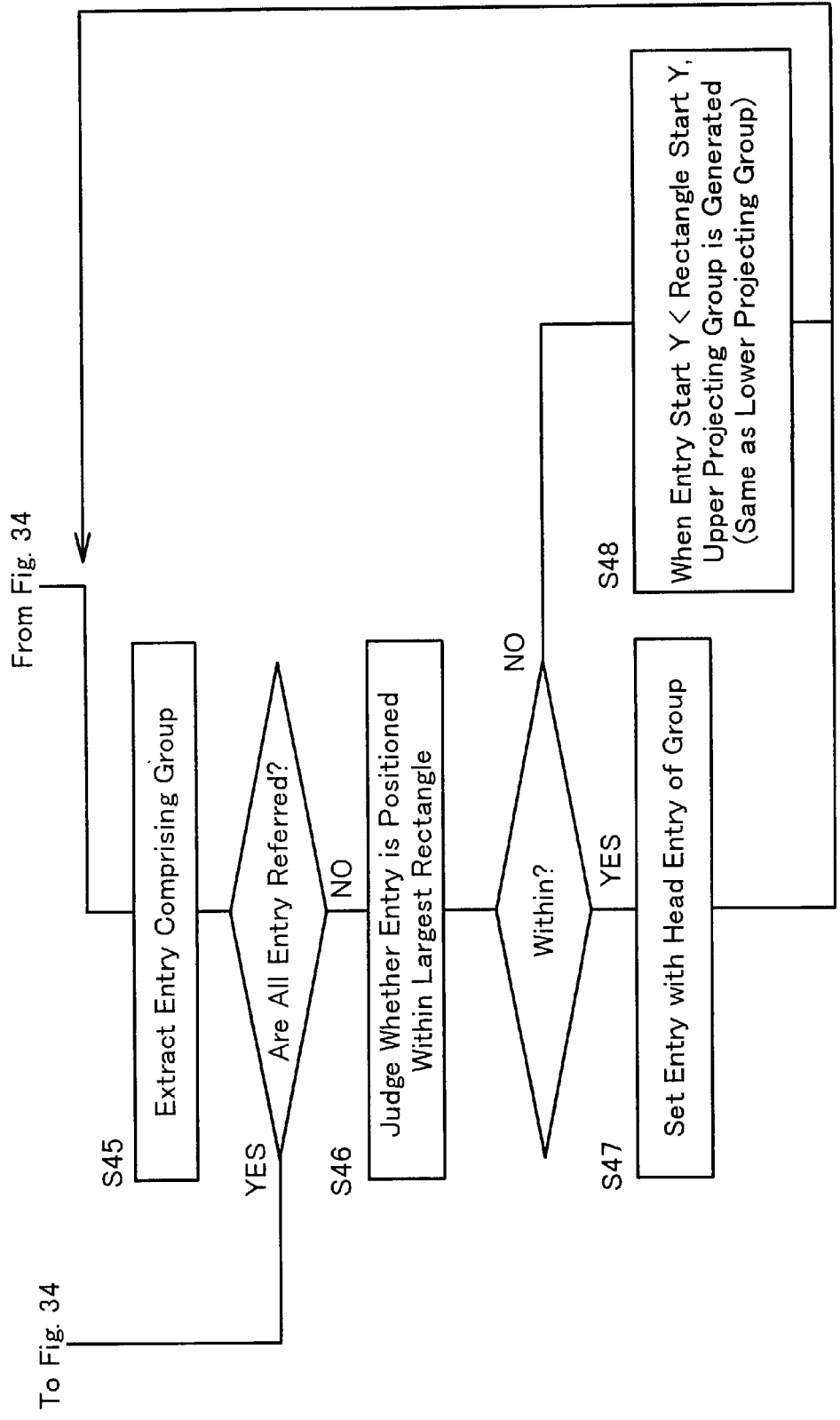
FIG. 35 is a flowchart (II) showing the element sorting processing.

FIGS. 34 and 35 are flowcharts showing the element sorting processing, and FIGS. 36 and 37 are diagrams for explaining tables after the sorting process.

(S40) Group information is extracted from the group information table 1100, and a check is performed to determine whether all the group information has been examined. If it has, the processing is terminated.

(S41) The horizontal ruled lines for the pertinent group are extracted from the horizontal ruled line table 1105, and a check is performed to determine whether all the horizontal ruled lines for the group have been examined. If they have, program control goes to step S43.

(S42) The horizontal ruled lines are compared with each other, and horizontal ruled lines are extracted which extend from one side to the other of the group and which have the smallest Y coordinate and the greatest Y coordinate. Program control then returns to step S41.

(S43) The vertical ruled line information is extracted from the vertical ruled line table 1106, and a check is performed to determine whether all the vertical ruled lines have been examined. If they have, program control advances to step S45 (FIG. 35).

(S44) Two vertical ruled lines are extracted which intersect opposite ends of the horizontal ruled lines having the smallest Y coordinate and the greatest Y coordinate. Program control then returns to step S43.

(S45) Ruled line entries constituting the group are examined in the ruled line entry table 1104, and a check is performed to determine whether all the ruled line entries for the pertinent group have been examined. If they have, program control returns to step S40 in FIG. 34.

(S46) At steps S42 and S44, the two horizontal ruled lines and the two vertical ruled lines were extracted which together constitute the largest rectangle of the pertinent group. Now, a check is performed to determine whether a ruled line entry is included in the largest rectangle. That is, a check is performed to determine whether the ruled line entry is positioned within a range (a circumscribed rectangle) defined by the horizontal and the vertical ruled lines which were extracted.

(S47) If the ruled line entry falls within the range, it is designated a member of the pertinent group. Further, when the group information matches the start coordinates of the pertinent ruled line entry, the first ruled line entry address HLA entered for the group information is also entered for the pertinent ruled line entry. Program control then returns to step S45.

(S48) If the pertinent ruled line entry is outside the range, the start Y coordinate of the ruled line entry is compared with the start Y coordinate of the circumscribed rectangle. When the start Y coordinate of the ruled line entry is greater than the start Y coordinate of the circumscribed rectangle, the ruled line entry is determined to be a member of the upper projecting section. If the upper projecting section has been prepared, a check is performed to determine whether the pertinent ruled line entry is connected to a ruled line entry in the upper projecting section. If the pertinent ruled line entry is connected to a ruled line entry in the upper projecting section, the pertinent ruled line entry is added to the group.

The same process is performed for the lower projecting section. If the start Y coordinate of the ruled line entry is smaller than the start Y coordinate of the circumscribed rectangle, the ruled line entry is determined to be a member of the lower projecting section. If the lower projecting section has been prepared, a check is performed to determine whether the pertinent ruled line entry is connected to a ruled line entry in the lower projecting section. If the pertinent ruled line entry is connected to a ruled line entry in the lower projecting group, the pertinent ruled line entry is added to the group. Program control then returns to step S45.

In this manner, the individual groups are sorted and determined to belong to the main chart portion, the upper projecting portion and the lower projecting portion of the chart. In FIG. 2, the form has two groups, but these are sorted into four groups. That is, four groups are obtained, as is shown in the group information table 1100 in FIG. 37. The ruled line entries are sorted into four groups, as is shown in the ruled line entry table 1104 in FIG. 36, i.e., four group numbers are obtained.

(d) Explanation of a Logical Row Sorting Process

Figure 38:
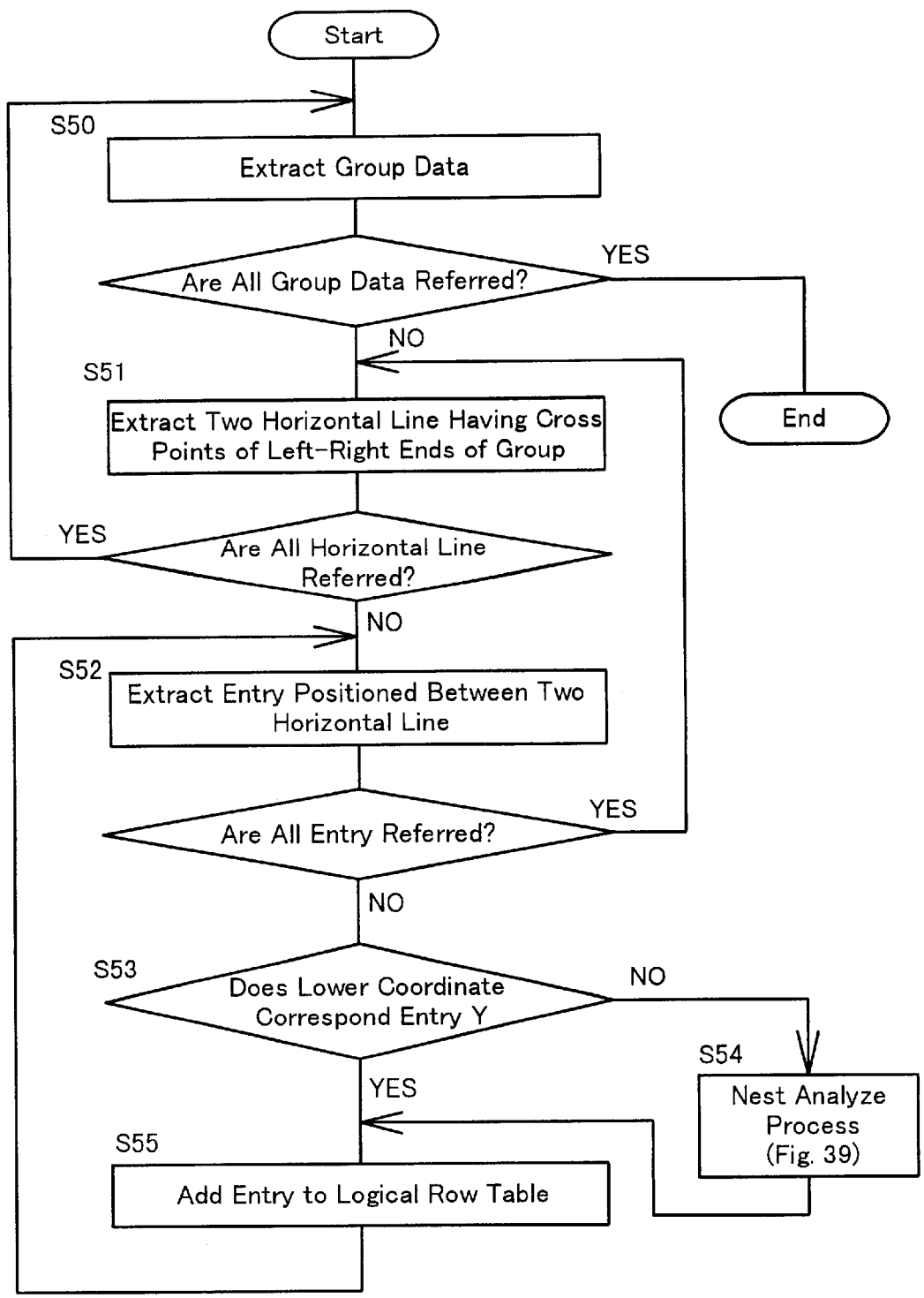
FIG. 38 is a flowchart showing the logical row sorting processing.
Figure 39:
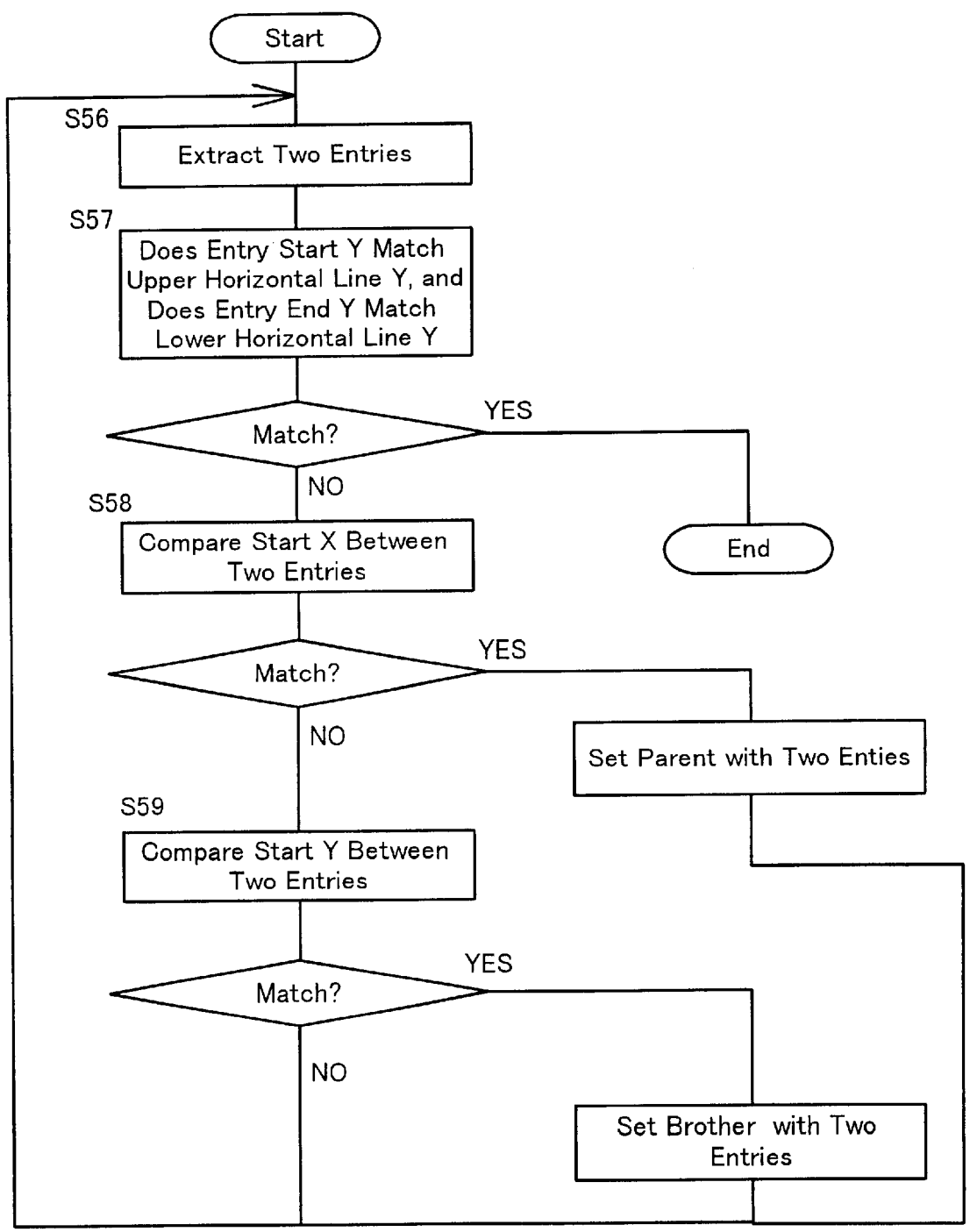
FIG. 39 is a flowchart showing the nested structure analysis processing.

FIG. 38 is a flowchart showing the logical row sorting processing; FIG. 39 is a flowchart showing the nested structure analysis processing; and FIGS. 40 and 41 are diagrams for explaining the tables after the logical rows have been extracted.

(S50) Group information is extracted from the group information table 1100, and a check is performed to determine whether all the group information has been examined. If it has, the processing is terminated.

(S51) Two horizontal ruled lines which intersect the right and left ends of a group are extracted from the horizontal ruled line table 1105, and a check is performed to determine whether all the horizontal ruled lines have been examined. If they have, program control is returned to step S50.

(S52) If all the horizontal ruled lines have not been examined, a ruled line entry which constitutes the pertinent group, and which is positioned along the two horizontal ruled lines, is extracted from the ruled line entry table 1104, and a check is performed to determine whether all the ruled line entries have been examined. If they have, program control returns to step S51.

(S53) A check is performed to determine whether the coordinates of the lower of the two horizontal ruled lines match the smaller Y coordinate of the ruled line entry.

(S54) When the coordinates do not match, it is assumed that the chart structure is a nested structure, as is shown in FIGS. 12A and 12B, and the nested structure analysis process in FIG. 39, which will be described later, is performed.

(S55) The logical row table 1102 is prepared in order to sort ruled line entries into logical rows. If a logical row table has been prepared, the pertinent ruled line entry is added thereto. If a logical row table has not yet been prepared, it is created.

In this manner, the ruled line entries for each group are sorted into logical rows.

The nested structure analysis processing will now be described while referring to FIG. 39.

(S56) Ruled line entries are extracted from the ruled line entry tables two times, two each time. For example, the first time, the first and the second ruled line entries are extracted, and the second time, the second and the third ruled line entries are extracted.

(S57) A check is performed to determine whether the start Y coordinate of each ruled line entry matches the Y coordinate of the upper horizontal ruled line of the logical row, and whether the end Y coordinate of the ruled line entry matches the Y coordinate of the lower horizontal ruled line of the logical row. When the X and Y coordinates match, the processing is thereafter terminated.

(S58) If the X and Y coordinates do not match, the start X coordinates of the two ruled line entries are compared. If the start X coordinates of the two ruled line entries do not match, program control advances to step S59. If the start X coordinates of the two ruled line entries match, as is shown in FIG. 12A, the parenthood relationship is designated for the two ruled line entries. Program control then returns to step S56.

(S59) When the X coordinates do not match, the start Y coordinates of the two ruled line entries are compared. If the start Y coordinates of the two ruled line entries do not match, program control moves to step S56. If the start Y coordinates of the two ruled line entries match, as is shown in FIG. 12A, the brotherhood relationship is designated for the two ruled line entries. Program control then returns to step S56.

As is shown in FIG. 41, the logical row table 1102 is prepared. The logical row table includes, for each logical row, the row number LN, the start coordinates SC, the end coordinates EC, the group number GN, the block number BN, the number of ruled line entries RIN, the number of logical columns LL, the upper horizontal ruled line number ULN, the lower horizontal ruled line number LLN, the left vertical ruled line number ERN, the right vertical ruled line number RRN, and the first ruled line entry address HLA. As is also shown in FIG. 41, the logical row table 1102 is prepared for the form in FIG. 2.

Furthermore, the number of logical rows LR and the first logical row address HLA are added to the group information table 1100. As is shown in FIG. 40, the nested information IN included in the ruled line entry table 1104 includes a nested flag INF, a rank number KN, a child ruled line entry number CRN, and a ruled line entry link number RLN. The nested flag INF is set to ON when the ruled line entries form the nested structure. Thus, since in the example in FIG. 2 ruled line entries 10, 11 and 12 form the nested structure, the nest flag INF is set to ON.

The rank number KN indicates the depth of the ranks in the nested structure (the number of parenthood relationships). On the form in FIG. 2, a "0" is recorded for the parent ruled line entry 10, while a "1" is recorded for each of the child ruled line entries 11 and 12. As for the number of child ruled line entries CRN, when a parenthood relationship is established for pertinent ruled line entries, the number of child ruled line entries is recorded for the parent ruled line entry. In the form in FIG. 2, the child ruled line entry, "11," is recorded for the parent ruled line entry, "10."

The individual ruled line entries are sorted into logical rows in this manner. The logical rows are useful when searching for rows having the same structure.

An explanation will now be given for the processing performed when combining charts which are separated, as on the second example form in FIG. 3.

Figure 42:
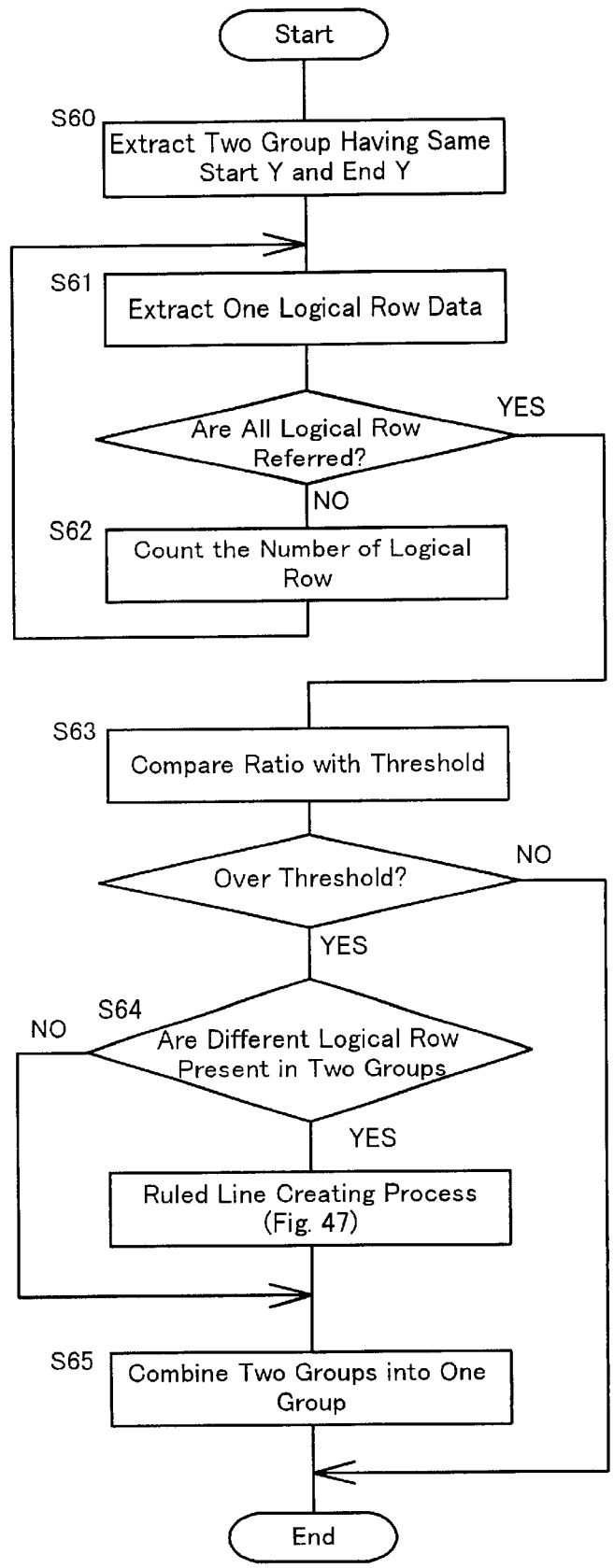
FIG. 42 is a flowchart showing the combining processing.

FIG. 42 is a flowchart showing the chart combining processing; FIGS. 43 and 44 are diagrams for explaining tables before the groups on the second example form are combined; and FIGS. 45 and 46 are diagrams for explaining the tables after the groups on the second example form are combined.

(S60) Two groups having the same start Y coordinate and end Y coordinate are extracted from the group information table 1100.

(S61) Information for logical rows constituting the two groups is extracted set by set, and a check is performed to determine whether all the logical rows have been extracted. If they have, program control moves to step S63.

(S62) In the extracted logical row information, logical rows wherein the start Y coordinate matches the end Y coordinate are counted. Program control then returns to step S61.

(S63) The ratio of the number of matched logical rows to the total number of logical rows is calculated, and is compared with a predetermined threshold value. If the ratio is smaller than the threshold value, it is assumed that the two groups are separate charts, and the processing is thereafter terminated.

Figure 47:
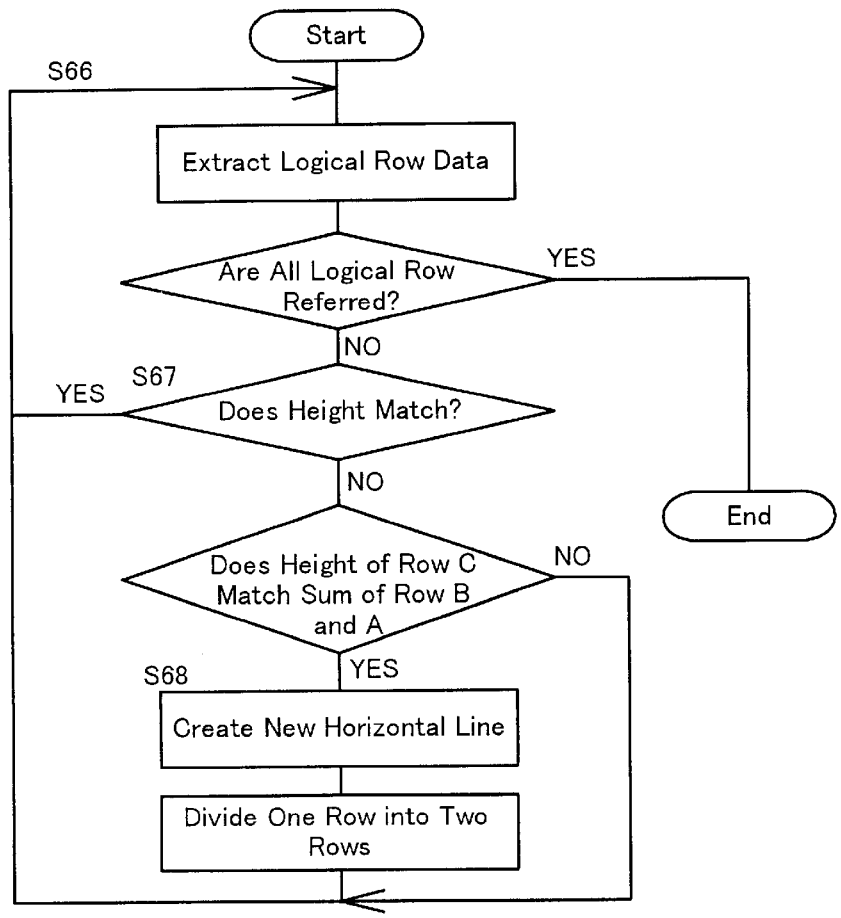
FIG. 47 is a flowchart showing the ruled line creation processing.

(S64) If the ratio is equal to or greater than the threshold value, it is assumed that the two groups form a single chart. A check is then performed to determine whether logical rows having different structures are present in the two groups. If there are such logical rows, the ruled line creation process, which will be described later while referring to FIG. 47, is performed.

(S65) The two groups are combined into one group, and the processing is thereafter terminated.

The example form in FIG. 3 is employed for the explanation. on the form in FIG. 3, the ruled line entry table 1104 is set up as is shown in FIG. 43, and the logical row table 1102 and the group information table 1100 are set up as shown in FIG. 44. In other words, four groups are obtained. In the previously described combination process, groups 2 and 4 are combined. That is, as is shown in FIG. 45, the logical row for group 4 is deleted from the logical row table 1102, and group 4 is also deleted from the group information table 1100. Similarly, in the logical row table 1102 and the group information table 1100, the number of ruled line entries for group 4 is added to the number of ruled line entries for group 2. The group numbers of the ruled line entries for group 4 are changed to those for group 2. Furthermore, in the horizontal ruled line table 1105, the end X coordinates of the horizontal ruled lines for the logical rows in group 2 are extended to the end X coordinates for group 4.

As is described above, the charts are combined by determining whether the logical row structures of the groups are the same or similar.

Figure 48:
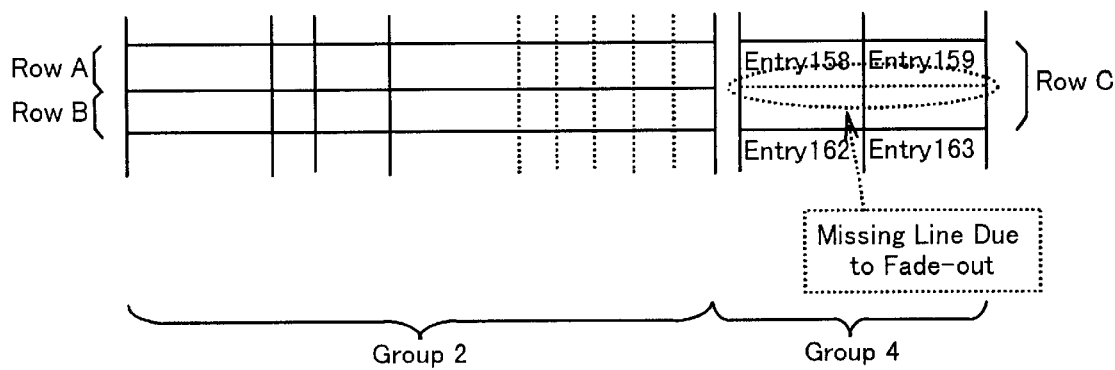
FIG. 48 is a diagram for explaining the creation of a ruled line.

The ruled line creation process in FIG. 42 will now be described. FIG. 47 is a flowchart showing the ruled line creation processing; FIG. 48 is a diagram for explaining the creation of a ruled line; and FIGS. 49 and 50 are diagrams for explaining tables after a ruled line has been created.

(S66) Logical row information is extracted from two groups, and a check is performed to determine whether all the logical rows have been extracted. If they have, the processing is terminated.

(S67) A check is performed to determine whether the two logical rows are the same height. When the two logical rows are the same height, the ruled line creation process is not required and program control returns to step S66. If the two logical rows are not the same height, logical row information for the next row is extracted and a check is performed to determine whether the sum of the heights of the rows A and B in a specific group matches the height of the row C in another group. As is shown in FIG. 48, assume that the logical rows A and B in group 2 correspond to the logical row C in group 4. In this case, a ruled line for the logical row C in group 4 is missing due to fade-out. Thus, the sum of the heights of the rows A and B in group 2 matches the height of the row C in group 4. If the heights do not match, program control returns to step S66.

(S68) If the sum of the heights of rows A and B matches the height of row C, a horizontal ruled line which has the same Y coordinate as the boundary between rows A and B is generated in row C. Then, the one row is divided into two rows and program control returns to step S66.

In this manner, a ruled line that is missing due to fade-out is detected from the chart structure and is generated. As is shown in FIG. 49, in the ruled line entry information table 1104, the lower horizontal ruled line numbers for ruled line entries 158 and 159 are changed to the number of a newly created horizontal ruled line number; the end Y coordinate is changed to that of the horizontal ruled line; and the additional ruled line entries 160 and 161 are created. In the logical row table 1102 in FIG. 50, row C is horizontally divided into two segments, and the lower logical row is added to the logical row table. In the group information table 1100, the logical row count for group 4 is incremented by one.

(e) Explanation of a Block Sorting Process

Figure 51:
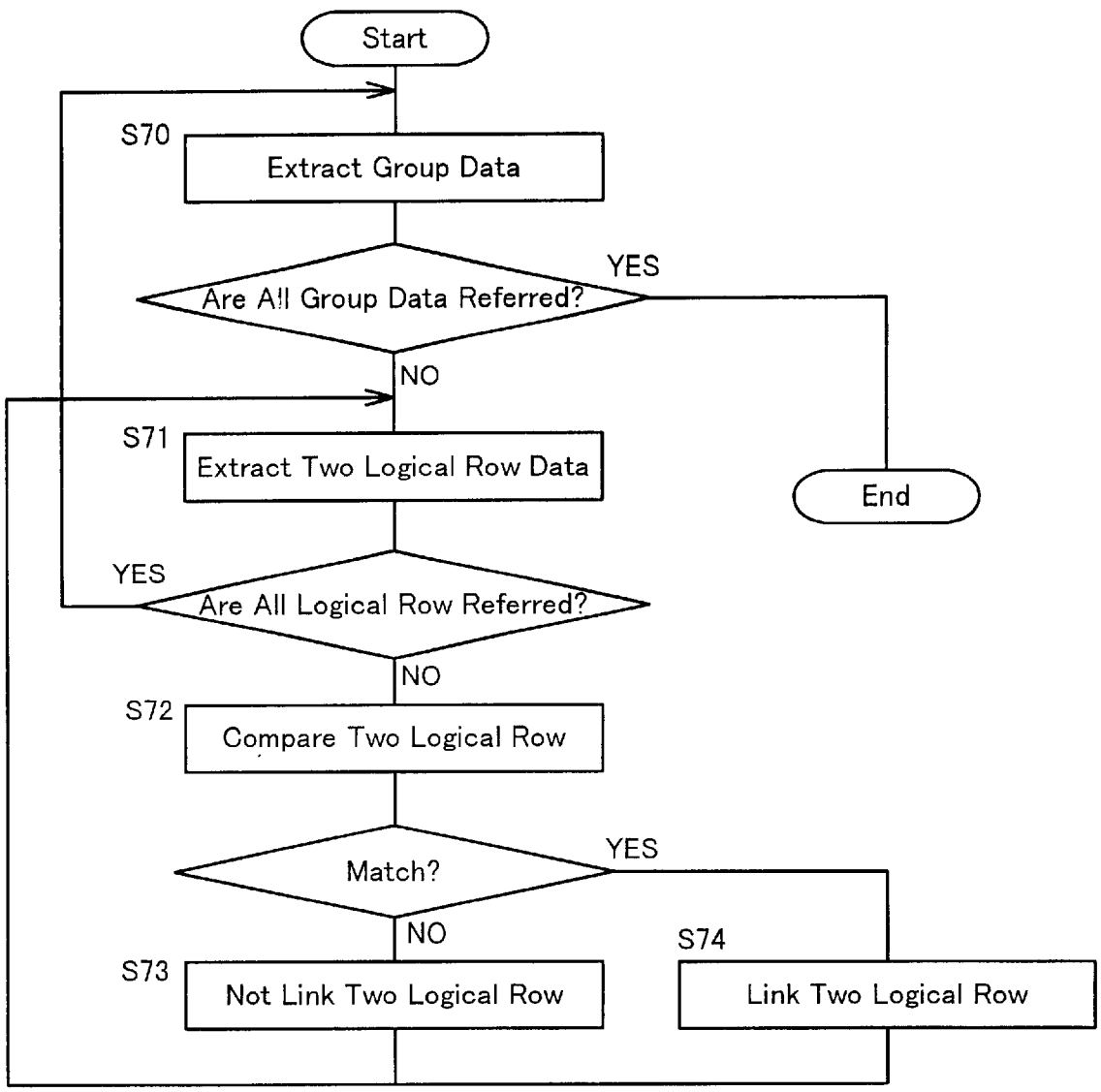
FIG. 51 is a flowchart showing the block sorting processing.

FIG. 51 is a flowchart showing the block sorting processing, and FIGS. 52 and 53 are diagrams for explaining the tables after the blocks have been sorted.

(S70) Group information is extracted from the group information table 1100, and a check is performed to determine whether all the group information has been extracted. If it has, the processing is terminated.

(S71) In a pertinent group, two logical rows are extracted at a time. For example, the first time the first and the second logical rows are extracted, and the second time the second and the third logical rows are extracted, and each time a check is performed to determine whether all the logical rows have been extracted. If they have, program control returns to step S70.

(S72) The structures of the two extracted logical rows are compared. Specifically determined during this comparison are whether the number of ruled line entries constituting the two logical rows are the same, whether the ruled line entries are arranged in the same manner for the two logical rows, and whether the logical rows have the same height and width.

(S73) When the logical row structures do not match, it is ascertained that the logical rows constitute different blocks. Therefore, block information is prepared which does not provide for the linking the two logical rows. Program control then returns to step S70.

(S74) When the logical row structures match, it is ascertained that the both logical rows constitute the same block. Therefore, block information is prepared which provides for the linking of the two logical rows. Program control then returns to step S70.

In this manner, for each group, logical rows having the same structure are sorted into one block. As is shown in FIG. 53, the block information table 1101 includes a block number BN, the start coordinates SC, the end coordinates EC, a group number GN, the number of ruled line entries RIN, the number of logical rows LN, the number of logical columns RO, the first logical row address HRA, the first logical column address HAA, the upper horizontal ruled line number ULN, the lower horizontal ruled line number LLN, the left vertical ruled line number LVN and the right vertical ruled line number RVN.

For each block, the start coordinates SC, the end coordinates EC, the group number GN, the number of ruled line entries RIN, the number of logical rows LN, the first logical row address HRA, the first logical column address HAA, the upper horizontal ruled line number ULN, the lower horizontal ruled line number LLN, the left vertical ruled line number LVN and the right vertical ruled line number RVN are entered in the block information table 1101.

In addition, as is shown in FIG. 52, the block numbers BN of the individual ruled line entries are entered in the ruled line entry table 1104, and the block numbers BN of the logical rows are entered in the logical row table 1102. Further, as is shown in FIG. 53, for each group the number of blocks BLN and the first block number address are entered in the group information table 1100.

Figure 55:
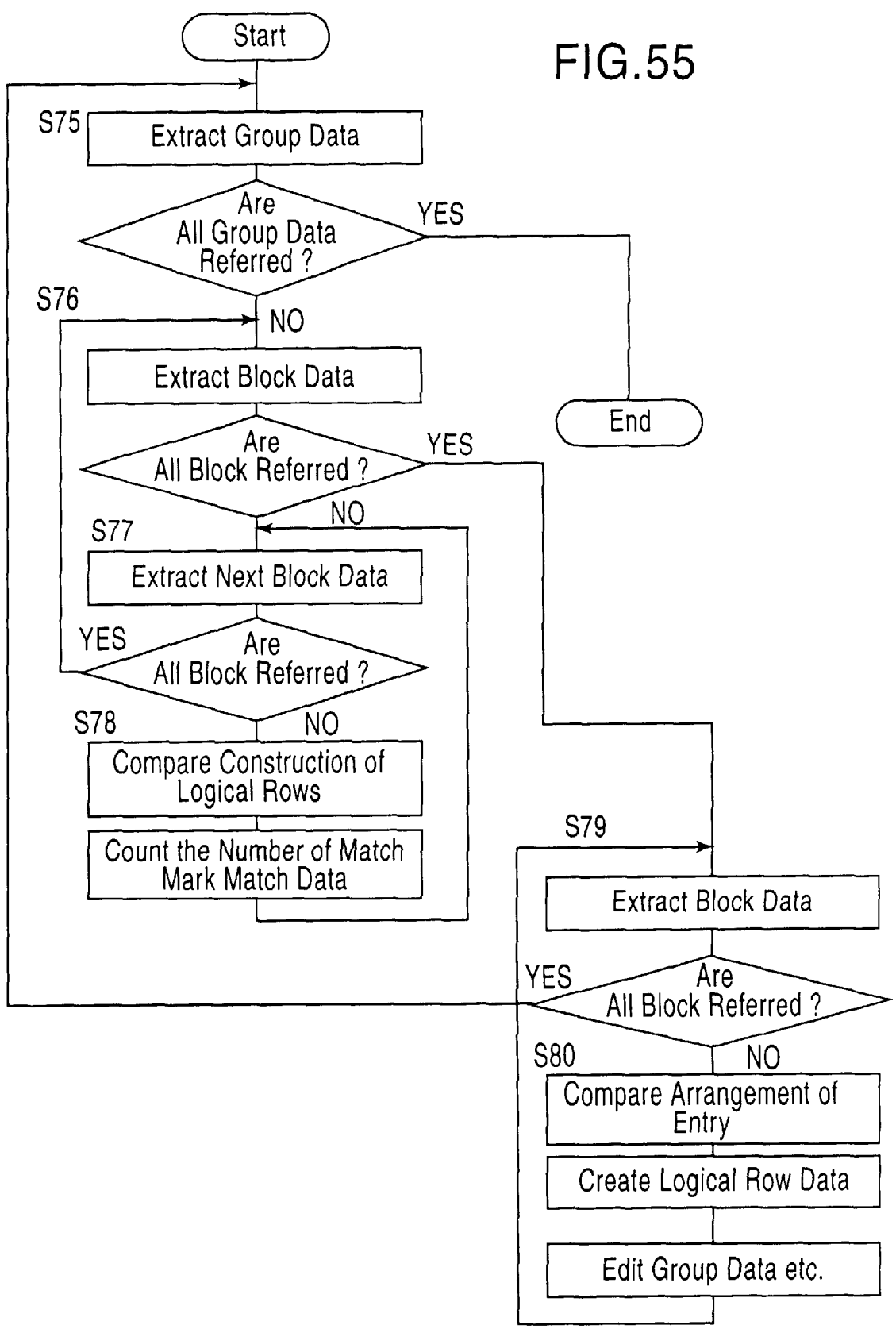
FIG. 55 is a flowchart showing the ruled line recovery processing.

An explanation will now be given for the process for combining blocks which are sorted separately. FIG. 54 is a diagram for explaining the ruled line recovery process; FIG. 55 is a flowchart showing the ruled line recovery processing; FIGS. 56 and 57 are diagrams for explaining a table before the ruled line recovery process has been performed; and FIGS. 58 to 60 are diagrams for explaining the table after the ruled line recovery process has been performed.

As is shown in FIG. 54, assume that in the first example form in FIG. 2, ruled lines in ruled line entries 63 and 64 are missing due to fade-out. Since this portion has a structure that differs from those of the logical rows above and below, it is designated block B. Further, since block B includes only one logical row, the order in which the ruled line entries are extracted differs from that for the other rows. The processing will now be described while referring to FIG. 55.

(S75) Group information is extracted from the group information table 1100, and a check is performed to determine whether all the group information has been extracted. If it has, the processing is terminated.

(S76) The block information for a pertinent group is extracted from the block information table 1101, and a check is performed to determine whether all the block information has been extracted. If it has, program control advances to step S79.

(S77) The next block information entry is extracted from the block information table 1101, and a check is performed to determine whether all the block information has been extracted. If it has, program control returns to step S76.

(S78) The structures of logical rows constituting two block information sets are compared. Specifically determined during this comparison are whether the same number of ruled line entries constitute the logical rows of the two blocks, whether the arrangements of the ruled line entries for the logical rows match, and whether the logical rows have the same height and width. Block information sets that match each other are marked, and program control then returns to step S77.

(S79) A block which has the maximum number of matches is employed as a reference block, and a block which has the minimum number of matches is extracted from the block information table 1101. By referring to FIG. 54, block A is extracted as the reference block, and block B is extracted as the block having the minimum number of matches. A check is then performed to determine whether all the block information has been extracted. If it has, program control returns to step S75.

(S80) The arrangement of the ruled line entries in the logical rows of the reference block A is compared with that of the block B. For this comparison, the coordinates of a ruled line entry are converted into coordinates relative to the start X and Y coordinates of the logical row. When the arrangements of the ruled line entries differ, the height h1 of the ruled line entry in block A is compared with the height h2 of a ruled line entry in block B. When h1<h2, it is ascertained that a ruled line between the ruled line entries in block B is missing. Thus, the ruled line entry in block B is divided so that its height matches the height of the ruled line entry in block A, and temporary logical row information is prepared for block B. When the logical row in block A matches the logical row in block B, the group information, the block information and the logical row information for block B, and the ruled line entry information and the horizontal ruled line information are edited. Program control then returns to step S79.

This process will be described while referring to the example in FIG. 54. Before the ruled line has been recovered, the arrangement of the table is as shown in FIGS. 56 and 57. In the ruled line entry table 1104 in FIG. 56, ruled line entries 59 to 66 are assigned to block 3, and ruled line entries 47 and 48 are assigned to block 2.

After the ruled line has been recovered, as is shown in FIG. 58 the end coordinates of ruled line entries 63 and 64 in the ruled line entry table 1104 are changed to the coordinates of horizontal ruled line 12, and ruled line entries 177 and 178 are newly created. The block numbers for the ruled line entries which are defined by upper horizontal ruled line 11 and lower horizontal ruled line 12, and for the ruled line entry which is defined by upper horizontal ruled line 11 and lower horizontal ruled line 13 are changed to block 2. The logical row numbers of these ruled line entries are changed to the serial numbers in block 2, and the lower horizontal ruled line number "13" for the ruled line entry is changed to "12." The table 1104 is sorted so that the order in which all the ruled line numbers in the same group are arranged corresponds to that of the logical rows, and so that the order in which the ruled line entries having the same logical row number are arranged corresponds to that of the X coordinates. The block numbers of the ruled line entries following group 3 and block 4 are changed to block 2, and the logical row numbers are changed to the serial numbers in block 2.

In the logical row table 1102 in FIG. 59, the logical row information for group 3 and block 3 is changed to information falling within a range enclosed by the horizontal ruled lines 11 and 12. The block number of the logical row information for group 3 and block 3 is changed to block 2. The logical row number is changed to a serial number (4) in block 2. The number of ruled line entries in group 3 and block 2 is changed to "14", and the lower horizontal ruled line number is changed to "12". A new logical row number for group 3 and block 2 is generated. The block numbers for the logical rows for groups following the group 3 and block 4 are changed to block 2. And the logical row number is changed to a serial number in block 2.

In the block information table 1101 in FIG. 59, the number of ruled line entries for group 3 and block 2 is changed to "140", the number of logical rows is changed to "10" and the lower horizontal ruled line is changed to "19", and blocks 3 and 4 in group 3 are deleted.

In the group information table 1100 in FIG. 60, the number of blocks in group 2 is changed to "2" and the number of ruled line entries is changed to "147". In the horizontal ruled line table 1105, the end Y coordinate of horizontal ruled line 12 is changed and given the same coordinate value as that of horizontal ruled line 11, and horizontal ruled line 13 is deleted.

The structure of the logical rows in different adjacent blocks is compared, and a block having a structure similar to that of the reference block is found. A ruled line is then added so that the similarly structured block has the same logical row structure as the reference block. In this manner, a missing ruled line can be recovered.

Figure 61:
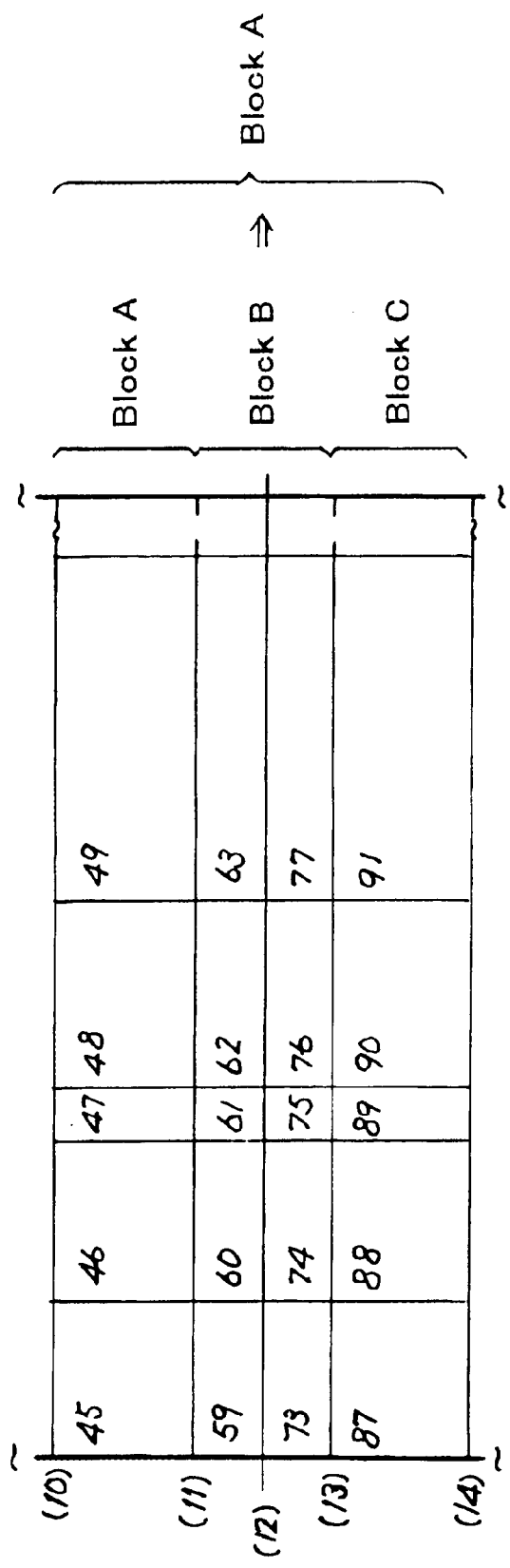
FIG. 61 is a diagram for explaining the logical row assembly processing.
Figure 62:
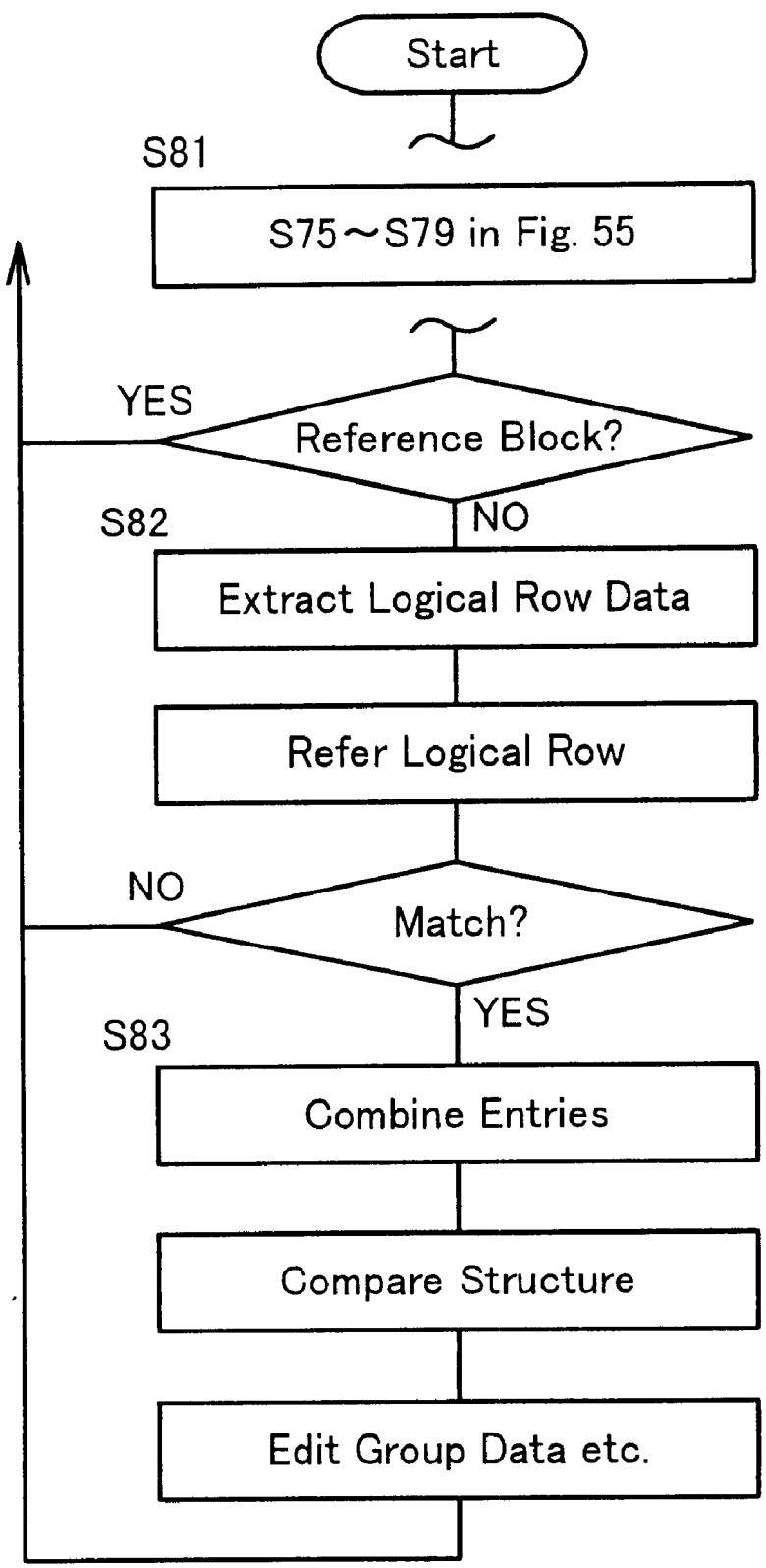
FIG. 62 is a flowchart showing the logical row combining processing.

An explanation will now be given for the processing whereby, when a ruled line entry on a form is separated into blocks by entering a strikeout line, these blocks are combined to form one block. FIG. 61 is a diagram for explaining the logical row combining process; FIG. 62 is a flowchart showing the logical row combining processing; FIGS. 63 and 64 are diagrams for explaining tables before the logical rows have been combined; and FIGS. 65 to 67 are diagrams for explaining the tables after the logical rows have been combined.

In FIG. 61 is shown an example where a strikeout line is drawn in a ruled line entry on a form. A horizontal ruled line is entered as a strikeout line between ruled line entries 59 and 73. In their original form, ruled line entries 59 and 73 are actually a single ruled line entry. But since with the entry of the strikeout line the single ruled line entry is divided into two rows, the two divided rows must be recombined to form one row. Furthermore, since the contents are corrected, even when a ruled line entry is partially divided by a correction line, the nested structure analysis can be performed by the combining process.

The logical row combining processing will now be described while referring to the flowchart in FIG. 62.

(S81) The processes at steps S75 to S79 in the ruled line recovery process in FIG. 55 are performed to extract a block which has a different number of matches than has a reference block, and a check is performed to determine whether a block currently being examined is the reference block. If the pertinent block is the reference block, program control returns to step S79 (FIG. 55).

(S82) The logical row information for the block being examined is extracted from the logical row table 1102. The height of each logical row below the block being examined is added to the height of the first logical row of the examined block, and the examination of the logical row is repeated until the resultant height matches that of the reference block. Each time it is found that the height does not match that of the reference block, program control is returned to step S79 (FIG. 55).

(S83) When the heights match, all the ruled line entries which constitute the logical row being examined, and which are vertically connected, are combined. That is, the ruled line entries having the same Y coordinate and sharing a specific Y coordinate are combined. Further, a temporary logical row formed by the resultant ruled line entry is generated. The structure of the generated logical row is then compared with the logical row structure of the reference block, and when the two logical row structures match, the group information, the block information, the logical row information and the ruled line entry information are edited. Program control then returns to step S79 (FIG. 55).

In this manner, the reference block and a specific block having a structure differing from that of the reference block are extracted, and the presence of a strikeout line is detected by comparing the height of the specific block with the height of the reference block. When a strikeout line is detected, the ruled line entries which are positioned vertically relative to each other are combined, and a temporary logical row is generated. The structure of the temporary logical row is then compared with the logical row structure of the reference block to determine whether the two structures match. As a result, the strikeout line or the correction line can be removed.

When a strikeout line is drawn as is shown in FIG. 61, the ruled line entry table 1104 is prepared as is shown in FIG. 63, and the logical row information table 1102, the block information table 1101 and the group information table 1100 are prepared as is shown in FIG. 64.

When the strikeout line in FIG. 61 is removed and blocks A, B and C are combined as block A, as is shown in FIG. 65, in the ruled line entry table 1104 the end coordinates for ruled line entries 59 to 72 are changed to the coordinates for horizontal ruled line 13, and the lower horizontal ruled line number is changed to "13." In addition, the block numbers for ruled line entries 59 to 72 are changed to block 2; the logical row numbers for ruled line entries 59 to 72 are changed to the serial numbers in block 2; and ruled line entries 73 to 86 are deleted. For ruled line entries following ruled line entry 101, the block numbers are changed to block 2 and the logical numbers are changed to the serial numbers in block 2.

As is shown in FIG. 66, in the logical row information table 1102, the logical row end Y coordinate for group 3 and block 3 is changed to the Y coordinate of horizontal ruled line 13, and the lower horizontal ruled line number is changed to "13." The block number for group 3 and block 3 is changed to block 2, and the logical row number is changed to the serial number (4) in block 2. Further, the block numbers for logical rows following group 3 and block 4 are changed to block 2, and the logical row numbers are changed to the serial numbers in block 2.

As is shown in FIG. 66, in the block information table 1101, the number of ruled line entries for group 3 and block 2 is changed to "140," the number of logical rows is changed to "10," and the lower horizontal ruled line number is changed to "19." Blocks 3 and 4 in group 3 are deleted from the block information table.

As is shown in FIG. 67, in the group information table 1100, the number of ruled line entries for group 2 is changed to "147," the number of blocks is changed to "2," and the number of logical rows is changed to "11"; and in the horizonal ruled line table 1105, horizontal ruled line 12 is deleted.

(f) Explanation of a Logical Column Determination Process

Figure 68:
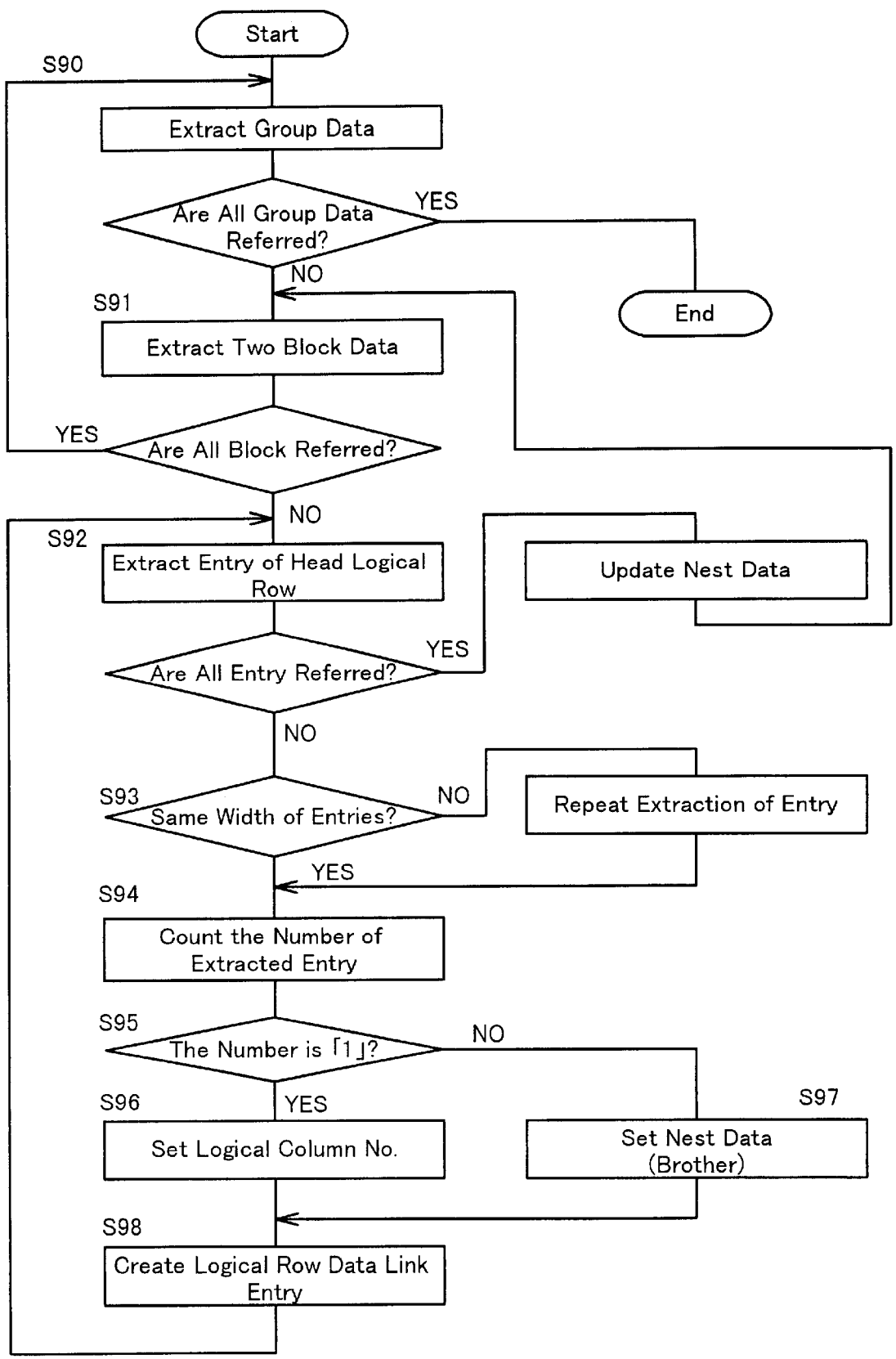
FIG. 68 is a flowchart showing the logical column determination processing.

FIG. 68 is a flowchart showing the logical column determination processing; and FIGS. 69 to 71 are diagrams for explaining tables after the logical column has been determined. The logical column determination processing will now be explained while referring to FIG. 68.

(S90) Group information is extracted from the group information table 1100, and a check is performed to determine whether all the group information has been extracted. If it has, the processing is terminated.

(S91) Block information for two blocks in the extracted group is extracted from the block information table 1101, and a check is performed to determine whether all the block information has been extracted for the pertinent group. If it has, program control returns to step S90.

(S92) Information for ruled line entries which constitute the first logical row of each extracted block are sequentially extracted from the ruled line entry table 1104, and a check is performed to determine whether all the ruled line entry information for the extracted logical row has been extracted. When all the ruled line entry information has been extracted, at step S97 a check is performed to determine whether nested information has been entered. If the nested information has not been entered, it is assumed that the end of the logical column between the two extracted blocks has been reached, and program control returns to step S91. If the nested information has been entered, the group information, the block information and the logical row information are updated. Further, these information sets are also updated for the second and the following logical rows in the pertinent block. Program control then returns to step S91.

(S93) A check is performed to determine whether the ruled line entries of the two logical rows have the same width. If the widths are not the same, the next ruled line entry is extracted for the narrower logical row, and the widths of the current ruled line entry and the next ruled line entry are added together. Thereafter, the resultant total is compared with the ruled line entry of the wider logical row to determine whether the widths of the two logical rows match. The ruled line entry extraction is repeated until the widths of the two logical rows match.

(S94) In this manner, the columnar relationship between the ruled line entries for the first logical row in the first block and the ruled line entries for the first logical row in the second block is obtained.

Then, the extracted ruled line entries are counted.

(S95) In order to detect a nested structure, a check is performed to determine whether the number of the extracted ruled line entries is "1."

(S96) If the number of the ruled line entries is "1," the structure of the ruled line entry is not a nested structure. Therefore, as the logical column number for the extracted rule line entry, the serial number from the left side is selected.

(S97) When the number of ruled line entries is not "1," the ruled line entries have a nested structure. Therefore, the same serial number as the logical column number is selected for the ruled line entries in the nested structure, and the nested information is inserted for the ruled line entries constituting the nested structure.

(S98) The logical column information is prepared, and a link joining the ruled line entries in the same logical column is established. At this time, a link is established joining the ruled line entries which have the same column number in the same group but in different blocks and logical rows. Program control then returns to step S92.

In this manner, whether the vertically connected blocks have the same columnar structure is determined. And if the blocks have the same columnar structure, they are connected together in each column.

The first example form in FIG. 2 is employed for the explanation. As is shown in FIG. 69, in the ruled line entry information table 1104, the logical column number is entered in the column number area RO for the ruled line entry. For example, column number "1" is entered for ruled line entries 10, 11 and 12 in block 1. In block 2, the ruled line entries having the same width as these ruled line entries are entries 17 and 18. Therefore, the same column number, "1," is entered for ruled line entries 17 and 18 in block 2.

Following this, the nested information IN is set on for the ruled line entries constituting the nested structure. In FIG. 69, the nested information is also set on for the ruled line entries 17 and 18, and similarly, the nested information is set on for the ruled line entries (e.g., 31 and 32) constituting the same logical column. Further, address link HAA is designated for the ruled line entries constituting the same logical column.

The nested information IN includes a nested flag INF, a rank number KN, a child ruled line entry number CRN and a ruled line entry link serial number RLN. Since ruled line entries 17 and 18 have a nested structure, the nested flag INF is set to ON. And as the parenthood relationship has not been established for the two ruled line entries 17 and 18, a "0" is entered for the rank number KN and a "0" is entered for the child ruled like entry number CRN. Instead, since the brotherhood relationship is established between the two ruled line entries 17 and 18, a "0" is entered for the link number RLN for the ruled line entry 17, and a "1" is entered for the link number RLN for the ruled line entry 18.

As is shown in FIG. 70, in the logical row information table 1102, the number of logical columns LL for the logical row 2 is changed to "5," and the logical column information table 1103 is newly prepared. The logical column information table 1103 includes a logical column number RO, the start coordinates SC, the end coordinates EC, a group number GN, a block number BN, the number of ruled line entries RIN, the upper horizontal ruled line number ULN, the lower horizontal ruled line number LLN, the left vertical ruled line number ELN, the right vertical ruled line number RRN, and the first ruled line entry address HLA. These information sets are prepared in accordance with the columnar relationship described above.

Furthermore, as is shown in FIG. 71, in the block information table 1101, the number of logical columns in group 3 and block 2 is changed to "5," and the first logical column address HAA is entered for each block.

In this manner, the columnar relationship for the ruled line entries in the blocks is determined for each group. The table wherein the columnar relationship is described is updated in accordance with the results obtained by the determination.

Figure 72:
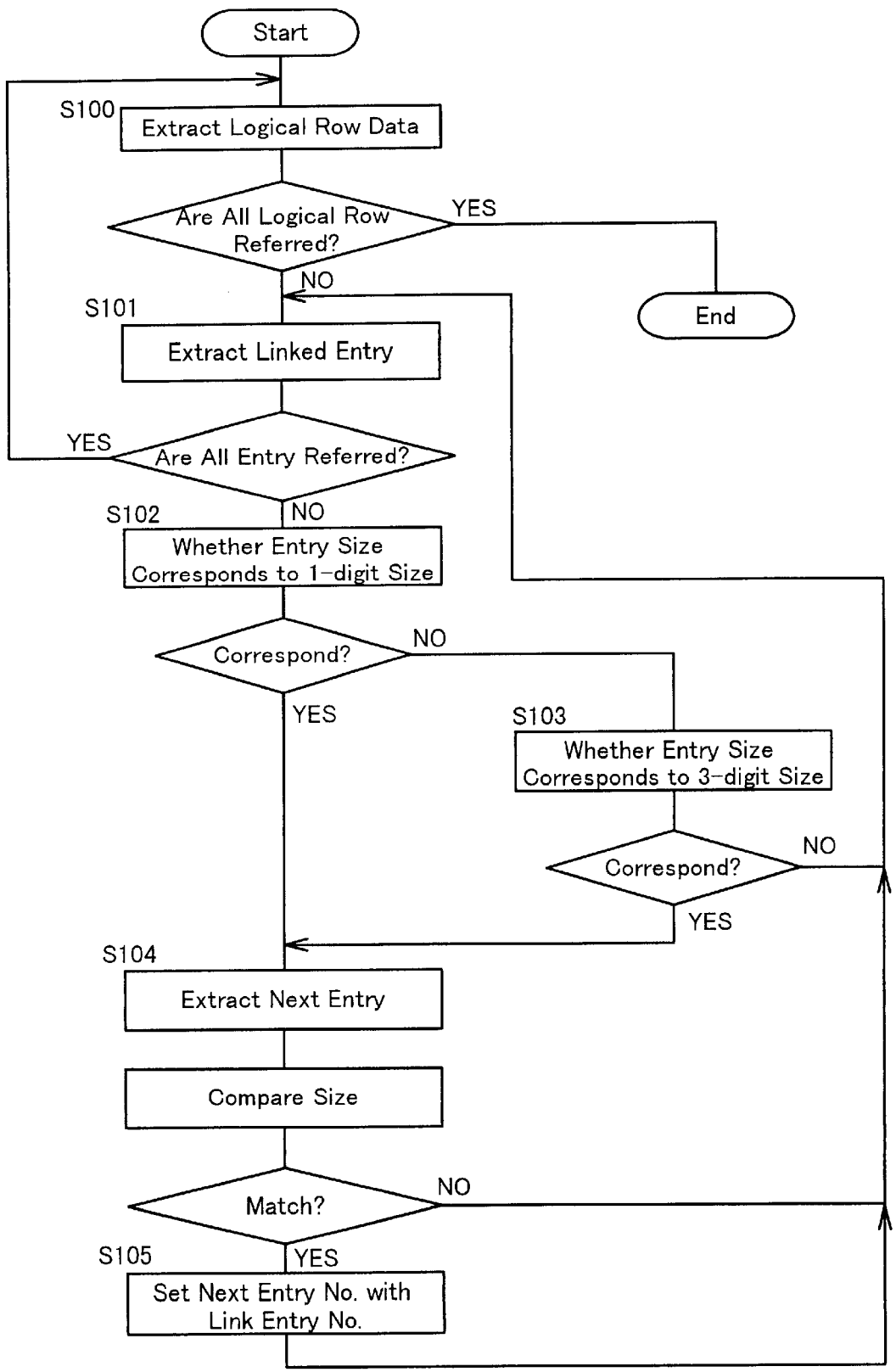
FIG. 72 is a flowchart showing the nesting analysis processing for the one-digit and three-digit ruled lines.

An explanation will now be given for the nested structure analysis processing for one-digit and three-digit ruled lines, which were previously described while referring to FIGS. 20A and 20B. FIG. 72 is a flowchart showing the nested structure analysis process for one-digit and three-digit ruled lines, and FIG. 73 is a diagram for explaining a table after the nested structure analyzation has been completed.

(S100) The logical row information is extracted from the logical row information table 1102, and a check is performed to determine whether all the logical row information has been extracted. If it has, the processing is terminated.

(S101) The ruled line entries to be linked are extracted from the logical row information, and a check is performed to determine whether all the ruled line entries have been extracted. If they have, program control returns to step S100.

(S102) A check is performed to determine whether the size of an extracted ruled line entry corresponds to the size of a one-digit ruled line entry. If the sizes of the two correspond, program control advances to step S104. But if the sizes of the two ruled line entries do not correspond, program control moves to step S103.

(S103) A check is performed to determine whether the size of the extracted ruled line entry corresponds to the size of a three-digit ruled line entry. If the sizes of the two correspond, program control advances to step S104. But if the sizes of the two ruled line entries do not correspond, program control returns to step S101.

(S104) The next ruled line entry is extracted from the logical row which is currently being examined, and the size of the current ruled line entry is compared with the size of the next ruled line entry to determine whether, within a permitted margin for error, they match. If the two ruled line entries match, program control moves to step S105. But if the two entries do not match, program control returns to step S101.

(S105) The next ruled line number is entered for the linking destination ruled line entry number for the current ruled line entry. Program control then returns to step S101.

In FIG. 73 is shown the updated ruled line entry table 1104 for the form in FIG. 2. In FIG. 2, the one-digit ruled line entries are 22 to 30 and 36 to 44. Through the above described processing, the ruled line entries 22 to 30 are determined to be the one-digit ruled line entries. And as is indicated by the shaded portion in the ruled line entry table 1104, the number of a ruled line to be linked is entered in the linking destination ruled line entry number AN for the one-digit ruled line entries 22 to 30. In the previously described nested structure analysis process, it was ascertained that the ruled line entries 22 to 30 have nested structures, and the nested flag IN is set.

In this manner, the vertical and the horizontal lengths of the one-digit or the three-digit ruled line entries are defined in advance. When a predetermined number of ruled line entries having the defined size are arranged in order, these entries are determined to have nested structures, and are logically collected together as a ruled line entry. While using the results of this determination, in the character recognition process sequential ruled line entries can be employed as a character string.

Figure 21B:
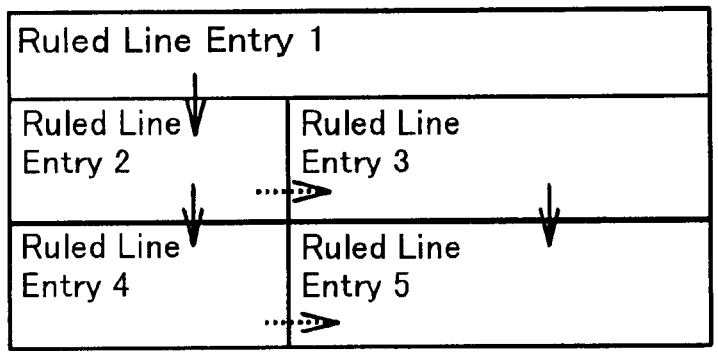
Figure 74:
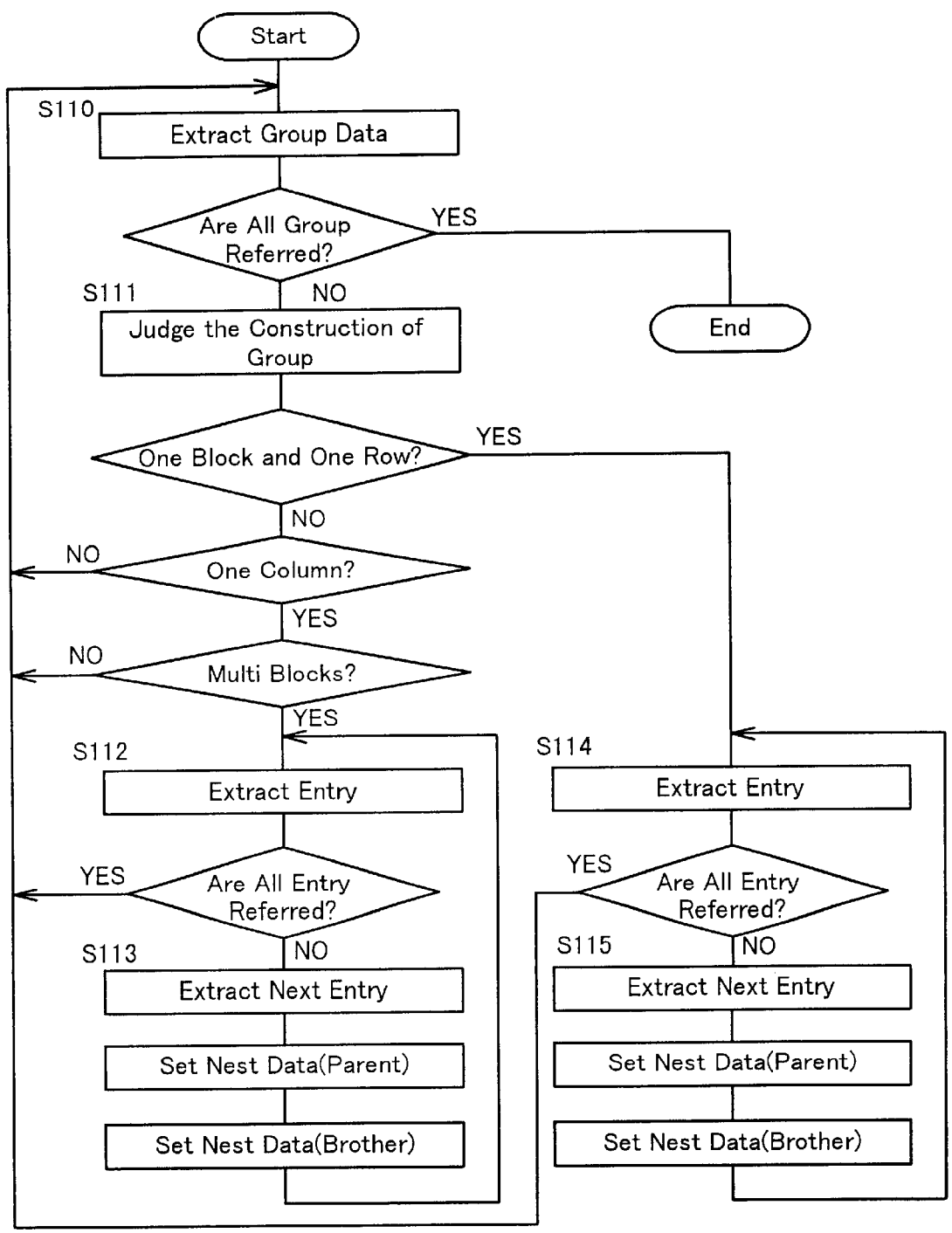
FIG. 74 is a flowchart showing the nesting analysis processing for charts other than the main chart.

An explanation will now be given for the processing for analyzing the nested structure for rectangles having a special structure shown in FIGS. 21A and 21B. FIG. 74 is a flowchart showing the nested structure analysis processing for a portion other than the main chart, and FIGS. 75 and 76 are diagrams for explaining the tables after the nested structure is analyzed.

(S110) Group information is extracted from the group information table 1100. A check is performed to determine whether all the group information has been extracted, and if so, the processing is terminated.

(S111) The structure of an extracted group is determined. A check is performed to determine whether the pertinent group has one block and one row. If the extracted group has one block and one row, program control moves to step S114. If the group does not consist of one block and one row, a check is performed to determine whether the block consists of one column. If the block is not one column, program control returns to step S110. If the group is formed by one column, a check is performed to determine whether the group has a plurality of blocks. When the group does not include a plurality of blocks, program control returns to step S110. If the group includes a plurality of blocks, program control advances to step S112.

(S112) The ruled line entries constituting the group are extracted. A check is performed to determine whether all the ruled line entry information has been examined, and if so, program control returns to step S110.

(S113) Ruled line entries which follow the currently examined ruled line entry are sequentially extracted for the group. The left vertical ruled line number of the current ruled line entry is compared with that of the next ruled line entry. When the left vertical ruled line numbers of the two ruled line entries are matched, nest information (the parenthood relationship) is designated for the ruled line entries. Then, the upper horizontal ruled line number of the current ruled line entry is compared with that of the next ruled line entry. When the upper horizontal ruled line numbers of the two ruled line entries are matched, nest information (the brotherhood relationship) is designated for these ruled line entries. Thus, the nested structure shown in FIG. 21B is detected. Program control thereafter returns to step S112.

(S114) When the group consists of one block and one row, the ruled line entries which constitute the group are extracted. A check is performed to determine whether all the ruled line entry information has been examined, and if so, program control returns to step S110.

(S115) Ruled line entries which follow the currently examined ruled line entry are sequentially extracted for the pertinent group. The upper horizontal ruled line number of the current ruled line entry is compared with that of the next ruled line entry. When the upper horizontal ruled line numbers of the two ruled line entries are matched, nest information (the parenthood relationship) is designated for the ruled line entries. Then, the left vertical ruled line number of the current ruled line entry is compared with that of the next ruled line entry. When the left vertical ruled line numbers of the two ruled line entries are matched, nest information (the brotherhood relationship) is designated for these ruled line entries. Thus, the nested structure shown in FIG. 21A is detected. Program control thereafter returns to step S114.

In this manner, the nested structure analysis process is performed for each structure in the portion other than the main chart in the form. In FIG. 21A, ruled line entry 2 is a child of ruled line entry 1; ruled line entry 4 is a child of ruled line entry 2; ruled line entry 5 is a child of ruled line entry 3; ruled line entries 2 and 3 are brothers; and ruled line entries 4 and 5 are brothers. In FIG. 21B, ruled line entry 2 is a child of ruled line entry 1; ruled line entry 4 is a child of ruled line entry 2; ruled line entry 5 is a child of ruled line entry 3; ruled line entries 2 and 3 are brothers; and ruled line entries 4 and 5 are brothers.

For the example form in FIG. 2, the individual tables will now be explained. As is shown in FIG. 75, the nest flag INF is set for ruled line entries 1 to 5 in the ruled line information table 1104. The nest rank number KN is set to "1" for ruled line entries 2 and 3 and to "2" for ruled line entries 4 and 5. The child ruled line entry number CRN is set to "2" for ruled line entry 1, "4" for ruled line entry 2, and "5" for ruled line entry 3. The ruled line entries linking serial number RLN is set to "1" for ruled line entries 3 and 5.

As is shown in FIG. 75, in the logical row information table 1102, logical column count "1" is entered for logical row 1 having group 1 and block 1. As is shown in FIG. 76, in the logical column information table 1103, logical columns 2 and 3 are deleted, and the number of ruled line entries RIN for logical column 1 is changed to "5." In the block information table 1101 in FIG. 76, the number of logical columns for group 1 and block 1 is changed to "1."

The nested structure of the portion other than the main chart is analyzed in the above described manner.

(g) Explanation of an Attribute Provision Process

Figure 77:
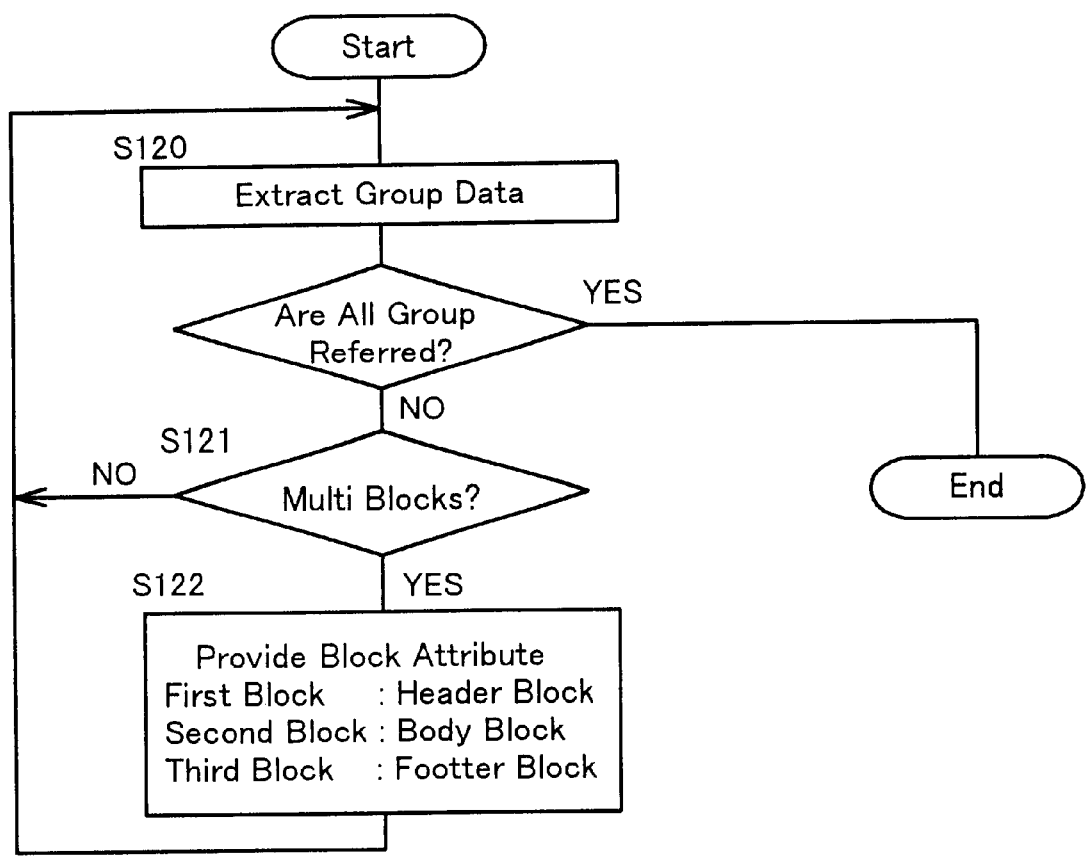
FIG. 77 is a flowchart showing the attribute provision processing.

FIG. 77 is a flowchart showing the attribute provision processing, and FIG. 78 is a diagram for explaining a table after an attribute is provided.

(S120) Group information is extracted from the group information table 1100. A check is performed to determine whether all the group information has been extracted, and if so, the processing is terminated.

(S121) A check is performed to determine whether the pertinent group includes a plurality of blocks. If the group does not include a plurality of blocks, program control returns to step S120.

(S122) Block information is extracted from the block information address of the group, and block attribute BZ is provided for each block. That is, a header block attribute is provided for the first block, a body block attribute is provided for the second block, and a footer block attribute is provided for the third and following blocks. Program control thereafter returns to step S120.

In this manner, the attribute is provided for each block which constitutes the chart structure to define each block. As is shown in FIG. 78, in the block information table 1101, header block attribute "1" is provided for the first block "1" for group 3, body attribute 1121 is provided for the second block 2, and footer block attribute "3" is provided for the third block 3.

(h) Explanation of a Headline Flag Setting Process

An explanation will now be given for the headline flag setting processing for setting a headline flag to a ruled line entry constituting a headline.

Figure 79:
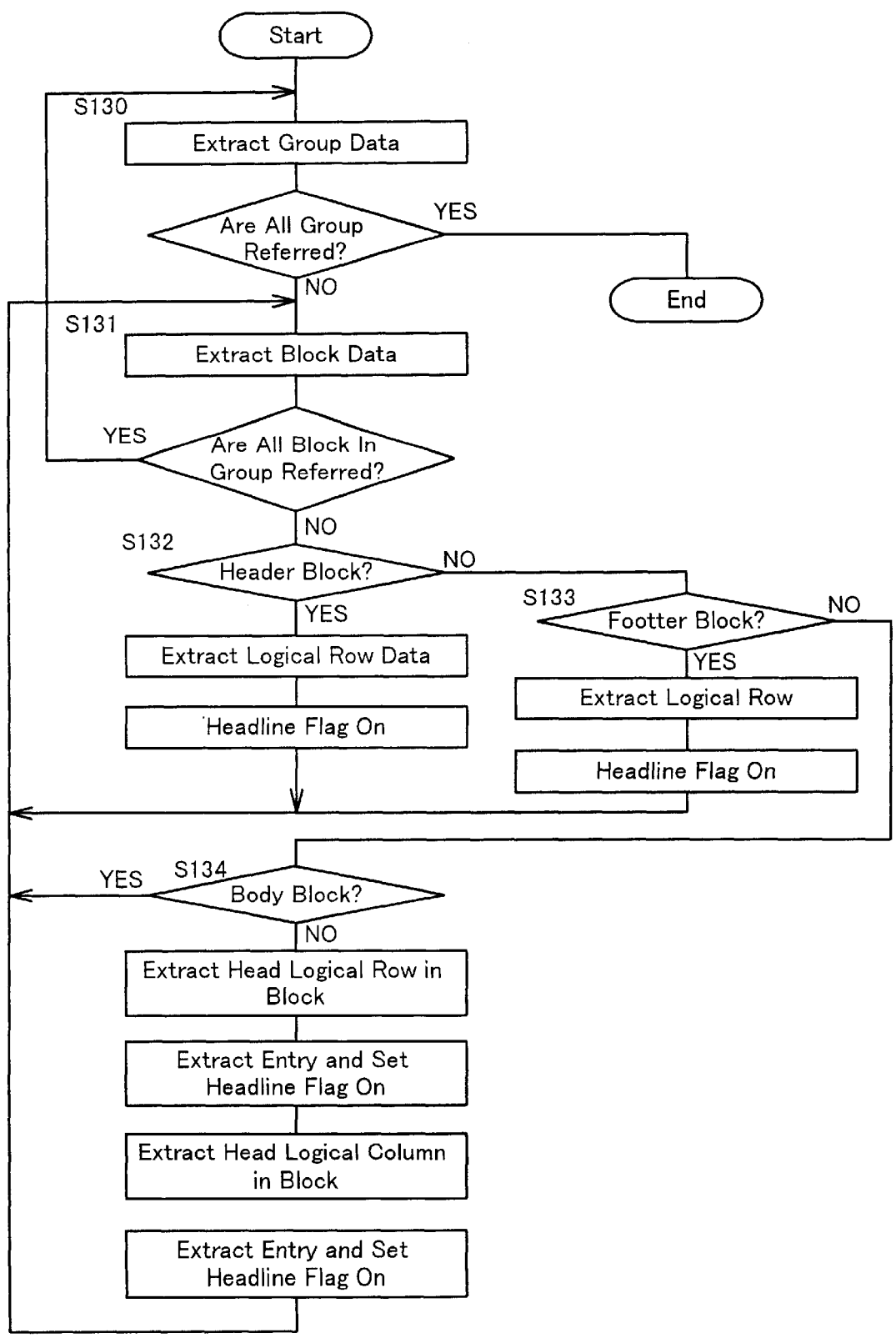
FIG. 79 is a flowchart showing the flag setting processing.

FIG. 79 is a flowchart showing the flag setting processing, and FIG. 80 is a diagram for explaining the table after the headline flag is set.

(S130) Group information is extracted from the group information table 1100. A check is performed to determine whether all the group information has been extracted, and if so, the processing is terminated.

(S131) Block information for which the address is designated is extracted from the group information. A check is performed to determine whether all the block information in the group has been extracted, and if so, program control returns to step S130.

(S132) A check is performed to determine whether the extracted block is a header block. If the extracted block is a header block, logical row information for the pertinent block is extracted one record by one record. Then, ruled line entry information in the logical row is extracted one record by one record, and the headline flag is set ON. In this manner, the headline flag is set for all the ruled line entries which constitute the header block. Program control thereafter returns to step S131.

(S133) A check is performed to determine whether the extracted block is a footer block. If the extracted block is not a footer block, program control advances to step S134. If the extracted block is a footer block, logical row information for the pertinent block is extracted one record by one record. Then, ruled line entry information in the logical row is extracted one record by one record, and the headline flag is set ON. In this manner, the headline flag is set for all the ruled line entries which constitute the footer block. Program control thereafter returns to step S131.

(S134) A check is performed to determine whether the extracted block is a body block. If the extracted block is not a body block, program control returns to step S131. If the extracted block is a body block, the first logical row information for the pertinent block is extracted one record by one record. Then, ruled line entry information in the first logical row is extracted one record by one record, and the headline flag is set ON. Therefore, the headline flag is set for all the ruled line entries which constitute the first logical row of the body block. Then, the first logical column information for the pertinent block is extracted. Then, ruled line entry information in the extracted first logical column is extracted one record by one record, and the headline flag is set ON. As a result, the headline flag is set for all the ruled line entries which constitute the first logical column of the body block. Program control thereafter returns to step S131.

Since the headline is extracted, characters to be used for character recognition can be limited, and a character recognition process specified for these characters (words) can be performed. Therefore, the words in the headline portion can be accurately recognized. As is shown in FIG. 80, according to the rules in FIG. 79, headline flag MF is set for ruled line entries in the ruled line entry information table 1102 which are ascertained to be a headline.

(i) Explanation of a Character Recognition Process for a Headline

A character string in a ruled line entry for which the headline flag is set is recognized in order to determine the type of a headline.

Figure 81:
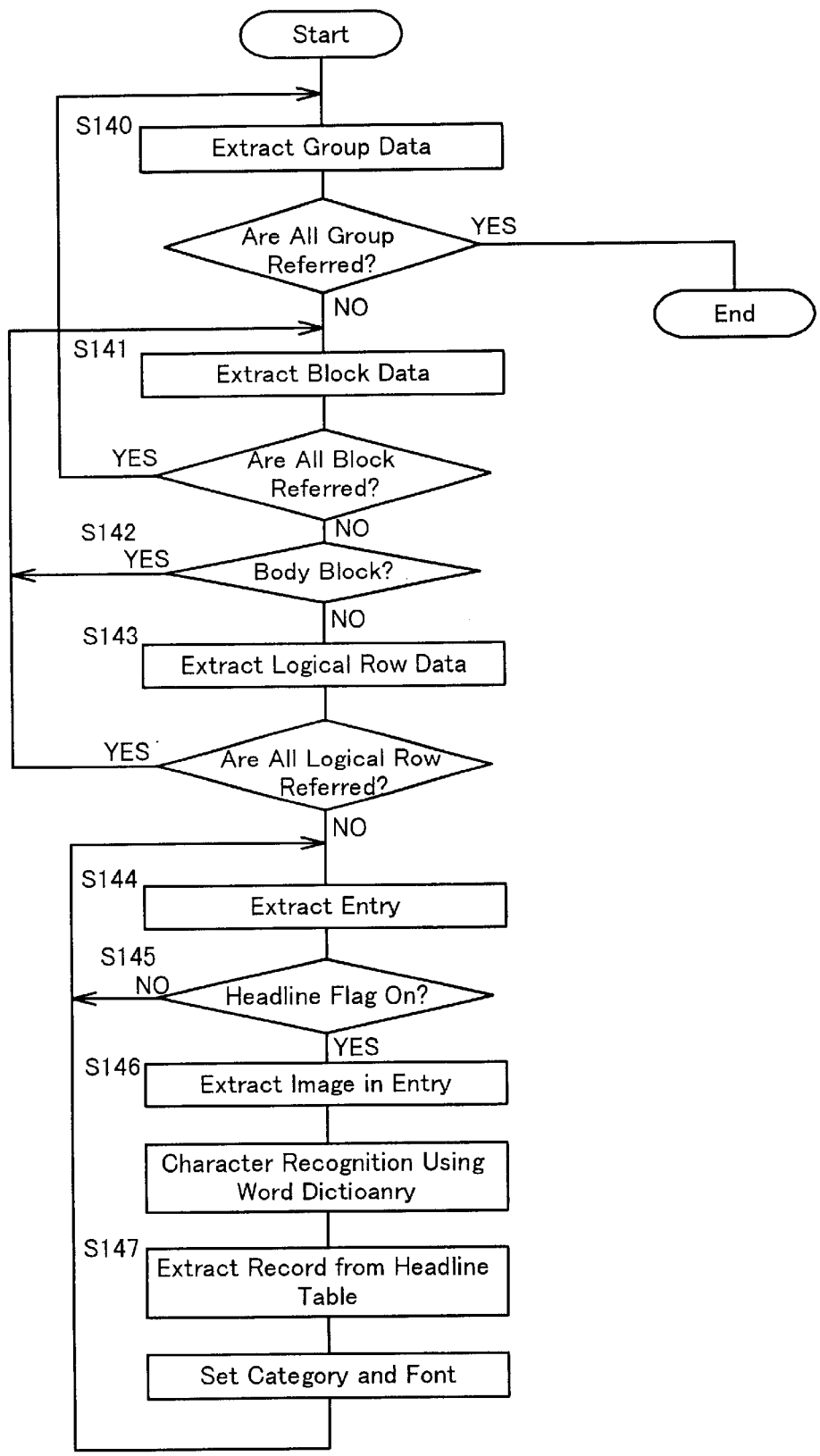
FIG. 81 is a flowchart showing the headline recognition processing.

FIG. 81 is a flowchart showing the headline recognition processing, and FIG. 82 is a diagram for explaining the table after the headline recognition processing.

(S140) Group information is extracted from the group information table 1100. A check is performed to determine whether all the group information has been examined, and if so, the processing is terminated.

(S141) Block information for which an address is designated is extracted from the group information. A check is performed to determine whether all the block information in the group has been extracted, and if so, program control returns to step S140.

(S142) A check is performed to determine whether the block information is for a body block. If the block information is a body block, it is a data portion, and therefore, program control returns to step S141.

(S143) If the block information is not for a body block, it may be a headline portion. Therefore, the logical row information for which the address is designated is extracted from the block information. A check is performed to determine whether all the logical row information has been extracted, and if so, program control returns to step S141.

(S144) The ruled line entry information for which the address is designated is extracted form the logical row information.

(S145) A check is performed to determine whether the headline flag for the ruled line entry information is ON. If the flag is not ON, program control returns to step S144.

(S146) The image for the character string data portion in the ruled line entry is extracted. The characters of the obtained image are recognized by using the headline word dictionary 1003 (see FIG. 25). As is shown in FIG. 25, words existing as a headline (e.g., a money transfer destination) and their images are registered in the headline word dictionary 1003. Therefore, more accurate character recognition is possible compared with when the common character recognition dictionary is employed.

(S147) The headline title of a matched dictionary record is extracted. And a record for which the headline title is matched is extracted from the headline table (see FIG. 24). That is, the headline table in FIG. 24 is examined by using, as a key, the headline title which is obtained as the recognition results. As is shown in FIG. 24, attribute information (a character recognition category, a character font, etc.) corresponding to the headline title is registered in the headline table. A record (attribute information) which matches the headline title is extracted from the headline table. The attribute (character recognition category CC, character font CF, etc.) is designated for the ruled line entry information. Program control thereafter returns to step S144.

In this manner, the character recognition is performed for the headline portion by using the limited character recognition dictionary. As is shown in FIG. 82, for the first form in FIG. 2, the character recognition category CC and the character font CF are entered for a ruled line entry in the ruled line information table 1104 for which the headline flag is ON.

(j) Explanation of an Attribute Setting Process for a Data Portion

The attribute for a ruled line entry for which the headline flag is not set is determined in order to determine the attribute of a data portion.

Figure 83:
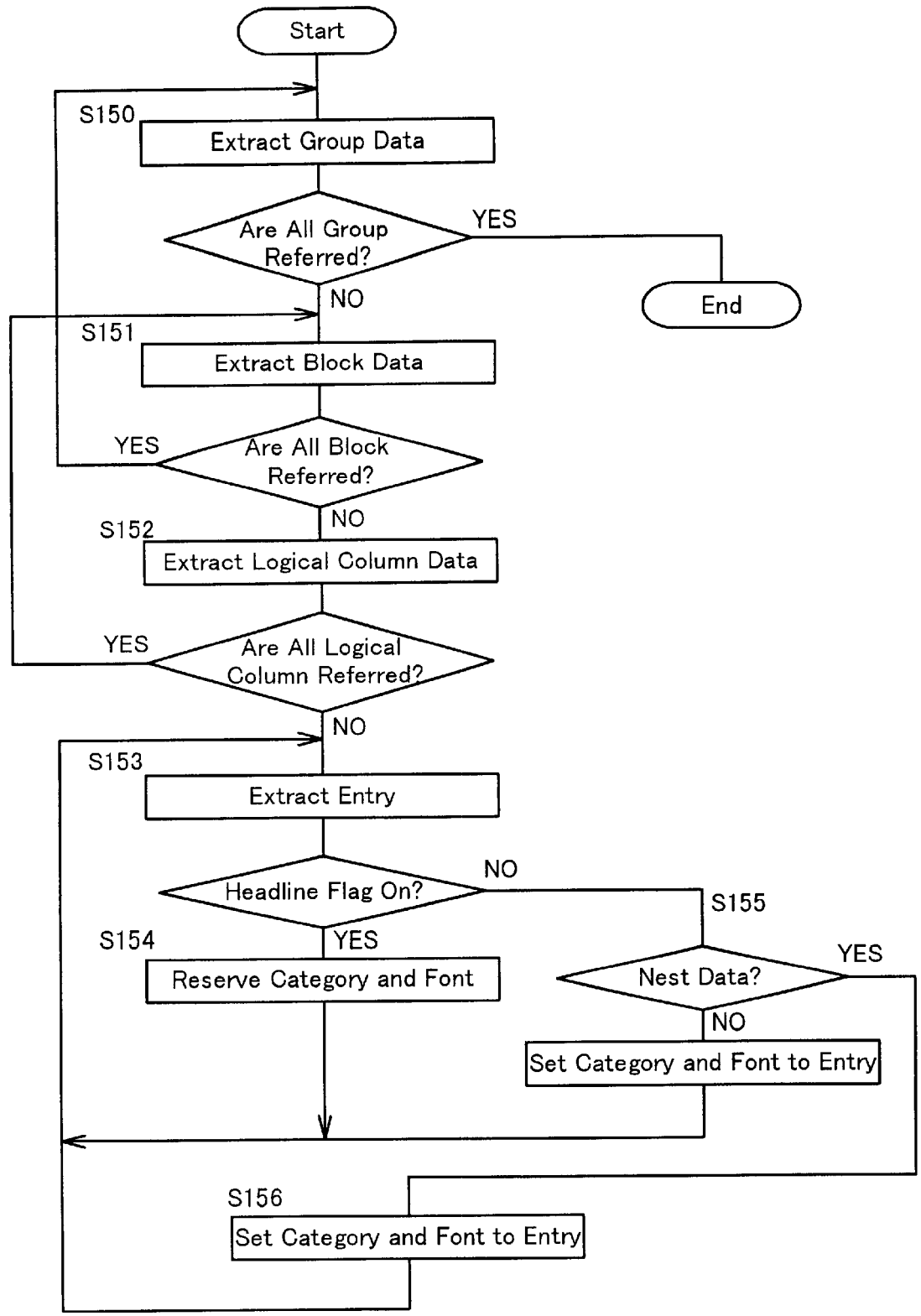
FIG. 83 is a flowchart showing the attribute setup processing.

FIG. 83 is a flowchart showing the attribute setting processing, and FIG. 84 is a diagram for explaining the table after the attribute setting processing.

(S150) Group information is extracted from the group information table 1100. A check is performed to determine all the group information has been extracted, and if so, the processing is terminated.

(S151) Block information for which the address is designated is extracted from the group information. A check is performed to determine whether all the block information in the group has been extracted, and if so, program control returns to step S150.

(S152) Logical column information for which the address is designated is extracted from the block information. A check is performed to determine whether all the logical column information has been extracted, and if so, program control returns to step S151.

(S153) Ruled line entry information for which the address is designated is extracted from the logical column information. A check is performed to determine whether the headline flag for the ruled line entry information is ON. If the headline flag is not ON, program control advances to step S155.

(S154) When the headline flag is ON, the character recognition category and the character font of the ruled line entry are stored. Program control thereafter returns to step S153.

(S155) If the headline flag is not ON, it is assumed that the ruled line entry is for a data portion. A check is performed to determine whether the ruled line entry information is nest information. If the ruled line entry information is nest information, program control moves to step S156. If the ruled line entry information is not nest information, the character recognition category and the character font, which are stored at step S154, are designated for the currently examined ruled line entry. Therefore, the attribute of the headline portion of the same logical column is designated for the data portion. Program control thereafter returns to step S153.

(S156) If the ruled line entry is nest information, the character recognition category and the character font, which are stored at step S154 for a ruled line entry at the same level (the same rank linking serial number) as the currently examined ruled line entry, are designated for the currently examined ruled line entry. Program control thereafter returns to step S153.

Among the ruled line entries constituting a logical column, the recognition characteristic, such as the character recognition category and the character font, are copied from the headline ruled line entry to a ruled line entry other than the headline. As is shown in FIG. 84, for the form in FIG. 2, the character recognition category CC and the character font CF of ruled line entries in the same logical column are designated for ruled line entries 3, 5 and 7 of the data portion in the ruled line entry information table 1104. Therefore, the data name attribute of the data portion is determined by using the logical column information.

(k) Explanation of a Character Recognition Process for a Data Portion

In order to determine characters in the data portion, the character recognition is performed for a ruled line entry for which the headline flag is not set.

Figure 85:
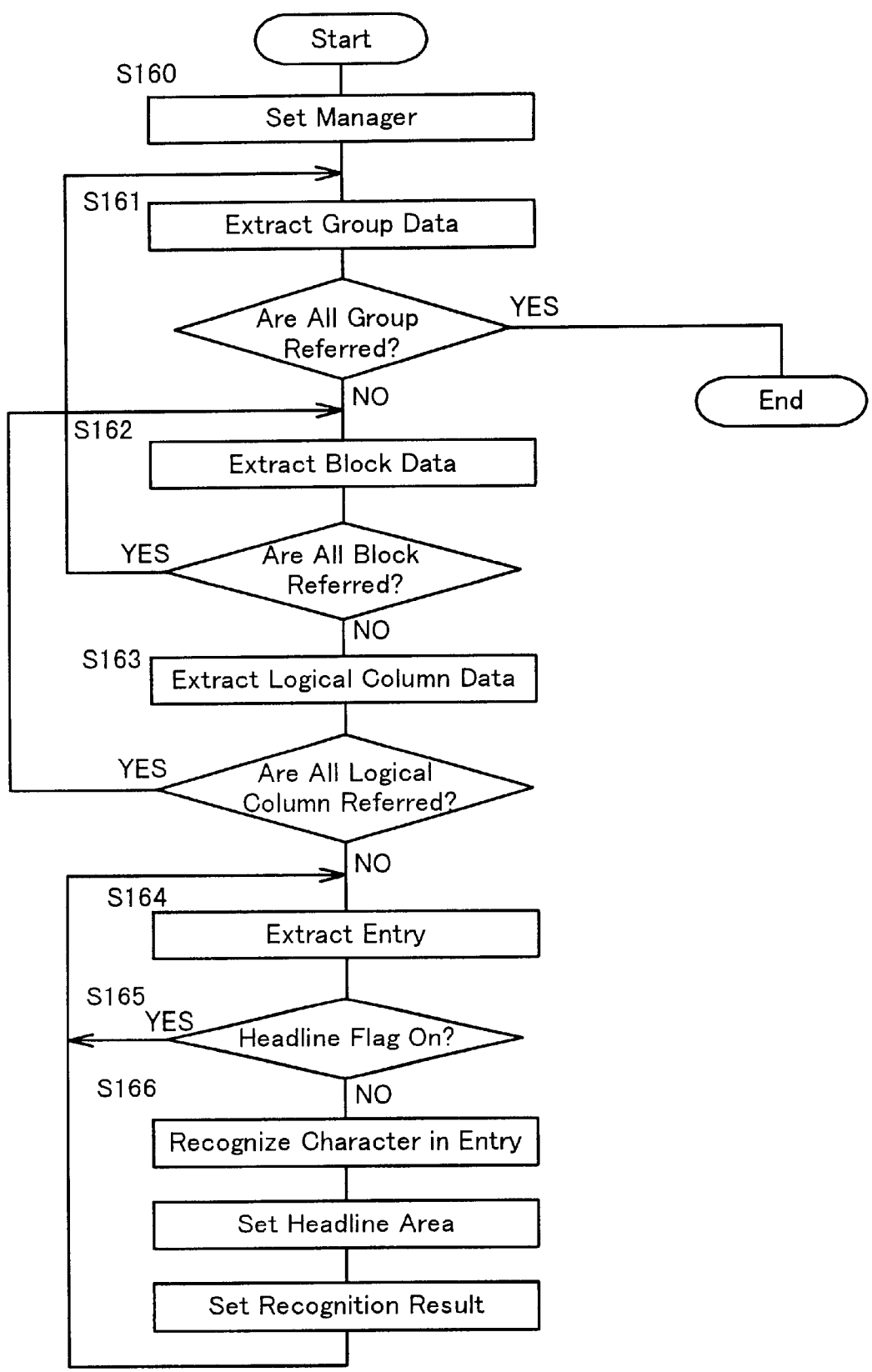
FIG. 85 is a flowchart showing the character recognition processing.
Figure 86:
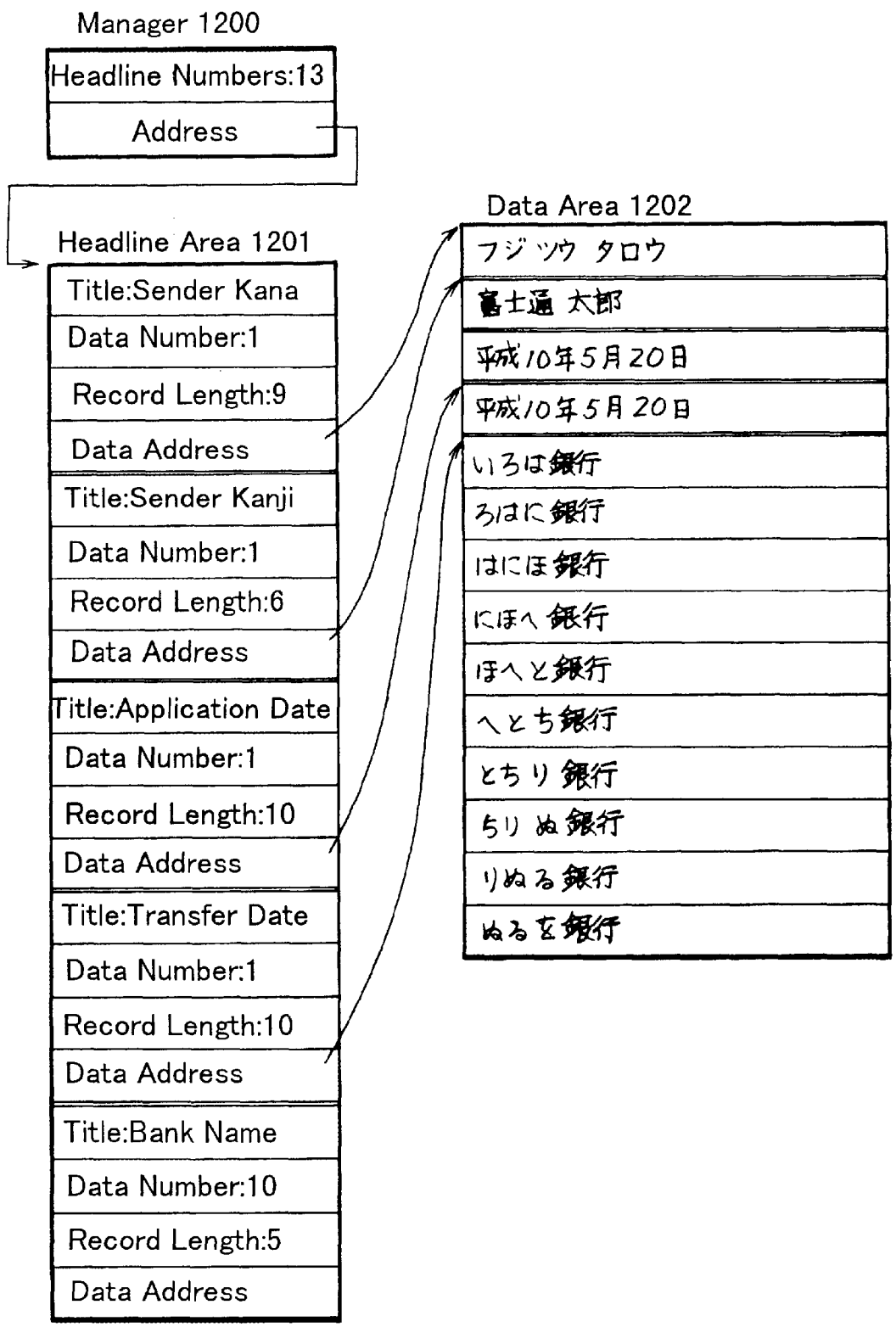
FIG. 86 is a diagram for explaining the results obtained by the character recognition processing.
Figure 87:
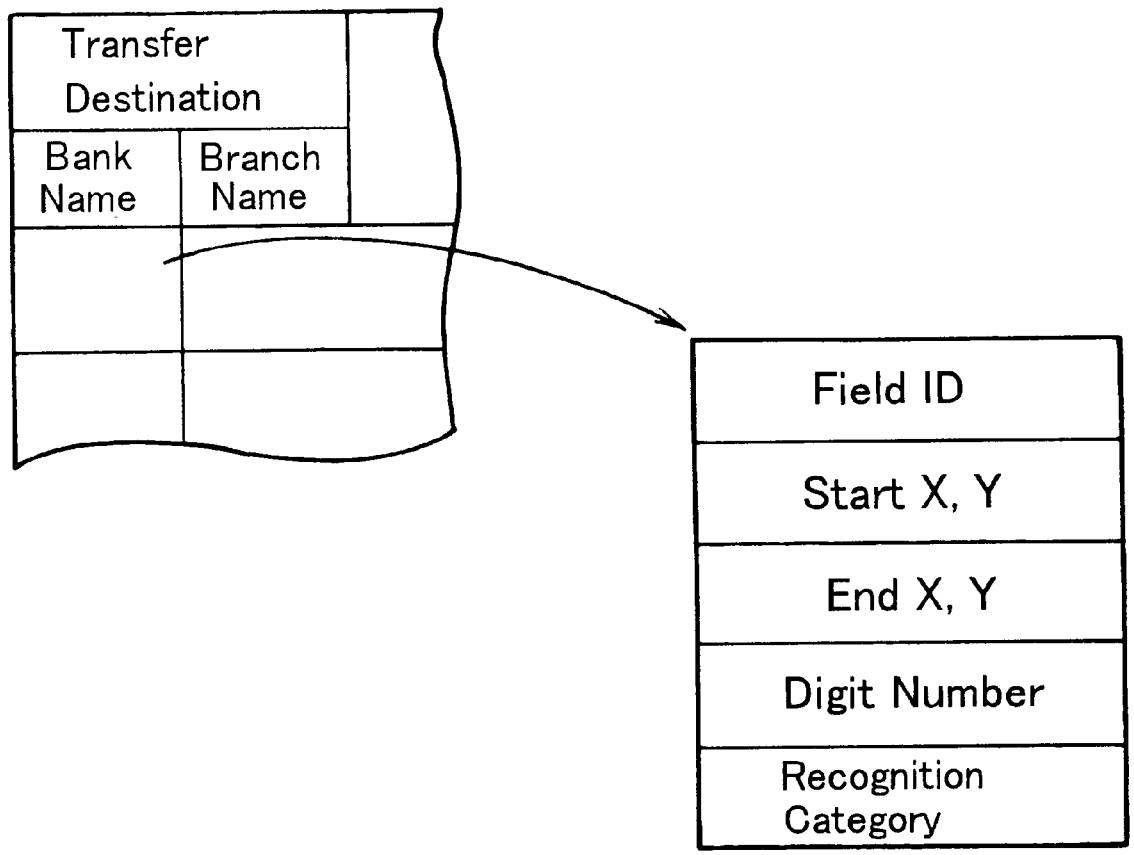
FIG. 87 is a diagram for explaining the prior art.

FIG. 85 is a flowchart showing the character recognition processing, and FIG. 86 is a diagram for explaining the character recognition results.

(S160) A character recognition results notification area manager 1200 shown in FIG. 86 is prepared in a memory. The manager 1200 includes the number of recognized headlines and a recognized headline area address.

(S161) Group information is extracted from the group information table 1100. A check is performed to determine whether all the group information has been extracted, and if so, the processing is terminated.

(S162) Block information for which the address is designated is extracted form the group information. A check is performed to determine whether all the block information in the group has been extracted, and if so, program control returns to step S161.

(S163) Logical column information for which the address is designated is extracted from the block information. A check is performed to determine whether all the logical column information has been extracted, and if so, program control returns to step S162.

(S164) Ruled line entry information for which the address is designated is extracted from the logical column information.

(S165) A check is performed to determine whether the headline flag for the ruled line entry information is ON. When the headline flag is ON, program control returns to step S164.

(S166) When the headline flag is not ON, a character string in the ruled line entry is recognized by using the common character recognition dictionary 1004 (see FIG. 1). The common character recognition dictionary 1004 is provided separately for each recognition category, such as a chinese character category or a numerical category. Therefore, for character recognition, an appropriate recognition dictionary is selected in accordance with the recognition attribute of the data portion. As a result, characters in the data portion can also be accurately recognized.

Furthermore, a recognized headline area 1201 in FIG. 86 is prepared. The area 1201 includes a headline title, the number of recognized data sets, a recognized record length, and a recognized data address. A recognized data area 1202 is also prepared. That is, the results of recognition are stored in the area indicated by the recognized data address.

In this manner, the obtained results of recognition are stored in the recognition results notification area. Therefore, the data title of the data portion, the number of data sets and the character recognition results can be acquired.

As is described above, the relationship between the row and the column for a ruled line entry is determined, and the individual ruled line entries are sorted into the headline portion and the corresponding data portion. The characters in the headline portion are recognized by using the headline recognition dictionary, and the headline title is obtained. The relationship between the structures of the logical columns is employed to identify the title of the data portion which corresponds to the headline portion. Therefore, the format of each entry in the form need not be defined in advance.

Furthermore, in accordance with the headline title, the recognition attribute is obtained from the headline table. The characters in the data portion are recognized based on the recognition attribute. As a result, the chart structure in the form can be analyzed, and the character recognition of the data portion can be more accurate.

In the above described embodiment, chinese characters, alphabets and numerals are employed to be entered in a form or printed. However, only numerals or alphabets may be employed. In addition, in this embodiment, the data title, the character recognition category and the character font are detected as the attributes of a ruled line entry. However, only the data title may be detected.

Although the present invention has been explained by referring to the embodiment, the present invention can be variously modified within the scope of the subject of the present invention, and these various modifications should be included in the present invention.

As is described above, according to the present invention, the following effects are provided.

(1) Since the arrangement of the ruled line entries in the form is detected and the chart structure is automatically analyzed, the registration of the format of the form is not required.

(2) Since the format of a form is automatically registered, the re-registration is not required even if the format is changed.

What is claimed is:

1. A format recognition method for recognizing the structure of a chart on a form comprising the steps of:

extracting vertical ruled lines and horizontal ruled lines on said form, and the smallest rectangles formed by said ruled lines from an image of said form;

analyzing said chart structure of said form employing the physical arrangement of said smallest rectangles; and determining attributes for said smallest rectangles employing the resultant chart structure wherein said step of analyzing said chart structure includes the steps of:
extracting a relationship existing among said smallest rectangles in a row employing the positional relationship of said smallest rectangles; and
extracting a relationship existing among said smallest rectangles in a column employing the positional relationship of said smallest rectangles,
wherein said step of extracting said relationships existing among said smallest rectangles in a row includes the steps of:
employing connection relationships to sort said smallest rectangles into individual rows, each of which is constituted by said smallest rectangles which share a connection relationship; and
collecting into blocks sequential rows having the same row structure,
wherein said step of extracting said relationship in a row includes a step of extracting a relationship existing among vertically connected blocks having the same row structure,
wherein said step of determining said attribute includes a step of determining, as a data portion, a block having the maximum number of rows, and of determining, as a headline portion, blocks positioned above and under said block, and
wherein said step of determining said attributes includes the steps of:
a determining the attributes of said headline portion by recognizing characters in said headline portions; and
determining said attributes for said data portion by using said attributes for said headline portion.

2. A format recognition method for recognizing the structure of a chart on a form comprising the steps of:
extracting vertical ruled lines and horizontal ruled lines on said form, and the smallest rectangles formed by said ruled lines from an image of said form;
analyzing said chart structure of said form employing the physical arrangement of said smallest rectangles; and
determining attributes for said smallest rectangles employing the resultant chart structure,
wherein said step of analyzing said chart structure includes the steps of:
employing said connection relationships existing among said smallest rectangles to sort into groups said smallest rectangles which are connected;
sorting said groups for the individual elements of a chart; and
analyzing the relationships existing among rows and columns of said smallest rectangles for said individual elements in said chart,
wherein said step of analyzing said relationships existing along rows and columns of said smallest rectangles includes the steps of:
analyzing said smallest rectangles for relationships existing along said rows; and
analyzing said smallest rectangles for relationships existing along said columns, and
wherein said step of analyzing said smallest rectangles for said relationships existing along the rows includes a step of:
analyzing the nested structure of a row constituted by said smallest rectangles, and storing nesting information for said smallest rectangles.

3. A format recognition method for recognizing the structure of a chart on a form comprising the steps of:
extracting vertical ruled lines and horizontal ruled lines on said form, and the smallest rectangles formed by said ruled lines from an image of said form;
analyzing said chart structure of said form employing the physical arrangement of said smallest rectangles; and
determining attributes for said smallest rectangles employing the resultant chart structure,
wherein said step of analyzing said chart structure includes the steps of:
employing said connection relationships existing among said smallest rectangles to sort into groups said smallest rectangles which are connected;
sorting said groups for the individual elements of a chart; and
analyzing the relationships existing among rows and columns of said smallest rectangles for said individual elements in said chart, and
wherein said step of analyzing said chart structure includes the steps of:
extracting chart structures for said individual elements; and
combining elements having the same chart structure.

4. A format recognition method for recognizing the structure of a chart on a form comprising the steps of:
extracting vertical ruled lines and horizontal ruled lines on said form, and the smallest rectangles formed by said ruled lines from an image of said form;
analyzing said chart structure of said form employing the physical arrangement of said smallest rectangles; and
determining attributes for said smallest rectangles employing the resultant chart structure,
wherein said step of analyzing said chart structure includes the steps of:
employing said connection relationships existing among said smallest rectangles to sort into groups said smallest rectangles which are connected;
sorting said groups for the individual elements of a chart; and
analyzing the relationships existing among rows and columns of said smallest rectangles for said individual elements in said chart, and
wherein said step of analyzing said chart structure includes steps of:
extracting said chart structures for said elements; and
employing said chart structures for said elements to recover ruled lines in said elements.

5. A format recognition method for recognizing the structure of a chart on a form comprising the steps of:
extracting vertical ruled lines and horizontal ruled lines on said form, and the smallest rectangles formed by said ruled lines from an image of said form;
analyzing said chart structure of said form employing the physical arrangement of said smallest rectangles; and
determining attributes for said smallest rectangles employing the resultant chart structure,
wherein said step of analyzing said chart structure includes the steps of:
employing said connection relationships existing among said smallest rectangles to sort into groups said smallest rectangles which are connected;
sorting said groups for the individual elements of a chart; and
analyzing the relationships existing among rows and columns of said smallest rectangles for said individual elements in said chart, wherein said step of analyzing said relationships existing along rows and columns of said smallest rectangles includes the steps of:
analyzing said smallest rectangles for relationships existing along said rows; and
analyzing said smallest rectangles for relationships existing along said columns, and
wherein said step of analyzing said relationships existing along the rows includes the steps of:
employing the structures of individual rows to detect all strikeout lines entered in rows; and
deleting said strikeout lines to determine said relationships existing along said rows.

6. A format recognition method for recognizing the structure of a chart on a form comprising the steps of:
extracting vertical ruled lines and horizontal ruled lines on said form, and the smallest rectangles formed by said ruled lines from an image of said form;
analyzing said chart structure of said form employing the physical arrangement of said smallest rectangles; and
determining attributes for said smallest rectangles employing the resultant chart structure,
wherein said step of analyzing said chart structure includes the steps of:
employing said connection relationships existing among said smallest rectangles to sort into groups said smallest rectangles which are connected;
sorting said groups for the individual elements of a chart; and
analyzing the relationships existing among rows and columns of said smallest rectangles for said individual elements in said chart, and
wherein said step of analyzing said chart structure includes steps of:
detecting whether the smallest rectangles are contiguous; and
combining said contiguous, smallest rectangles to form a single rectangle.

7. A format recognition apparatus for recognizing the structure of a chart on a form comprising:
an input means for inputting an image of said form; and
processing means for extracting vertical rules lines and horizontal ruled lines on said form, and the smallest rectangles formed by said ruled lines employing said image, analyzing said chart character of said form employing the physical arrangement of said smallest rectangles, and determining attributes for said smallest rectangles employing the physical arrangement of said smallest rectangles,
wherein said analyzing of said chart structure includes:
means for extracting a relationship existing among said smallest rectangles in a row employing the positional relationship of said smallest rectangles; and
means for extracting a relationship existing among said smallest rectangles in a column employing the positional relationship of said smallest rectangles,
wherein said means for extracting said relationships existing among said smallest rectangles in a row includes:
means for employing connection relationships to sort said smallest rectangles into individual rows, each of which is constituted by said smallest rectangles which share a connection relationship; and
means for collecting into blocks sequential rows having the same row structure,
wherein said step of extracting said relationship in a row includes a step of extracting a relationship existing among vertically connected blocks having the same row structure,
wherein said determining of said attributes includes means for determining, as a data portion, a block having the maximum number of rows, and of determining, as a headline portion, blocks positioned above and under said block, and
wherein said determining of said attributes further includes the steps of:
means for determining the attributes of said headline portion by recognizing characters in said headline portions; and
means for determining said attributes for said data portion by using said attributes for said headline portion.

8. A storage medium for storing a program information, said program information comprising:
a first information for extracting vertical ruled lines and horizontal ruled lines on a form, and the smallest rectangles formed by said ruled lines employing a image of said form;
a second information for analyzing the chart character of said form employing the physical arrangement of said smallest rectangles; and
a third information for determining attributes for said smallest rectangles employing the physical arrangement of said smallest rectangles,
wherein said second information includes:
means for extracting a relationship existing among said smallest rectangles in a row employing the positional relationship of said smallest rectangles; and
means for extracting a relationship existing among said smallest rectangles in a column employing the positional relationship of said smallest rectangles,
wherein said means for extracting said relationships existing among said smallest rectangles in a row includes:
means for employing connection relationships to sort said smallest rectangles into individual rows, each of which is constituted by said smallest rectangles which share a connection relationship; and
means for collecting into blocks sequential rows having the same row structure,
wherein said step of extracting said relationship in a row includes a step of extracting a relationship existing among vertically connected blocks having the same row structure,
wherein said third information includes means for determining, as a data portion, a block having the maximum number of rows, and of determining, as a headline portion, blocks positioned above and under said block, and
wherein third information further includes the steps of:
means for determining the attributes of said headline portion by recognizing characters in said headline portions; and
means for determining said attributes for said data portion by using said attributes for said headline portion.

* * * * *